United States Patent [19]
El-Hasan et al.

[11] 3,739,160
[45] June 12, 1973

[54] METHOD AND APPARATUS FOR FAULT-TESTING BINARY CIRCUIT SUBSYSTEMS

[75] Inventors: Hasan Afif El-Hasan; Roger Erwin Packard, both of Santa Barbara, Calif.

[73] Assignee: Burroughs Corporation, Detroit, Mich.

[22] Filed: Nov. 8, 1971

[21] Appl. No.: 196,316

[52] U.S. Cl. ...................... 235/153 AC, 324/73 AT
[51] Int. Cl. ........................................... G06f 11/00
[58] Field of Search ............ 235/153 AC, 153 AK, 235/153 A; 340/146.1 E, 172.5; 324/73 R

[56] References Cited

UNITED STATES PATENTS

| | | | |
|---|---|---|---|
| 3,336,579 | 8/1967 | Heymann | 235/153 AC |
| 3,546,582 | 12/1970 | Barnard et al. | 324/73 R |
| 3,582,633 | 6/1971 | Webb | 235/153 AC |
| 3,622,877 | 11/1971 | MacDavid | 340/146.1 E |
| 3,631,229 | 12/1971 | Bens et al. | 235/153 AC |

*Primary Examiner*—Charles E. Atkinson
*Attorney*—Paul W. Fish, B. F. Spencer and Albin H. Gess

[57] ABSTRACT

A subsystem of binary circuits, packaged in modular form and having a plurality of connection points through which it is incorporated into a master system such as a digital computer, is tested by utilizing a binary word generator that periodically generates a string of parallel binary bits for application to the subsystem under test. Output signals from the subsystem under test are continually monitored and supplied to the binary word generator to shape the character of the succeeding string of parallel binary bits (binary word) applied to the subsystem. If there are no faults in the subsystem under test, starting the word generator and the digital circuits in the subsystem from respective initial reference states, insures that the binary word applied to the subsystem by the word generator, after a certain number of word applications or periods, will always be the same, for the same initial states and number of periods. A different binary word, than the one expected for a subsystem having no faults, is generated at the end of a test cycle when an identically structured subsystem having a fault or faults therein is tested under the same initial conditions and number of periods. To isolate the fault-containing portion of a subsystem when the expected word is not generated, the output connection points of the subsystem are disconnected from the input connection points of the binary word generator, the binary circuit subsystem and word generator are placed into an initial or reference state, and the binary signals appearing at each output connection point of the subsystem are counted during a cycle of word applications by the word generator. The count of binary signals generated at each output connection point of the binary subsystem will always be the same number for the same number of word applications and the same set of initial states for the binary word generator and the subsystem, if there are no faults in the subsystem. If there is a fault in a circuit connected to a particular output connection point of the subsystem, the count of binary signals appearing at this point for one test cycle, (a particular number of word applications) will be different than expected, while the count at all the other output connection points will be the same as expected, assuming that the initial states of the binary word generator and the binary subsystem, and the number of word applications remained the same.

40 Claims, 64 Drawing Figures

| OUTPUT OF WORD GEN. STAGES | CLOCK TIMES | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| $A_5$ | 1 | 0 | 1 | 0 | 1 | 0 | 1 | 0 | 1 | 0 | 1 | 0 | 1 | 0 | 1 | 0 |
| $B_5$ | 0 | 1 | 1 | 0 | 0 | 1 | 1 | 0 | 0 | 1 | 1 | 0 | 0 | 1 | 1 | 0 |
| $C_5$ | 0 | 0 | 1 | 0 | 0 | 0 | 1 | 0 | 0 | 0 | 1 | 0 | 0 | 0 | 1 | 0 |
| $D_5$ | 1 | 0 | 1 | 0 | 1 | 0 | 1 | 0 | 1 | 0 | 1 | 0 | 1 | 0 | 1 | 0 |

| OUTPUT OF WORD GEN. STAGES | CLOCK TIMES | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| $A_5$ | 1 | 1 | 1 | 1 | 1 | 1 | 1 | 1 | 1 | 1 | 1 | 1 | 1 | 1 | 1 | 1 |
| $B_5$ | 0 | 1 | 0 | 1 | 0 | 1 | 0 | 1 | 0 | 1 | 0 | 1 | 0 | 1 | 0 | 1 |
| $C_5$ | 0 | 0 | 0 | 0 | 0 | 0 | 0 | 0 | 0 | 0 | 0 | 0 | 0 | 0 | 0 | 0 |
| $D_5$ | 0 | 0 | 0 | 0 | 0 | 0 | 0 | 0 | 0 | 0 | 0 | 0 | 0 | 0 | 0 | 0 |

| 137 | 135 | 139 |
|---|---|---|
| 0 | 1 | 1 |
| 1 | 0 | 0 |
| 0 | 0 | 0 |
| 1 | 1 | 0 |

| OUTPUT OF WORD GEN. STAGES | CLOCK TIMES | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| $A_5$ | 0 | 1 | 0 | 0 | 0 | 0 | 0 | 0 | 0 | 0 | 0 | 0 | 0 | 0 | 0 | 0 |
| $B_5$ | 1 | 0 | 1 | 1 | 1 | 1 | 1 | 1 | 1 | 1 | 1 | 1 | 1 | 1 | 1 | 1 |
| $C_5$ | 1 | 0 | 0 | 0 | 0 | 0 | 0 | 0 | 0 | 0 | 0 | 0 | 0 | 0 | 0 | 0 |
| $D_5$ | 0 | 1 | 1 | 0 | 1 | 0 | 1 | 0 | 1 | 0 | 1 | 0 | 1 | 0 | 1 | 0 |

| OUTPUT OF WORD GEN. STAGES | CLOCK TIMES 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $A_5$ | 0 | 0 | 1 | 0 | 0 | 1 | 1 | 1 | 0 | 1 | 1 | 1 | 0 | 0 | 1 | 1 |
| $B_5$ | 1 | 0 | 1 | 0 | 0 | 0 | 0 | 0 | 0 | 1 | 0 | 1 | 0 | 0 | 0 | 0 |
| $C_5$ | 1 | 0 | 0 | 0 | 1 | 0 | 1 | 0 | 1 | 0 | 1 | 1 | 0 | 1 | 0 | 1 |
| $D_5$ | 0 | 1 | 1 | 0 | 1 | 0 | 0 | 1 | 1 | 0 | 0 | 1 | 0 | 1 | 0 | 0 |

PATENTED JUN 12 1973

3,739,160

SHEET 12 OF 49

| OUTPUT OF WORD GEN. STAGES | CLOCK TIMES 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| A4 | 1 | 1 | 1 | 1 | 1 | 1 | 1 | 1 | 1 | 1 | 1 | 1 | 1 | 1 | 1 | 1 |
| B4 | 0 | 1 | 1 | 1 | 1 | 1 | 1 | 1 | 1 | 1 | 1 | 1 | 1 | 1 | 1 | 1 |
| C4 | 0 | 0 | 0 | 0 | 0 | 0 | 0 | 0 | 0 | 0 | 0 | 0 | 0 | 0 | 0 | 0 |
| D4 | 1 | 1 | 1 | 1 | 1 | 1 | 1 | 1 | 1 | 1 | 1 | 1 | 1 | 1 | 1 | 1 |

| OUTPUT OF WORD GEN. STAGES | CLOCK TIMES 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| A4 | 1 | 0 | 1 | 0 | 0 | 1 | 1 | 0 | 1 | 0 | 0 | 1 | 1 | 0 | 1 | 0 |
| B4 | 0 | 1 | 0 | 1 | 0 | 0 | 1 | 1 | 0 | 1 | 0 | 0 | 1 | 1 | 0 | 1 |
| C4 | 0 | 0 | 1 | 0 | 1 | 0 | 0 | 0 | 1 | 0 | 1 | 0 | 0 | 0 | 1 | 0 |
| D4 | 0 | 0 | 0 | 1 | 0 | 1 | 0 | 0 | 0 | 1 | 0 | 1 | 0 | 0 | 0 | 1 |

| OUTPUT OF WORD GEN STAGES | CLOCK TIMES | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| $A_5$ | 1 | 0 | 1 | 0 | 1 | 0 | 1 | 0 | 1 | 0 | 0 | 0 | 0 | 0 | 0 | 0 |
| $B_5$ | 0 | 1 | 1 | 0 | 0 | 1 | 1 | 0 | 0 | 1 | 1 | 1 | 1 | 1 | 1 | 1 |
| $C_5$ | 0 | 0 | 1 | 0 | 0 | 0 | 1 | 0 | 0 | 0 | 1 | 0 | 1 | 0 | 1 | 0 |
| $D_5$ | 0 | 0 | 0 | 1 | 1 | 1 | 1 | 0 | 0 | 0 | 0 | 1 | 1 | 0 | 0 | 1 |
| $E_5$ | 0 | 0 | 0 | 0 | 1 | 0 | 0 | 0 | 0 | 0 | 0 | 0 | 0 | 0 | 0 | 0 |
| $H_5$ | 0 | 0 | 0 | 0 | 0 | 1 | 1 | 1 | 1 | 1 | 1 | 1 | 1 | 1 | 1 | 1 |
| $J_5$ | 1 | 0 | 1 | 0 | 1 | 0 | 1 | 0 | 0 | 0 | 0 | 0 | 0 | 0 | 0 | 0 |
| $K_5$ | 0 | 1 | 1 | 0 | 0 | 1 | 1 | 0 | 0 | 0 | 0 | 0 | 0 | 0 | 0 | 0 |

| OUTPUT OF WORD GEN STAGES | CLOCK TIMES | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| $A_5$ | 1 | 0 | 0 | 0 | 0 | 0 | 0 | 0 | 0 | 0 | 0 | 0 | 0 | 0 | 0 | 0 |
| $B_5$ | 0 | 1 | 1 | 1 | 1 | 1 | 1 | 1 | 1 | 1 | 1 | 1 | 1 | 1 | 1 | 1 |
| $C_5$ | 0 | 0 | 1 | 0 | 1 | 0 | 1 | 0 | 1 | 0 | 1 | 0 | 1 | 0 | 1 | 0 |
| $D_5$ | 0 | 0 | 0 | 1 | 1 | 0 | 0 | 1 | 1 | 0 | 0 | 1 | 1 | 0 | 0 | 1 |
| $E_5$ | 0 | 0 | 0 | 0 | 0 | 0 | 0 | 0 | 0 | 0 | 0 | 0 | 0 | 0 | 0 | 0 |
| $H_5$ | 0 | 0 | 0 | 0 | 0 | 0 | 0 | 0 | 0 | 0 | 0 | 0 | 0 | 0 | 0 | 0 |
| $J_5$ | 0 | 0 | 0 | 0 | 0 | 0 | 0 | 0 | 0 | 0 | 0 | 0 | 0 | 0 | 0 | 0 |
| $K_5$ | 0 | 0 | 0 | 0 | 0 | 0 | 0 | 0 | 0 | 0 | 0 | 0 | 0 | 0 | 0 | 0 |

| OUTPUT OF WORD GEN. STAGES | CLOCK TIMES | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| $A_5$ | 1 | 1 | 1 | 0 | 0 | 0 | 0 | 0 | 0 | 0 | 0 | 0 | 0 | 0 | 0 | 0 |
| $B_5$ | 1 | 0 | 1 | 0 | 0 | 0 | 0 | 0 | 0 | 0 | 0 | 0 | 0 | 0 | 0 | 0 |
| $C_5$ | 0 | 1 | 1 | 0 | 0 | 0 | 0 | 0 | 0 | 0 | 0 | 0 | 0 | 0 | 0 | 0 |
| $D_5$ | 0 | 0 | 1 | 0 | 0 | 0 | 0 | 0 | 0 | 0 | 0 | 0 | 0 | 0 | 0 | 0 |

FIG_26_

| OUTPUT OF WORD GEN. STAGES | CLOCK TIMES | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| $A_5$ | 1 | 0 | 1 | 0 | 0 | 0 | 0 | 0 | 0 | 0 | 0 | 0 | 0 | 0 | 0 | 0 |
| $B_5$ | 0 | 1 | 1 | 0 | 0 | 0 | 0 | 0 | 0 | 0 | 0 | 0 | 0 | 0 | 0 | 0 |
| $C_5$ | 0 | 0 | 1 | 0 | 0 | 0 | 0 | 0 | 0 | 0 | 0 | 0 | 0 | 0 | 0 | 0 |
| $D_5$ | 1 | 1 | 1 | 0 | 0 | 0 | 0 | 0 | 0 | 0 | 0 | 0 | 0 | 0 | 0 | 0 |

FIG_28_

| OUTPUT OF WORD GEN. STAGES | CLOCK TIMES | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| $A_5$ | 1 | 0 | 1 | 0 | 0 | 0 | 0 | 0 | 0 | 0 | 0 | 0 | 0 | 0 | 0 | 0 |
| $B_5$ | 0 | 1 | 1 | 0 | 0 | 0 | 0 | 0 | 0 | 0 | 0 | 0 | 0 | 0 | 0 | 0 |
| $C_5$ | 0 | 0 | 1 | 0 | 0 | 0 | 0 | 0 | 0 | 0 | 0 | 0 | 0 | 0 | 0 | 0 |
| $D_5$ | 1 | 1 | 1 | 0 | 0 | 0 | 0 | 0 | 0 | 0 | 0 | 0 | 0 | 0 | 0 | 0 |

FIG_30_

| OUTPUT OF WORD GEN. STAGES | CLOCK TIMES | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| $A_5$ | 1 | 1 | 1 | 0 | 0 | 0 | 0 | 0 | 0 | 0 | 0 | 0 | 0 | 0 | 0 | 0 |
| $B_5$ | 1 | 0 | 1 | 0 | 0 | 0 | 0 | 0 | 0 | 0 | 0 | 0 | 0 | 0 | 0 | 0 |
| $C_5$ | 0 | 1 | 1 | 0 | 0 | 0 | 0 | 0 | 0 | 0 | 0 | 0 | 0 | 0 | 0 | 0 |
| $D_5$ | 0 | 0 | 1 | 0 | 0 | 0 | 0 | 0 | 0 | 0 | 0 | 0 | 0 | 0 | 0 | 0 |

FIG. 32

| OUTPUT OF WORD GEN. STAGES | CLOCK TIMES | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| $A_4$ | 1 | 0 | 0 | 0 | 1 | 0 | 0 | 0 | 1 | 0 | 0 | 0 | 1 | 0 | 0 | 0 |
| $B_4$ | 0 | 1 | 0 | 0 | 0 | 1 | 0 | 0 | 0 | 1 | 0 | 0 | 0 | 1 | 0 | 0 |
| $C_4$ | 0 | 0 | 1 | 0 | 0 | 1 | 0 | 0 | 0 | 0 | 1 | 0 | 0 | 0 | 1 | 0 |
| $D_4$ | 0 | 0 | 0 | 1 | 0 | 0 | 1 | 0 | 0 | 0 | 1 | 0 | 0 | 0 | 0 | 1 |

FIG. 34

| OUTPUT OF WORD GEN. STAGES | CLOCK TIMES | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| $A_5$ | 1 | 0 | 0 | 0 | 1 | 0 | 0 | 0 | 1 | 0 | 0 | 0 | 1 | 0 | 0 | 0 |
| $B_5$ | 0 | 1 | 0 | 0 | 0 | 1 | 0 | 0 | 0 | 1 | 0 | 0 | 0 | 1 | 0 | 0 |
| $C_5$ | 0 | 0 | 1 | 0 | 0 | 0 | 1 | 0 | 0 | 0 | 1 | 0 | 0 | 0 | 1 | 0 |
| $D_5$ | 0 | 0 | 0 | 1 | 0 | 0 | 0 | 1 | 0 | 0 | 0 | 1 | 0 | 0 | 0 | 1 |

FIG. 36

| OUTPUT OF WORD GEN STAGES | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $A_5$ | 1 | 1 | 1 | 1 | 1 | 1 | 1 | 0 | 0 | 0 | 0 | 0 | 0 | 0 | 0 | 0 |
| $B_5$ | 1 | 0 | 1 | 0 | 1 | 0 | 1 | 0 | 0 | 0 | 0 | 0 | 0 | 0 | 0 | 0 |
| $C_5$ | 0 | 1 | 1 | 0 | 0 | 1 | 1 | 0 | 0 | 0 | 0 | 0 | 0 | 0 | 0 | 0 |
| $D_5$ | 0 | 0 | 1 | 0 | 0 | 0 | 1 | 0 | 0 | 0 | 0 | 0 | 0 | 0 | 0 | 0 |
| $E_5$ | 0 | 0 | 0 | 1 | 1 | 1 | 1 | 0 | 0 | 0 | 0 | 0 | 0 | 0 | 0 | 0 |
| $H_5$ | 0 | 0 | 0 | 0 | 1 | 0 | 1 | 0 | 0 | 0 | 0 | 0 | 0 | 0 | 0 | 0 |
| $J_5$ | 0 | 0 | 0 | 0 | 0 | 1 | 1 | 0 | 0 | 0 | 0 | 0 | 0 | 0 | 0 | 0 |
| $K_5$ | 0 | 0 | 0 | 0 | 0 | 0 | 1 | 0 | 0 | 0 | 0 | 0 | 0 | 0 | 0 | 0 |

| OUTPUT OF WORD GEN STAGES | CLOCK TIMES | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| $A_5$ | 1 | 1 | 1 | 1 | 1 | 1 | 1 | 0 | 0 | 0 | 0 | 0 | 0 | 0 | 0 | 0 |
| $B_5$ | 1 | 0 | 1 | 0 | 1 | 0 | 1 | 0 | 0 | 0 | 0 | 0 | 0 | 0 | 0 | 0 |
| $C_5$ | 0 | 1 | 1 | 0 | 0 | 1 | 1 | 0 | 0 | 0 | 0 | 0 | 0 | 0 | 0 | 0 |
| $D_5$ | 0 | 0 | 1 | 0 | 0 | 0 | 1 | 0 | 0 | 0 | 0 | 0 | 0 | 0 | 0 | 0 |
| $E_5$ | 0 | 0 | 0 | 1 | 1 | 1 | 1 | 0 | 0 | 0 | 0 | 0 | 0 | 0 | 0 | 0 |
| $H_5$ | 0 | 0 | 0 | 0 | 1 | 0 | 1 | 0 | 0 | 0 | 0 | 0 | 0 | 0 | 0 | 0 |
| $J_5$ | 0 | 0 | 0 | 0 | 0 | 1 | 1 | 0 | 0 | 0 | 0 | 0 | 0 | 0 | 0 | 0 |
| $K_5$ | 0 | 0 | 0 | 0 | 0 | 0 | 1 | 0 | 0 | 0 | 0 | 0 | 0 | 0 | 0 | 0 |

METHOD AND APPARATUS FOR FAULT-TESTING BINARY CIRCUIT SUBSYSTEMS

BACKGROUND OF THE INVENTION

This invention relates to apparatus and method for determining whether a binary circuit subsystem has faults, and more particularly, pertains to a method and apparatus for testing modular packaged, pluggable binary circuit subsystems for use in electronic digital computers to determine: 1. whether there is a fault or faults in the subsystem being tested, and 2. when there is a fault in the subsystem, what logic train or trains in the binary subsystem contain the fault or faults.

Pluggable binary circuit subsystems which may contain many passive linear elements such as resistors, non-linear elements such as diodes and active elements such as transistors formed into various configurations to produce such logic structure as flip-flop, latches, bit registers and memory units, are extensively used in digital computer systems. These pluggable subsystems, which may be structured on an integrated circuit format, have an array of connection points on a mounting support to which the elements or integrated circuits of the subsystem are also mounted. These connection points connect the logic circuitry of the subsystem to the power supply and circuitry of a digital computer by mating with connection points in the digital computer.

Because of the variety of logic functions required for the normal performance of a digital computer, inspection of just one out of the many binary circuit subsystems in a computer to insure that the constituent elements are operating, that there are no breaks or shorts in the multitude of conductors and that the elements are correctly connected, is extremely lengthy and tedious.

One method of inspecting such a binary circuit subsystem for faults is to manually check the signals generated at each output terminal of the subsystem in response to every possible binary signal combination which can be applied to the input terminals of the subsystem that are electrically connected to the particular output terminal monitored. In cases where there are more than just a few terminals, which is the common situation today, such checking becomes very tedious and time consuming.

Systems have been developed to automate the checking of binary circuit systems. One such system utilizes a computer to apply a stored set of binary signals to selected terminals of the subsystem under test and compare the output signals from the subsystem with an expected or reference output. The binary signals applied to the card are preselected to spotlight certain faults in the particular subsystem being tested.

The use of a stored set of predetermined binary signals and a computer to apply these signals results in a very complicated and costly test system. Such a test system is generally quite large, thus making it unsuitable for field use. Besides the limitations of cost and mobility, the system can only test a binary circuit subsystem for faults that have been anticipated, i.e., faults that will be trapped by one of the stored binary signal patterns.

Other systems have been developed which provide a more rapid and less complicated systematic checking of logic circuit subsystems. These systems apply binary signal combinations to the inputs of a binary circuit subsystem under test and a standard, known-to-be-good binary subsystem, which is identical to the subsystem under test. The outputs of the subsystem under test and the standard subsystem are continually compared. When a mismatch occurs, an indication identifying the input connection points related to the outputs producing the mismatch is given.

This method of testing binary circuit subsystems still requires a considerable amount of time to determine if a binary circuit subsystem is good or bad when the subsystem being tested has a large number of connection points, which is commonplace today, and the subsystem being tested has only a few faults therein. In addition, the credibility of the binary circuit subsystem used as the standard must be frequently established by some other costlier, more time consuming method to insure that the test being performed is valid. The use of a captive standard, as required by this system, makes the system's use as a field test tool prohibitive, since a standard for each type of subsystem that might require testing must be carried by the field engineer.

SUMMARY OF THE INVENTION

It is therefore an object of this invention to provide a simplified, more reliable and faster method of determining if there are faults in a binary circuit subsystem.

Another object of this invention is to provide a simplified and more reliable method for identifying that portion or portions of a binary circuit subsystem having a fault or faults therein, once it has been determined that the binary subsystem has a fault therein.

Yet another object is to provide apparatus for quickly determining whether the binary circuit subsystem has faults therein that does not require use of a captive standard subsystem.

Still another object of this invention is to provide apparatus for identifying that portion or portions of a binary circuit subsystem that has faults therein once it has been determined that the binary circuit subsystem being tested has a fault therein.

The object and the general purpose of this invention are accomplished by periodically applying a plurality of binary signals in a pattern to the binary circuit subsystem being tested, the character of these binary signal patterns being influenced by the binary output signals received from the subsystem under test. If the character of the binary signals applied to the subsystem under test, after a certain number of periods, does not match the character of the binary signals derived under identical conditions for a known-to-be-good binary circuit subsystem, a fault is indicated. To identify the portion or portions of the binary circuit subsystem that contains a fault, a plurality of binary signals are periodically applied to the subsystem. At the same time, the binary signal output of each subsystem output connection point is monitored and counted. The number of binary signals for one application cycle at each output connection point is predetermined for a good binary circuit subsystem under a certain set of conditions. If the number of binary signals sensed for a particular subsystem output connection point under that same set of conditions does not match the predetermined number of binary signals, there is a fault in the circuitry of the subsystem connected to that particular output connection point.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein:

FIG. 26 is a diagram of the output signals of the stages in the binary word generator of FIG. 2 for 16 consecutive clock times, when operating in the fault-isolation mode.

FIG. 28 is a diagram illustrating the output signals of the stages in the binary word generator of FIG. 2 when operating in the fault-isolation mode to test the subsystem of FIG. 5.

FIG. 30 is a diagram showing the output signals, for 16 consecutive clock times, of the stages in the binary word generator of FIG. 2 while operating in the fault-isolation mode and connected to the subsystem of FIG. 8.

FIG. 34 is diagram illustrating the output signals, for 16 consecutive clock times, of the stages in the binary word generator of FIG. 15 when operating in the fault-isolation mode and connected to the subsystem of FIG. 15.

FIG. 36 is a diagram illustrating the output signals, for 16 consecutive clock times, of the stages in the binary word generator of FIG. 15 when operating in the fault-isolation mode and connected to the subsystem of FIG. 5.

DESCRIPTION OF THE PREFERRED EMBODIMENTS

FAULT-TESTING APPARATUS

Figure 1:
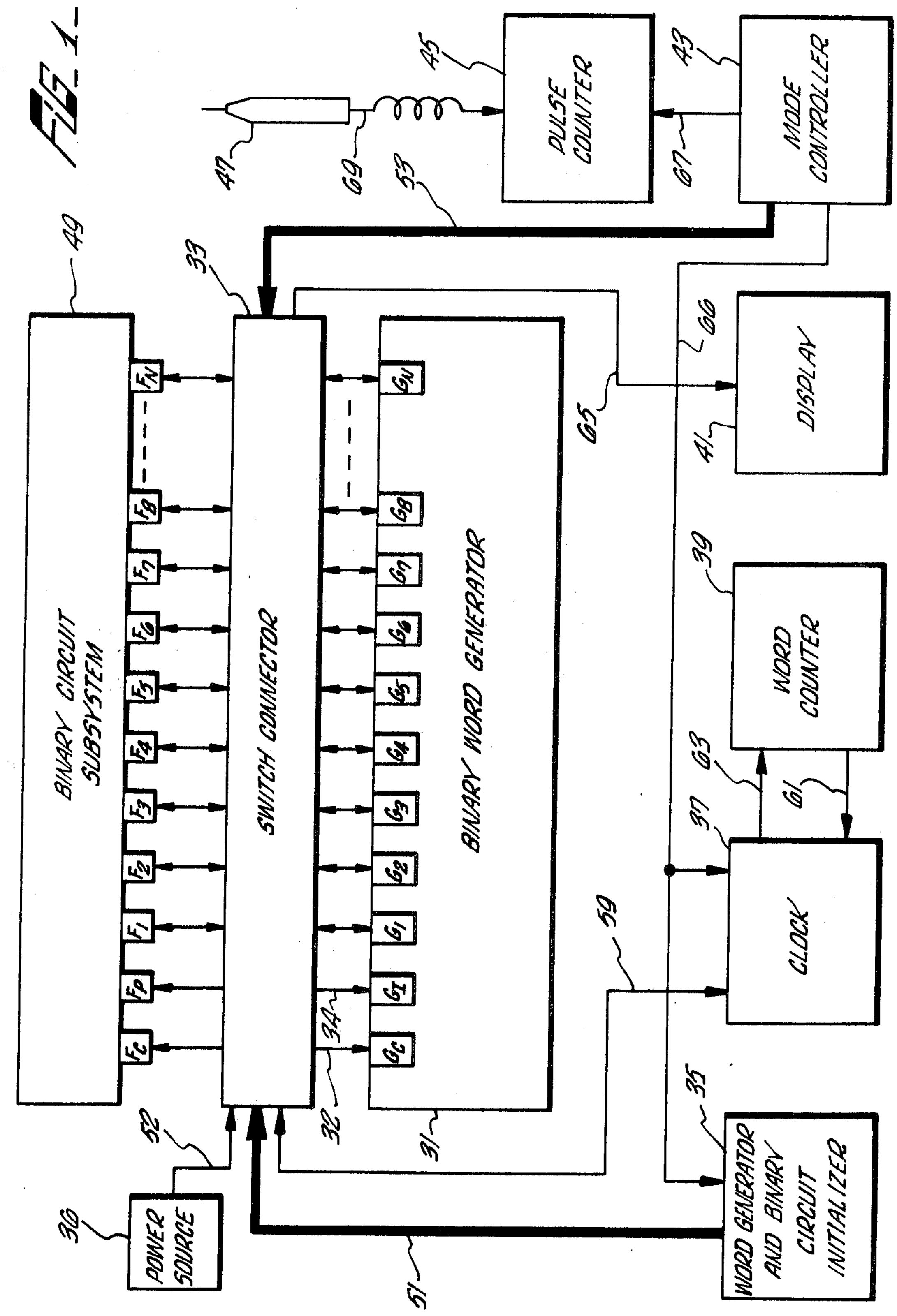
FIG. 1 is a block diagram representation of a fault-testing apparatus for binary circuits that embodies our invention.

Referring to FIG. 1, a preferred embodiment of a fault-testing apparatus for testing binary circuit subsystems for faults comprises: a binary word generator 31 connected through a switch connector 33 to a binary circuit subsystem 49, a word generator and binary circuit initializer 35, a clock 37, a word counter 39 for receiving signals from and sending signals to the clock, a display 41 for receiving signals from the binary word generator 31, a mode controller 43 for determining the test mode the apparatus is to operate in, a pulse counter 45 for receiving signals from a probe 47, and a power source 36.

The switch connecter 33 connects the connection points $F_1$ through $F_N$ of the binary circuit subsystem 49 to the termination points $G_1$ through $G_N$ of the binary word generator 31 by a pluraltiy of electronic switches, one switch for each subsystem-to-generator connection. The switch connector 33 may physically receive the binary circuit subsystem 49 by way of a socket that mates with the connection pins, F on the binary circuit subsystem. The socket may also receive clock pulse and power connection points $F_C$ and $F_P$ on the binary circuit subsystem. The socket or sockets that receive the binary circuit subsystem 49 are electrically connected to the binary word generator termination points $G_1$ through $G_N$ by the electronic switches in the connector 33. Clock signals and initializing the signals may be supplied to the binary word generator 31 over leads 32 and 34, respectively, through the switch connector 33.

Prior to initiation of an operating cycle for the fault testing apparatus of FIG. 1, the mode controller 43 directs the switches in the switch connector 33 to either close or open. If most of the switches are closed, thereby providing for maximum communication between the subsystem 49 under test and the word generator, the fault testing apparatus will be operating in the "go-no-go" mode. If only the switches that connect the output connection points of the binary circuit subsystem 49 to the input termination points of the word generator 31 are open, the fault testing apparatus will operate in the "fault-isolation" mode.

When the mode controller 43 is instructed to deliver signals over cable 53, to the switch connector 33 that sets the connector for "fault-isolation" operation of the apparatus, the mode controller also sends signals to the pulse counter 45, over line 67, to ensure the receptivity by the pulse counter 45 of pulses, on line 69, emminating from probe 47. Besides these control signals, mode controller 43 also sends signals to the clock 37, and the word generator and binary circuit initializer 35, over line 66, instructing them to start their cycle.

When the mode controller 43 is instructed to actuate the switches in the switch connector 33 so the fault-testing apparatus functions in the "go-no-go" mode, the mode controller 43 also sends start signals, over lines 66, to the word generator and binary circuit initializer 35 and the clock 37.

A mode controller 43 for generating binary signals in the manner recited above is well within the purview of a person of ordinary skill in the art and does not represent our invention.

The initializer 35 performs the primary function of setting the binary word generator 31 and the binary circuit subsystem 49 to a pre-determined initial or reference state, prior to the start of a test cycle. The reference state of the binary circuit subsystem 49 and the binary word generator 31 is evidenced by the combination of binary signals that appear at the output connection points of the binary circuit subsystem and at the output terminations of the binary word generator.

To ensure that the binary word generator is set to the desired reference state, prior to the start of every test cycle, a certain sequence of bits, one bit for each of the flip-flops in the word generator, is supplied, along with clock pulses, to these flip-flops, to set them in the states that will produce the binary word generator reference state.

The binary circuit subsystem, which may contain storage devices, flip-flops, latches, three and four bit registers, memory chips, and so on, is set to a reference state by applying a certain sequence of binary bits, along with clock pulses, if required, to the input connection points, or groups of input connection points on the binary circuit subsystem. For example, a particular sequence of bits may be chosen which will set the binary circuit subsystem to a reference state of zero, that is, the binary signals appearing at the connection points of the binary circuit are binary zeros or lows. If there are memory chips in the binary circuit subsystem, they may be cleared by applying all possible combinations of binary signals to the address lines while applying lows to the data input lines of the memory chips.

Apparatus to implement the above recited functions of the word generator and binary circuit initializer, that is, the generation of a certain pattern of signals to be sent over line 51 to the binary circuit subsystem and the binary word generator for initializing them in the manner described above is seen as well within the purview of a person of ordinary skill in the art and is not considered as our invention.

The clock 37, when started, periodically generates a clock pulse at a fixed rate, in a manner that is well known in the art. The frequency of the clock may be in the gigahertz range. The word counter 39 controls the number of clock pulses generated by the clock 37 for one test cycle. It monitors the number of clock pulses generated and stops the clock 37 when a predetermined number of clock pulses have been generated. By stopping the clock 37, the word counter effectively stops the binary word generator, thereby ending the test cycle.

The display 41 monitors the binary signal output of the binary word or signal generator 31 and may display the binary word output of the signal generator. An operator can compare the binary signals displayed at the end of a test cycle with sets of binary signals in a manual, the binary signals in the manual being the signals generated when a good identical subsystem was tested by the apparatus. Or, the display 41 may compare the signal output of the binary word generator at the end of a test cycle with stored binary signals that are the binary word output of a binary word generator when a good binary subsystem was tested under identical conditions. An indication, either oral or visual, may then be given to indicate whether the comparison results in a match or not, a match occurring only for a good binary circuit subsystem.

When the mode controller 43 sets the switch connector 33 so that the fault-testing apparatus functions in the "fault-isolation" mode, pulse counter 45 is also actuated. The pulse counter 45 receives binary signals sensed at the output terminations of the binary circuit subsystem under test. It counts these binary signals and either: 1. displays the count so an operator can make a comparison of the number displayed with a reference number in a manual, the number in the manual being the number counted for an identical but good binary circuit subsystem or, 2. automatically compares the number of pulses received during a test cycle with a stored number of pulses, this number also representing the number of pulses counted for an identical, good binary circuit subsystem. An indication, either oral or visual, may then be given to indicate whether a match occurred.

The pulse counter 45 receives pulse signals from the output connection points of the binary subsystem under test by means of a probe 47 over line 69. The probe 47 is a hand-manipulated electrical connector which is designed not to disturb the operation of the binary circuit subsystem, by unduly loading it, when placed into contact with the output connection points of the binary circuit subsystem under test. The probe 47 is moved from output connection point to output connection point by an operator, being held at each connection point for one complte test cycle. In this manner each output connection point is monitored to determine whether the fault is in the binary circuit connected to that connection point.

BINARY WORD GENERATOR OPERATING IN GO-NO-GO MODE

Figure 2:
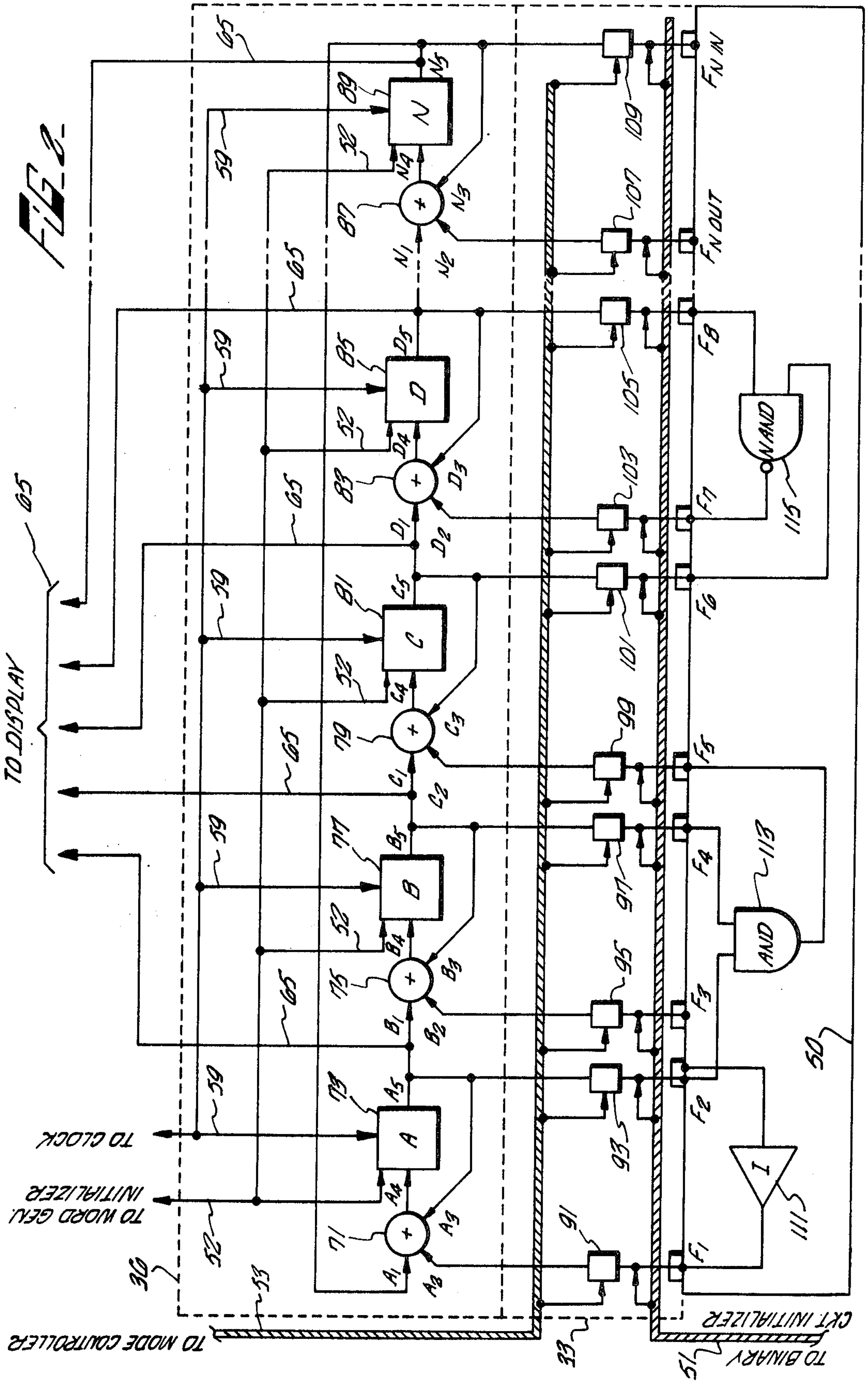
FIG. 2 is a block diagram illustrating the elements of a binary word generator and switch connector which may be used in the fault-testing apparatus of FIG. 1 connected to one example of a binary circuit subsystem.

The structural organization of a binary word generator 36 and its connection, through the switch connector 33, to a specific binary circuit subsystem 50 is illustrated in FIG. 2. The binar word generator 36 of FIG. 2 is shown as having four stages A, B, C, and D but expandable to any number of stages N.

Each stage in the binary word generator consists of an "Exclusive OR" gate, such as exclusive OR gate 71 in stage A, feeding its output signal to a bistable element, such as flip-flop 73 of stage A. The number of stages in the binary word generator 36 is governed by the number of electrically isolated input connection points on the binary circuit subsystem to be tested, an exact one-to-one relationship, being unnecessary.

The word generator can be expanded from four to N number of stages simply by adding stages to the last stage of the word generator. For example, the Nth stage is added to the fourth or D stage of the binary word generator of FIG. 2 by supplying the output of the flip-flop 85 in the D stage to the exclusive OR gate 87 of the Nth stage, and supplying the output of the flip-flop 89 in the Nth stage to the exclusive OR gate 71 of the first or A stage. If the Nth stage was not the last stage in the binary word generator, the output of the flip-flop 89 in the Nth stage would be supplied to the exclusive OR gate of a subsequent stage and the output of the flip-flop in that subsequent stage would be supplied to the exclusive OR gate of the first stage, A. The binary word generator may be contracted by simply removing stages.

For the purposes of explanation, the invention will first be described as embodied in a four stage binary word generator designed for testing a binary circuit subsystem having approximately four input connection points and four output connection points. It should be remembered however, that the word generator may be expanded or contracted to accommodate any number of output and input connection points on a binary circuit subsystem.

For a binary subsystem having eight access terminals, four input connection points and four output connection points, $2^4$ or 16 four bit binary signal combinations, (binary words) are required to apply all possible binary signal combinations to the four input connection points on the subsystem. However, the exact number of word applications used is not critical to the reliability of the test conducted by our invention. A greater or lesser number of word applications may be used. For example, $2^{20}$ or 1,048,576 binary signal combinations may be applied to a subsystem having four input connection points or a subsystem with 20 or more input connection points, with acceptable reliability in either case. With a clock frequency in the gigahertz range, over a million binary signal combinations can be applied to a subsystem in under two seconds.

In the embodiment of our invention shown in FIG. 2, the word generator 36 utilizes a three input exclusive OR gate for each stage of the four stage binary word generator. The first stage, stage A, of the binary word generator 31 consists of an exclusive OR gate 71 and a flip-flop 73. The input $A_1$ of the exclusive OR gate 71 receives signals from the output of the flip-flop 85 in the last stage D of the binary word generator. The input $A_2$ of the exclusive OR gate 71 in stage A is connected to an output connection point $F_1$ of the binary circuit subsystem 50. The input $A_3$ of the exclusive OR gate 71 in stage A is connected to the output $A_5$ of the flip-flop 73 in stage A. The output $A_4$ of the exclusive OR gate 71 in stage A is connected to an input of the flip-flop 73 of stage A. The output $A_5$ of the flip-flop 73 in stage A is connected to an input connection point $F_2$ of the binary circuit subsystem, to a display device 41 and, to an input $B_1$ of the exclusive OR gate 75 in the succeeding stage B.

Stage A, as well as all the other stages in the word generator 31, are supplied with clock pulses over line 59.

Exclusive OR gate 75 is in stage B of the word generator and is connected to the flip-flop 77, of stage B according to the same scheme that was used for interconnecting the exclusive OR gate 71 of stage A. Input $B_2$ is connected to a connection point $F_3$ of the binary circuit subsystem. Input $B_3$ is connected to the output $B_5$ of the flip-flop 77 of stage B. Input $B_1$ is connected to the output of the flip-flop 73 in the preceding stage A. Output $B_4$ of the exclusive OR gate 75 is connected to an input of the flip-flop 77 in stage B. The output $B_5$ of the flip-flop 77 in stage B is connected to an input connection point $F_4$ of the binary circuit subsystem, to a display 41 cable 65, and to an input $C_1$ of exclusive OR gate 79 in the succeeding stage C.

The other two inputs to the exclusive OR gate 79 of stage C are $C_2$ which is connected to a connection point $F_5$ on the binary circuit subsystem 50 and $C_3$ which is connected to the output $C_5$ of the flip-flop 81 in stage C. The output $C_4$ of the exclusive OR gate 79 in stage C is supplied to an input of the flip-flop 81 of stage C. The output $C_5$ of the flip-flop 81 of stage C is connected to a connection point $F_6$ of the binary circuit subsystem 50, to a display 41 over cable 65, and to one input $D_1$ of an exclusive OR gate 83 in the succeeding stage D of the binary word generator.

The other two inputs to the exclusive OR gate 83 of stage D are $D_2$ which is connected to a connection point $F_7$ on binary circuit subsystem 50 and $D_3$ which is connected to the output $D_5$ of the flip-flop 85 in stage D. The output $D_4$ of the exclusive OR gate 83 is supplied to an input of the flip-flop 85 in stage D. The flip-flop 85 of stage D receives clock signals over the common clock line 59. The signals appearing at the output $D_5$ of the flip-flop 85 in stage D are supplied to a display 41 over display cable 65 and to an input connection point $F_8$ of the binary circuit subsystem 50. Since this binary word generator 31 is considered to have only four stages, the output $D_5$ of the flip-flop 85 in stage D will also be supplied to an input $A_1$ of the exclusive OR gate 71 in stage A of the binary word generator 31.

If additional stages such as stage N are desired, stage N having an exclusive Or gate 87 and flip-flop 89 connected together in the manner recited for the previous four stages A, B, C, and D, stage N would be connected to the last stage, D of the binary word generator in the same manner that stage D is connected to stage C, stage C is connected to stage B, and stage B is connected to stage A.

The relationships of stages and Or gates to flip-flops, as above described may be used to expand the binary word generator to any number of stages desired.

All the stages A, B, C, D in the binary word generator 36 are initialized by supplying digital and clock signals to the flip-flops 73, 77, 81, and 85 in the stages over the initializing cable 52.

The input terminations $A_2$, $B_2$, $C_2$, $D_2$, and the output terminations $A_5$, $B_5$, $C_5$, $D_5$, of the binary word generator 36 are connected to the connection points $F_1$, $F_2$, $F_3$, $F_4$, $F_5$, $F_6$, $F_7$, $F_8$, on the binary circuit subsystem through a switch connector 33 which, as was noted earlier, consists of a plurality of electronic switch devices 91, 93, 95, 97, 99, 101, 103, and 105 which are actuated over a mode cable 53 to either open or close.

Switch 91 either connects or disconnects the output connection point $F_1$ on the binary circuit subsystem 50 to the input $A_2$ of the exclusive OR gate 71. Switch 93 either connects or disconnects the output $A_5$ of flip-flop 73 with an input connection point $F_2$ on the binary circuit subsystem. Switch 95 either connects or disconnects a connection point $F_3$ to input $B_2$ of exclusive OR gate 75. Switch 97 either connects or disconnects an output $B_5$ of flip-flop 77 to an input connection point $F_4$ on the subsystem. Switch 99 either connects or disconnects an output connection point $F_5$ on the binary subsystem to an input $C_2$ of exclusive OR gate 79. Switch 101 connects or disconnects connection point $F_6$ on the binary circuit subsystem 50 to output $C_5$ of the flip-flop 81. Switch 103 either connects or disconnects output connection point $F_7$ to an input $D_2$ of the exclusive OR gate 83. Switch 105 either disconnects or connects the output $D_5$ of the flip-flop 85 in stage D to an input termination $F_8$ on the binary circuit subsystem 31.

Switches 107 and 109 connect or disconnect any subsequent stage N consisting of an exclusive OR gate 87 and a flip-flop 89 to the binary circuit subsystem in the same manner as in the previous four stages. This Nth stage could be used if there were additional electrically independent correction points on the subsystem to be tested.

To illustrate the operation of the binary circuit subsystem fault-tester and particularly the operation of the binary word generator in the fault-tester, a specific binary circuit subsystem 50 has been connected to the binary word generator 36 of FIG. 2.

Binary circuits to make up the subsystem were chosen so that only four stages would be required in the binary word generator, thus simplifying the explanation of the operation of this invention. The binary circuits of subsystem 50 are: an inverter 111, having its input connected to connection point $F_2$ and its output connected to connection point $F_1$; AND gate circuitry 113 having one input connected to connection point $F_2$, the other to connection point $F_4$, ane its output connected to connection point $F_5$; and NAND circuitry 115 having one input connected to connection point $F_6$, its other input connected to connection point $F_6$, and its output connected to connection point $F_7$.

The circuitry of this particular binary subsystem requires four input signals and generates three output signals. A four stage binary word generator, according to our invention generates four output signals and receives four input signals. The binary word generator will however, function in the desired fashion even though a 1:1 relationship does not exist between the number of inputs and outputs of the word generator and subsystem.

In the particular example of FIG. 2, connection point $F_3$ has no circuitry connected to it. This connection point represents either a termination or a non-existent connection point. Therefore, an input signal would not be supplied to the binary word generator 36 at input termination $B_2$. In such a case the switch 95 in the signal path between $F_3$ and $B_2$ may be left open at all times. This invention will function properly even if all the input terminations $A_2$, $B_2$, $C_2$, $D_2$ of the binary word generator 36 are not fed by output signals from the binary circuit subsystem being tested.

Prior to the start of a test cycle, which will determine whether the binary circuits 111, 113 and 115 of the binary subsystem 50 are functioning properly, the binary word generator 36 and the binary circuits in the subsystem 50 must be set to reference states or initialized.

Prior to the initializing cycle, an operator chooses the mode of operation for the fault-testing apparatus. As noted earlier, the apparatus will operate in the go-no-go mode if most of the switches 91 to 105 that connect the binary word generator 36 to the binary circuit subsystem 50 are closed. The apparatus will operate in the fault-isolation mode if the switches 91, 99 and 103 that connect the output connection points of the binary circuit subsystem to the input terminations of the binary word generator are open.

After an operating mode has been chosen and before the start of the test cycle, the binary circuit subsystem must be set to a reference state or initialized. The particular manner in which a binary circuit subsystem is initialized will depend on the binary circuits that make up the subsystem. In the particular example of FIG. 2, the binary circuit subsystem can be initialized to the reference state 1 0 0 0 0 0 1 0 by simply applying binary 0 signals or lows to all the input connection points $F_2$, $F_4$, $F_6$, and $F_8$ on the subsystem.

After the subsystem has been initialized, the binary word generator must be initialized. The binary word generator may be initialized to a reference state 0000 by simply applying an initializing pulse over line 57 and a clock pulse over line 59 to each flip-flop 73, 77, 81, and 85, thereby setting each flip-flop in a state that will produce a binary 0 or low at their respective outputs $A_5$, $B_5$, $C_5$ and $D_5$.

It should be understood that the particular reference state chosen in this instance need not be the only reference state used. However, once a reference state for the binary word generator and a particular binary circuit subsystem has been chosen those respective states must be used consistently, otherwise, the tests will not be reliable.

Since a four stage binary word generator was chosen to illustrate our invention, the operation of the binary word generator will be described for sixteen consecutive clock times. However, it should be remembered that in practice one test cycle may consist of a million and one-half or more, clock times, generated in a span of seconds.

For the sake of simplicity of explanation, it has been assumed that positive going logic is used in the word generator and the subsystem. However, negative going logic could be used throughout, just as well.

Figure 3A:
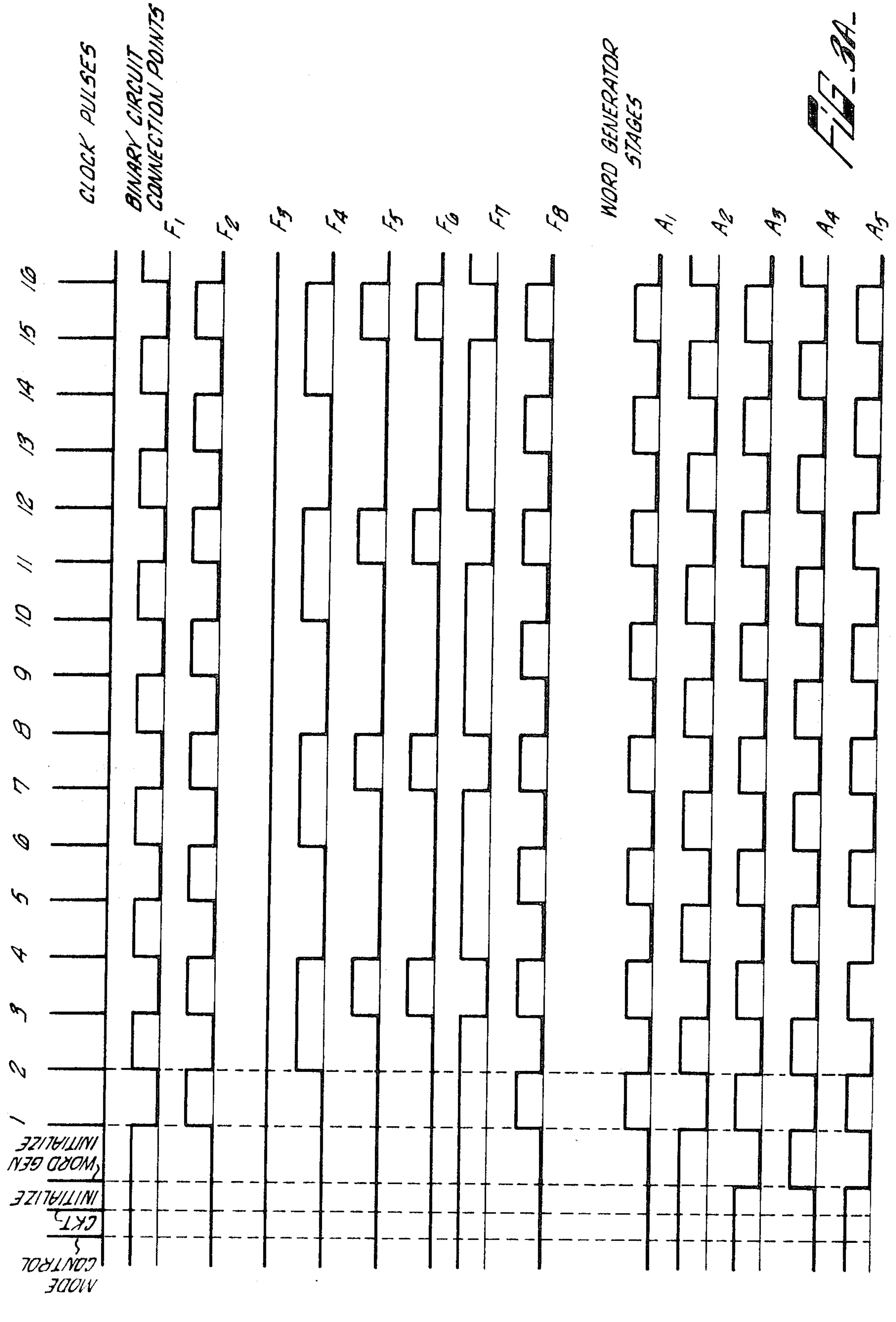
FIG. 3A, B is a pulse diagram illustrating the signals present in the binary word generator and at the subsystem of FIG. 2 during the operation of the binary word generator for one test cycle in the go-no-go mode.
Figure 3B:
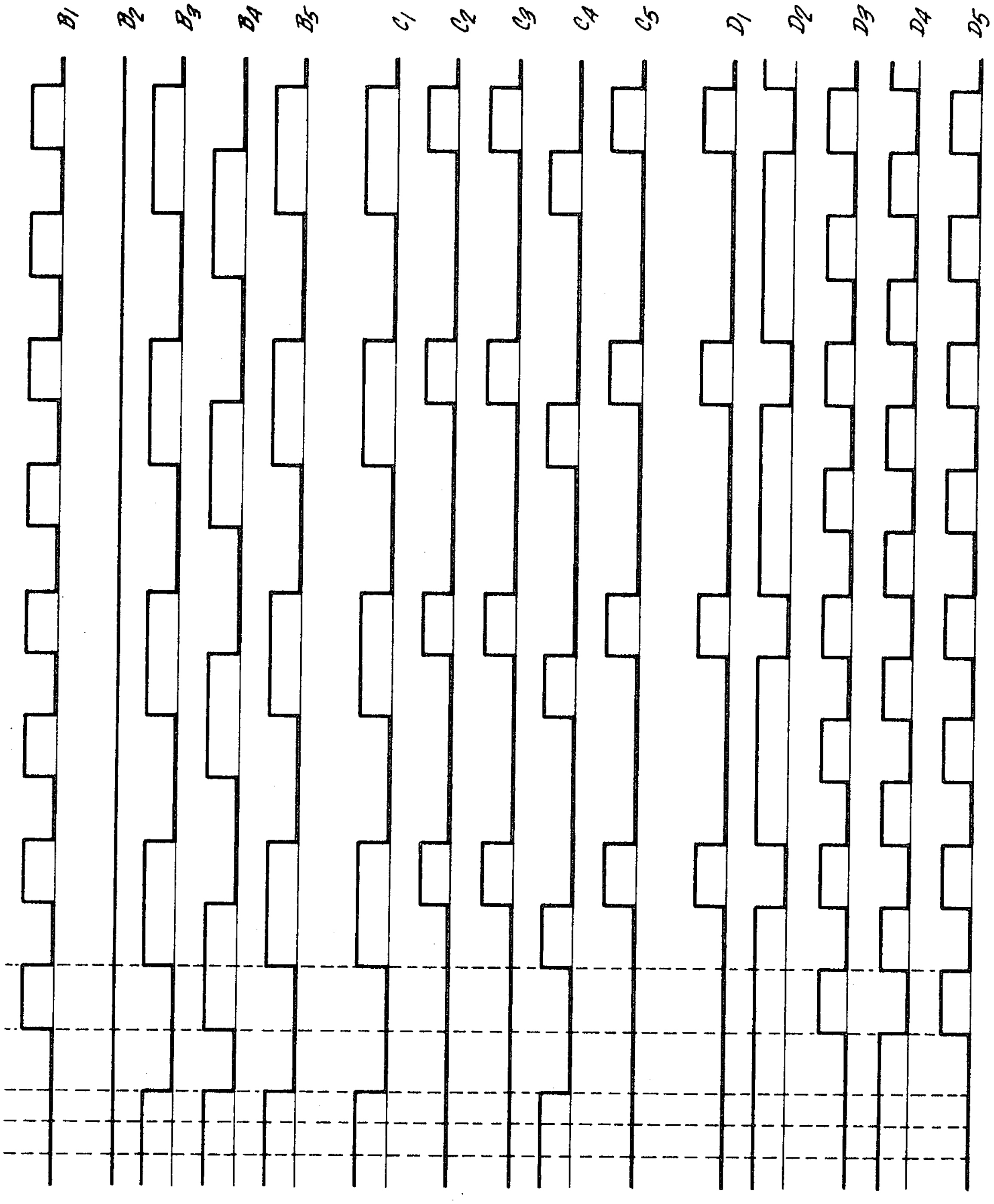

Assuming the subsystem and binary word generator were initialized to the states above described, the binary word generator 36 will have a low (zero) at each of its outputs $A_5$, $B_5$, $C_5$ and $D_5$ just prior to the start of the test cycle. The signals appearing at output connection points $F_1$ through $F_8$ for each clock time from 1 to 16 are shown in FIG. 3 A. Just prior to the first clock pulse and after the initialization cycle, connection points $F_1$ and $F_7$ on the binary circuit subsystem will be high while connection points $F_2$ through $F_6$ and $F_8$ on the subsystem will be low.

At this time, three inputs $A_1$, $A_2$, $A_3$ to exclusive OR gate 71 in stage A will have two lows and one high, input $A_2$ being high, thereby causing output $A_4$ to be high. Output $A_4$ of OR gate 71 is applied to the input of the flip-flop 73 of stage A. The three inputs $B_1$, $B_2$, $B_3$ to the exclusive OR gate 75 in stage B of the binary word generator 31 will have three lows thereby causing a low at output $B_4$ to be applied to the flip-flop 77 of stage B. The three inputs $C_1$, $C_2$, $C_3$ to the exclusive OR gate 79 in stage C of the binary word generator 31 will also have three lows causing the output $C_4$ of the exclusive OR gate 79 to be low. The three inputs $D_1$, $D_2$, $D_3$ to the exclusive OR gate 83 will have two lows and a high, thereby causing OR gate 83 to provide a high to the input of flip-flop 85 of stage D. The output of the flip-flop 85 of stage D is a low.

At the occurrence of the first clock pulse, the flip-flop 73 in stage A of the binary word generator will change its state and produce a high at its output $A_5$, because a binary one input was being supplied while a clock pulse was delivered to the flip-flop. This high is supplied as an input $A_3$ to exclusive OR gate 71, as an input $B_1$ to exclusive OR gate 75, to a display unit 41 and to input connection point $F_2$ on the subsystem. The output $B_5$ of the flip-flop 77 in stage B of the binary word generator will not change, nor will the output $C_5$ of the flip-flop 81 in stage C, because a low was being supplied to them when the first clock pulse occurred. However, the flip-flop 85 in stage D will change state causing a high to appear at output $D_5$, because a high was being supplied at its input when the first clock pulse occurred. The high on output $D_5$ of the flip-flop 85 in the last stage D of the binary word generator 31 is supplied as an input $A_1$ to the exclusive OR gate 71 in the first stage A of the binary word generator as an input $D_3$ to the exclusive OR gate 83 of the last stage D of the binary word generator to a display unit 41 and to input connection point $F_8$ on the subsystem.

Therefore, the binary word output, after the first clock pulse of the four stage binary word generator is 1 0 0 1. This word is supplied to th input connection points $F_2$, $F_4$, $F_6$ and $F_8$ on the binary subsystem 50.

Just prior to the occurrence of the second clock pulse and after the occurrence of the first clock pulse, a high is being supplied to connection point $F_2$, a low to connection point $F_4$, a low to connection point $F_6$, and a high to connection point $F_8$. In response to this binary word, the subsystem 50 produces a low at connection point $F_1$, a low at connection point $F_5$, and a high at connection point $F_7$.

In response to this output from the subsystem, the three inputs $A_1$, $A_2$ and $A_3$ of the exclusive OR gate 71 in the first stage, A of the binary word generator are high, low, high, $A_2$ being low, the output $A_4$ therefore being low. The three inputs $B_1$, $B_2$ and $B_3$ of the exclusive OR gate 75 of stage B of the binary word generator are two lows and one high, $B_1$ being high. Therefore, the output $B_4$ of the exclusive OR gate 75 is high. The three inputs $C_1$, $C_2$, $C_3$ of the exclusive OR gate 79 are three lows. Therefore, the output $C_4$ is a low. The three inputs $D_1$, $D_2$ and $D_3$ of the exclusive OR gate 83 in stage D of the binary word generator are two highs and one low, $D_1$ being low. Therefore, the output $D_4$ of the exclusive OR gate 87 is a low.

At the occurrence of the second clock pulse, the flip-flop 73 in stage A of the binary word generator 31 will change its state producing a low at its output $A_5$, because a low was presented to it at $A_4$ when a clock pulse occurred on line 52. The flip-flop 77 in stage B will also change its state producing a high at its output $B_5$, because a high was presented to it at $B_4$ when a clock pulse occurred on line 52. The flip-flop 81 will not change state, leaving a low at output $C_5$, because a low was presented to it at $C_4$ when a clock pulse occurred on line 52. The flip-flop 85 in stage D of the binary word generator will change its state to produce a low at its output $D_5$ because a low was presented to its input at $D_4$ when a clock pulse occurred. The binary word generated at the occurrence of the second clock pulse, therefore, is 0 1 0 0.

This word is supplied in parallel to the binary circuit subsystem 50 at connection points $F_2$, $F_4$, $F_6$ and $F_8$. The response of the binary circuits in the subsystem to this word is to place a high at connection point $F_1$. Therefore, the output connection points $F_1$, $F_5$ and $F_7$ of the binary circuit subsystem are 1 0 1 respectively.

Subsequent to the occurrence of the second clock pulse but previous to the occurrence of the third clock pulse, the three inputs $A_1$, $A_2$ and $A_3$ of the exclusive OR gate 71 in the first stage A of the binary word generator will be two lows and one high, $A_2$ being high, causing output $A_4$ to be high. The three inputs $B_1$, $B_2$, $B_3$ of the exclusive OR gate 75 in stage B of the binary word generator will be two lows and one high, $B_3$ being high, causing output $B_4$ to be high. The three inputs $C_1$, $C_2$, $C_3$ of the exclusive OR gate 79 in stage C of the binary word generator will be two lows and one high, $C_1$ being high, causing output $C_4$ to be high. The three inputs $D_1$, $D_2$ and $D_3$ of the exclusive OR gate 83 in stage D of the binary word generator will be two lows and one high, $D_2$ being high, causing the output $D_4$ to be high.

At the occurrence of the third clock pulse, the output $A_5$ of the flip-flop in stage A will go high because it changed state, due to a high input at $A_4$ when the third clock pulse occurred. The output $B_5$ of the flip-flop 77 in stage B will go high as will the outputs $C_5$ of the flip-flop 81 in stage C and the output $D_5$ of the flip-flop 85 in stage D. The binary word output of the word generator 31 at the occurrence of the third clock pulse will therefore be 1 1 1 1. With highs being applied to connection points $F_2$, $F_4$, $F_6$ and $F_8$ on the binary circuit subsystem, the binary circuits in the subsystem respond to generate a low at connection points $F_1$ and $F_7$ and a high at connection point $F_5$.

Therefore, just prior to the occurrence of the fourth clock pulse, the three inputs $A_1$, $A_2$, and $A_3$ of the exclusive OR gate 71 in stage A of the binary word generator will be two highs and one low, $A_2$ being low. The signals on inputs $B_1$, $B_2$ and $B_3$ of OR gate 75 will be two highs and one low, $B_2$ being low. The signals on inputs $C_1$, $C_2$ and $C_3$ of OR gate 79 will be three highs. The signals on inputs $D_1$, $D_2$ and $D_3$ of OR gate 83 will be two highs and one low, $D_2$ being low. The outputs $A_4$, $B_4$, $C_4$ and $D_4$ of the exclusive OR gates 71, 77, 81 and 85 respectively, which are supplied to the flip-flop 73, 77, 81 and 85, are all low as a consequence of the combinations of input signals supplied to their OR gates. At the occurrence of the fourth clock pulse, therefore, the outputs $A_5$, $B_5$, $C_5$ and $D_5$ of the flip-flop 73, 77, 81 and 85 respectively will be low, thereby generating the word 0 0 0 0.

The application of this word to the connection points $F_2$, $F_4$, $F_6$ and $F_8$ on the binary circuits causes the subsystem to respond by generating a low at connection point $F_5$ and highs at connection points $F_1$ and $F_7$.

The three inputs $A_1$, $A_2$ and $A_3$ to the exclusive OR gate 71 in stage A, prior to the fifth clock pulse, will therefore be two lows and one high, $A_2$ being high. The inputs $B_1$, $B_2$, $B_3$ of the exclusive OR gate 75 in stage B will be low. Inputs $D_1$, $D_2$, $D_3$ of the exclusive OR gate 83 in stage D will be two lows and one high, input $D_2$ being high.

At the occurrence of the fifth clock pulse, the flip-flop 73 in stage A will change its state producing a high at its output $A_5$. The flip-flop 77 in stage B will not change its state leaving its output $B_5$ at a low. The flip-flop 81 in stage C will not change state, leaving its output $C_5$ at a low. The flip-flop 85 of stage D will change its state, changing the signal at its output $D_5$ to a high. Therefore, the word 1 0 0 1 is generated by the binary word generator and applied to the binary circuit subsystem during the fifth clock pulse.

The binary circuit subsystem will respond to this word in the same manner that it responded to the same word during the first clock pulse. As can be seen from FIG. 4, the binary words being generated by the binary word generator 36 of this invention while connected to the binary circuit subsystem 50 of FIG. 2, will cycle every four clock pulses. Thus, the binary word generated during the sixteenth clock pulse will be 0 0 0 0.

The operation of the binary word generator as above described is illustrative of its function in response to a binary circuit subsystem containing no faults. The binary word generated during the sixteenth clock pulse when connected to a good subsystem can be taken as the binary word or arrangement of binary signals that is characteristic of a good binary circuit subsystem having that particular circuit structure.

The cyclic manner of word generation displayed by the binary word generator 36 when connected to the subsystem 50 of FIG. 2 is not necessarily indicative of its word generation function generally. The word generator 36 generates words whose characteristics change, cyclically in this case, as a function of the particular binary circuits in the subsystem being tested. Other, different binary circuits will cause the binary word generator to generate different binary words, in a different sequence.

Having established a characteristic word for the binary circuit subsystem 50 of FIG. 2 for one test cycle, this word should appear every time a sixteen clock time test cycle is run on this particular subsystem when the binary word generator is initialized so that its four stages produce a low at their outputs and the subsystem is supplied with lows at their input connection points $F_2$, $F_4$, $F_6$ and $F_8$. If there is a fault in the binary circuit subsystem, that is, it is not working correctly, the word generated after one test cycle should not be the characteristic word.

Figures 4, 5, 7:
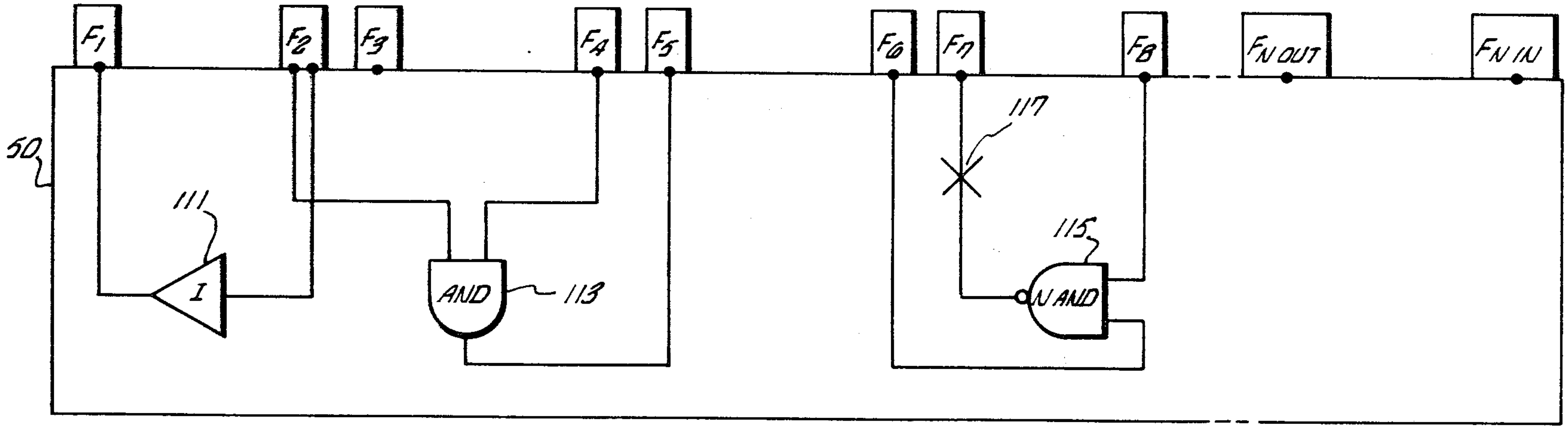
FIG. 4 is a diagram illustrating the binary output signals, for 16 consecutive clock times, of the stages in the binary word generator of FIG. 2.
FIG. 5 diagramatically illustrates the binary circuit subsystem of FIG. 2 with a fault therein.
FIG. 7 is a diagram showing the binary output signals, for 16 consecutive clock times, of the stages of the binary word generator of FIG. 2, when connected to the subsystem of FIG. 5.

FIG. 5 illustrates the binary circuit sybsystem 50 of FIG. 2 with a fault 117 introduced therein. This fault, for explanation purposes, has been assumed to be a break in the conductor between connection point $F_7$ and the output of NAND logic circuit 115. This break in the conductor connected to connection point $F_7$ will influence the character of the words generated by the binary word generator. Because of the fault, the output connection point $F_7$ will be continuously low whereas, if there was no fault it would be high most of the time, as evidenced by the pulse diagrams of FIG. 3.

Assuming now that the binary circuit subsystem 50 of FIG. 5 with a fault 117 therein is to be tested to determine whether the subsystem is operating correctly, the fault-testing apparatus will be set to operate in the go-no-go mode, as explained above. The binary circuit subsystem is initialized, as explained above, by applying the same binary signals to the input connection points $F_2$, $F_4$, $F_6$ and $F_8$ of the subsystem. The word generator is initialized to the same initial state used for the subsystem of FIG. 2.

After the initialization cycle, but prior to the first clock pulse, the inputs $A_1$, $A_2$, $A_3$ of the exclusive OR gate 71 in stage A will be low, high, low respectively, thereby causing the output $A_4$ of OR gate 71 to be high. Inputs $B_1$, $B_2$, $B_3$ of exclusive OR gate 75 in stage B will be low, low, low, causing the output $B_4$ to be low. The inputs $C_1$, $C_2$, $C_3$ of the exclusive OR gate 79 in stage C will be low, low, low causing the output $C_4$ to be low. The inputs $D_1$, $D_2$, $D_3$ of the exclusive OR gate 83 in stage D will be low, low, low, causing the output $D_4$ to be low.

At the occurrence of the first clock pulse, flip-flop 73 of stage A will generate a high at its output $A_5$ because of the high it received at $A_4$. But, the remaining stages B, C, and D will not change their state and their outputs will remain low. The binary word generated at the first clock pulse therefore, is 1 0 0 0. Supplying this binary word to the binary circuit subsystem 50 of FIG. 5 which contains fault 117 causes a high to appear at output connection point $F_1$, and lows at connection points $F_5$ and $F_7$ of the binary circuit subsystem.

Figure 6A:
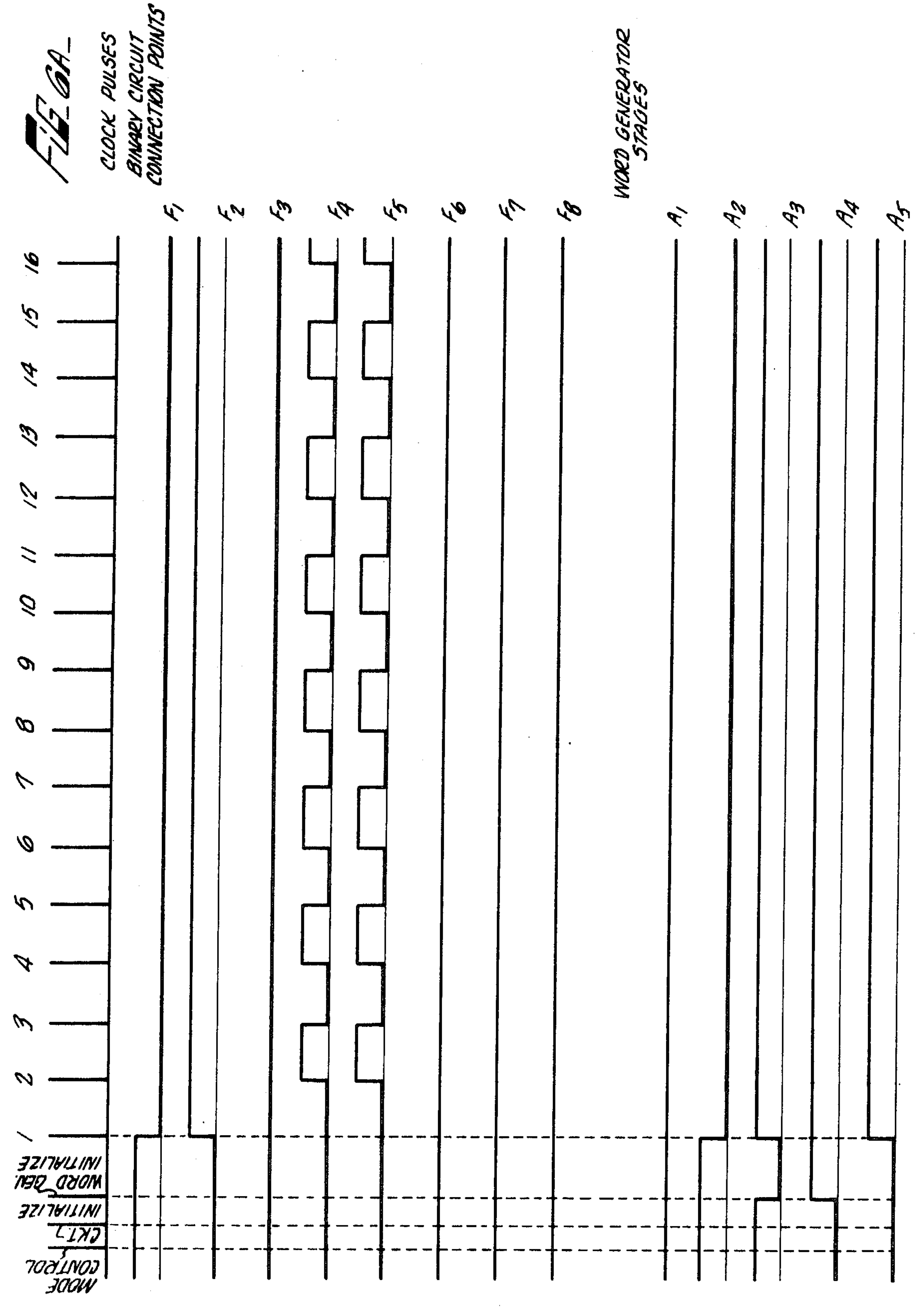
FIG. 6A, B is a pulse diagram illustrating the signals present in the binary word generator of FIG. 2 and at the connection points of the subsystem of FIG. 5 during the operation of the binary word generator for one test cycle in the go-no-go mode.
Figure 6B:
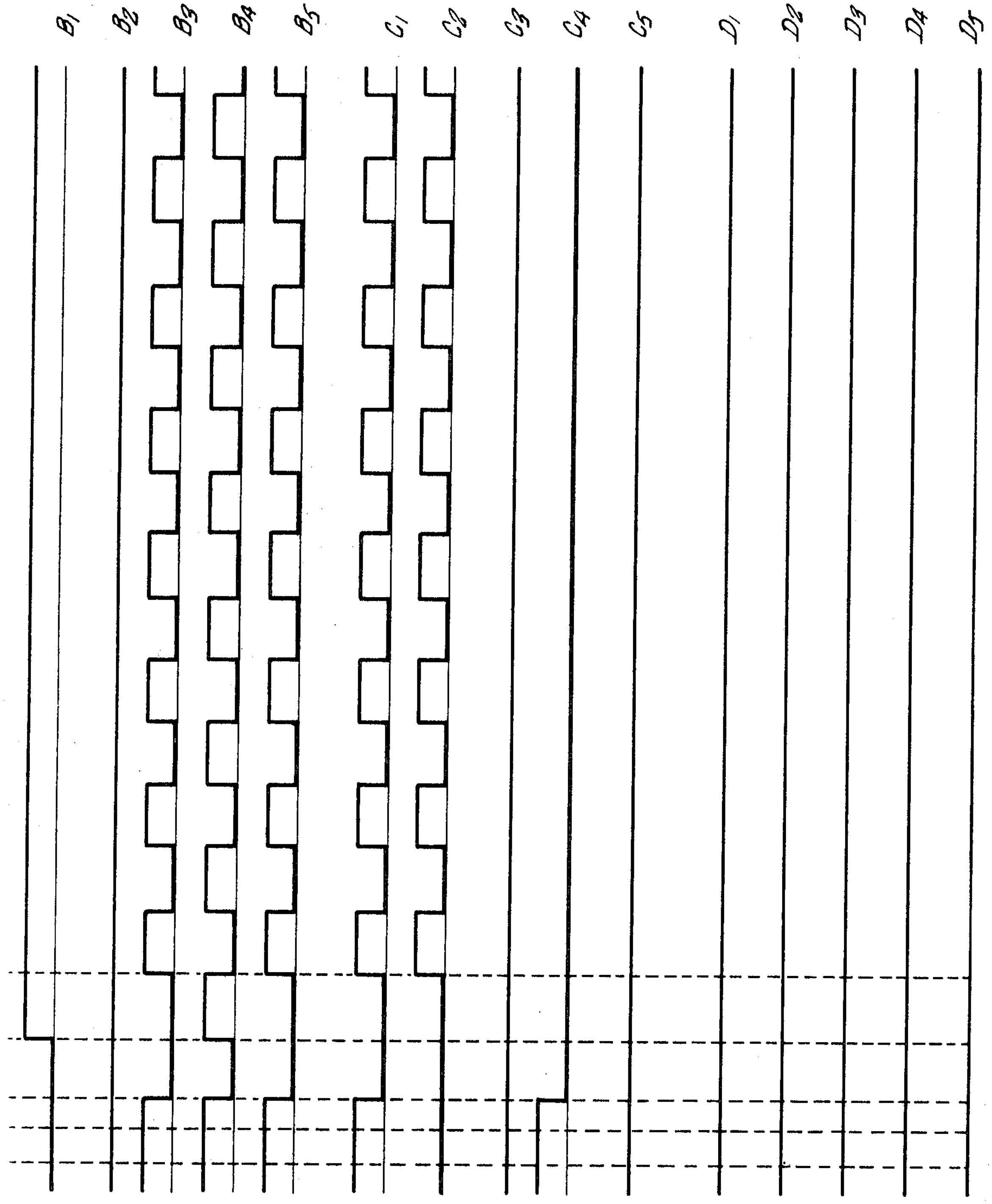

The binary word generator will continue through the test cycle for sixteen consecutive clock times in the manner illustrated by the pulse in FIG. 6 A and B. FIG. 7 illustrates the words generated, at each of sixteen clock times, by the binary word generator when connected to the subsystem 50 of FIG. 5. It is evident from FIG. 7 that after the sixteenth clock pulse the binary word generated by the generator 36 is 1 1 0 0.

Comparing this binary word with the characteristic binary word that was generated when the same binary circuit subsystem containing no faults was tested, indicates that they do not match. The test of the binary circuit subsystem that had no fault in it resulted in the binary word 0 0 0 0. Since the two words do not match, a fault in the subsystem is indicated.

The binary circuit fault-tester of this invention will generally function in the manner above described for any binary circuit configuration in the binary circuit subsystem, for any number of subsystem output connection points, for any number of faults in the subsystem, and for an appropriate number of word applications. It should be remembered, however, that as the number and randomness of the word applications increases, the reliability of the test also increases.

To illustrate the response of the fault tester to a different subsystem, a slightly more complex binary circuit subsystem 119 will be tested by the fault-testing apparatus of FIG. 2. Although the structure of the binary circuit subsystem 119 ahown in FIG. 8 is drastically different from the binary circuit subsystem 50 of FIG. 2, the subsystem has the same number of connection points $F_1$ through $F_8$.

Connection point $F_1$ of subsystem 119 is connected to a lead 141 which is the output of OR gate circuitry 125. Connection point $F_2$ is connected to the triggering input of a flip-flop 121. Connection point $F_3$ is connected to the zero output side of the flip-flop 121. Connection point $F_4$ is connected to the triggering input of another flip-flop 123. Connection point $F_5$ is connected to the zero output side of the flip-flop 123. Connection point $F_7$ is connected to a conductor 139 which is the output conductor for the logic circuit 120, outlined in dashed lines.

Logic circuit 120 has an input 135 from the binary one output side of flip-flop 121 and another input 137 from the binary one output side of flip-flop 123. The binary logic circuit 120 consists of an inverter 127 connected to an AND gate 129, the outputs of AND gate 129 and an OR gate 131 serving as inputs to another AND gate 133.

Figures 8, 10, 11:
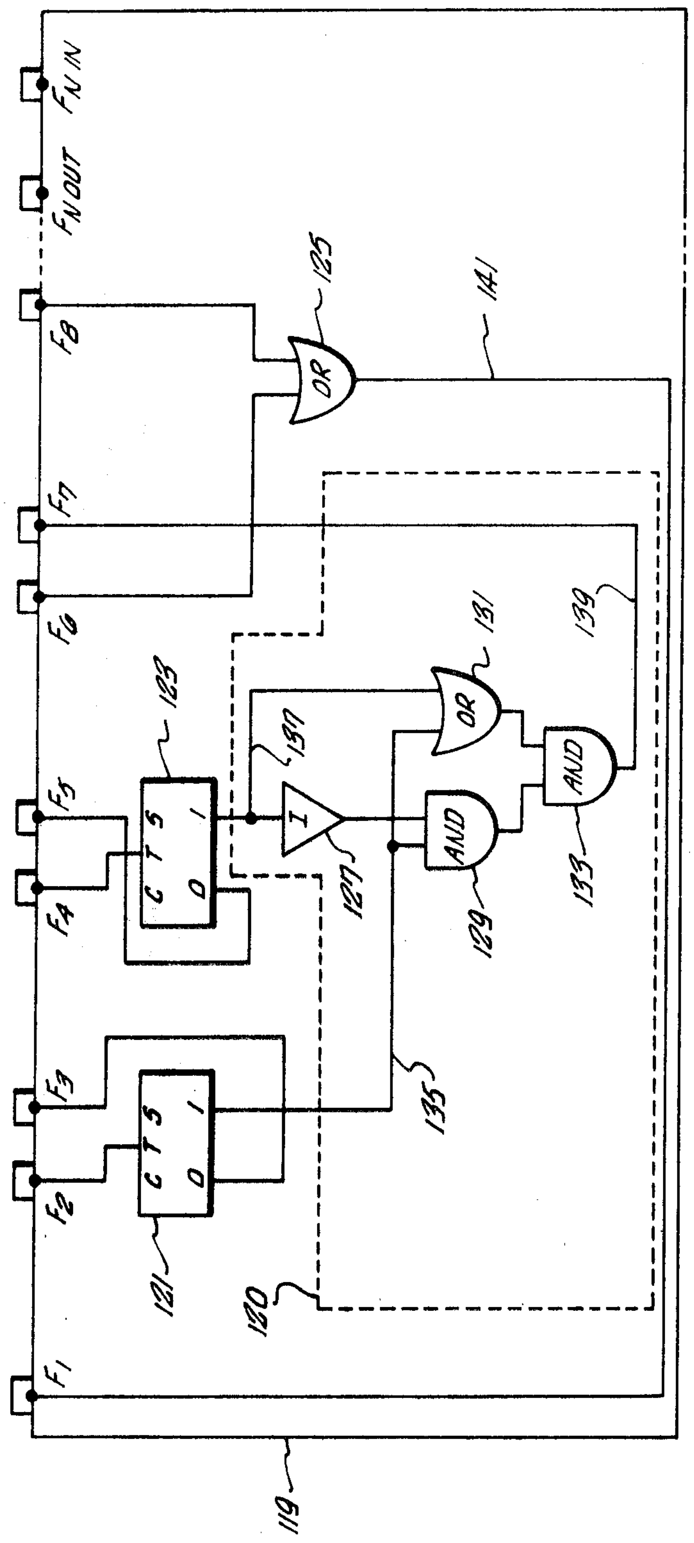
FIG. 8 diagramatically illustrates another example of a binary circuit subsystem.
FIG. 10 is a truth table showing the possible input and output signals of a section of the binary subsystem of FIG. 8.
FIG. 11 is a diagram indicating the output signals, for 16 consecutive clock times, of the stages of the word generator of FIG. 2 when responding to the subsystem of FIG. 8.

The truth table for the logic circuit 120 is shown in FIG. 10. The table shows that whenever the signal on input lead 135 to the logic circuit 120 is low, the signal on the output lead 139 will also be low. If the signal on input lead 135 is high and the signal on input lead 137 is high the signal on output lead 139 will be low. But, if the signal on input lead 139 is high and the signal on input lead 137 is low the signal on output lead 139 will be high. In other words, the only time the signal on output lead 139 will be high is when the signal on input lead 135 is high and the signal on input lead 137 is low.

Flip-flops 121 and 123 are standard complementing-type flip-flops that change their state every time a positive going pulse occurs at the triggering input termination T, assuming that positive logic is used. If negative logic was being used these flip-flops would be triggered by negative going pulses.

Although the binary circuit subsystem 119 of FIG. 8 is connected to the binary word generator 36 of FIG. 2, instead of the binary circuit subsystem 50 of FIG. 2, the operating mode selection and the initializing cycles will be performed in the same manner as explained above.

Assuming that the binary circuit subsystem 119 has been initialized to the state 0 0 1 0 1 0 0 0 for connection points $F_1$ through $F_8$ respectively, and that the word generator 31 has been initialized to 0 0 0 0, the input signals to the exclusive OR gates 71, 75, 79 and 83 of the four stages A, B, C, D of the binary word generator 36 will be as follows.

Prior to the first clock pulse, the three inputs $A_1$, $A_2$, and $A_3$ of the exclusive OR gate 71 in stage A will be low, low, low causing the output $A_4$ to be low. The three inputs, $B_1$, $B_2$ and $B_3$ of the exclusive OR gate 75 in stage B will be low, high, low, input $B_2$ being high, causing output $B_4$ to be high. The three inputs $C_1$, $C_2$ and $C_3$ of exclusive OR gate 75 in stage C will be low, high, low input $C_3$ being high, causing output $C_4$ to be high. The three inputs $D_1$, $D_2$ and $D_3$ of exclusive OR gate 83 in stage D will be low, low, low, causing input $D_4$ to be low.

Figure 9A:
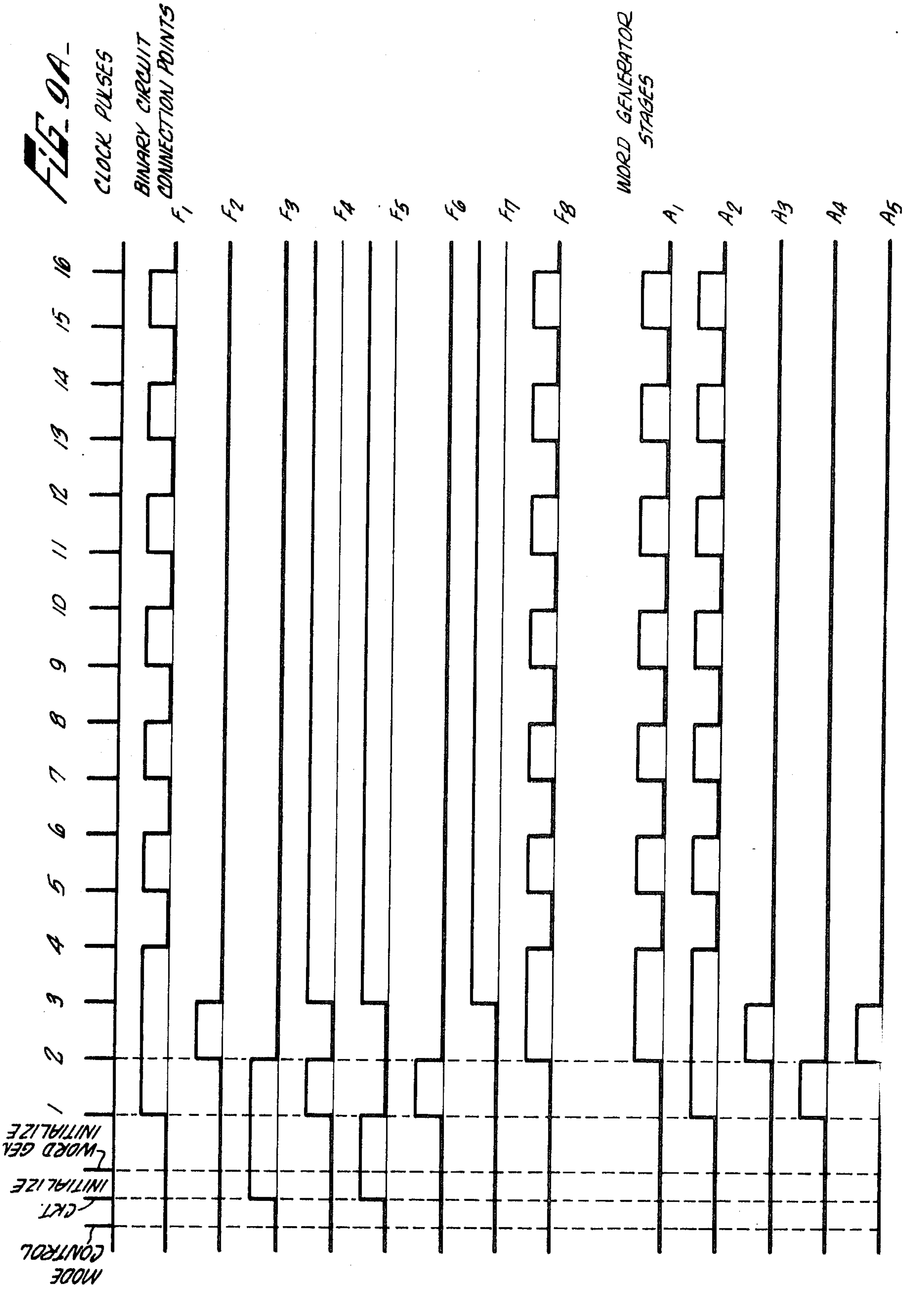
FIG. 9A, B is a pulse diagram showing the signals present in the binary word generator of FIG. 2 and at the connection points of the subsystem of FIG. 8 during the operation of the binary word generator for one test cycle in go-no-go mode.
Figure 9B:
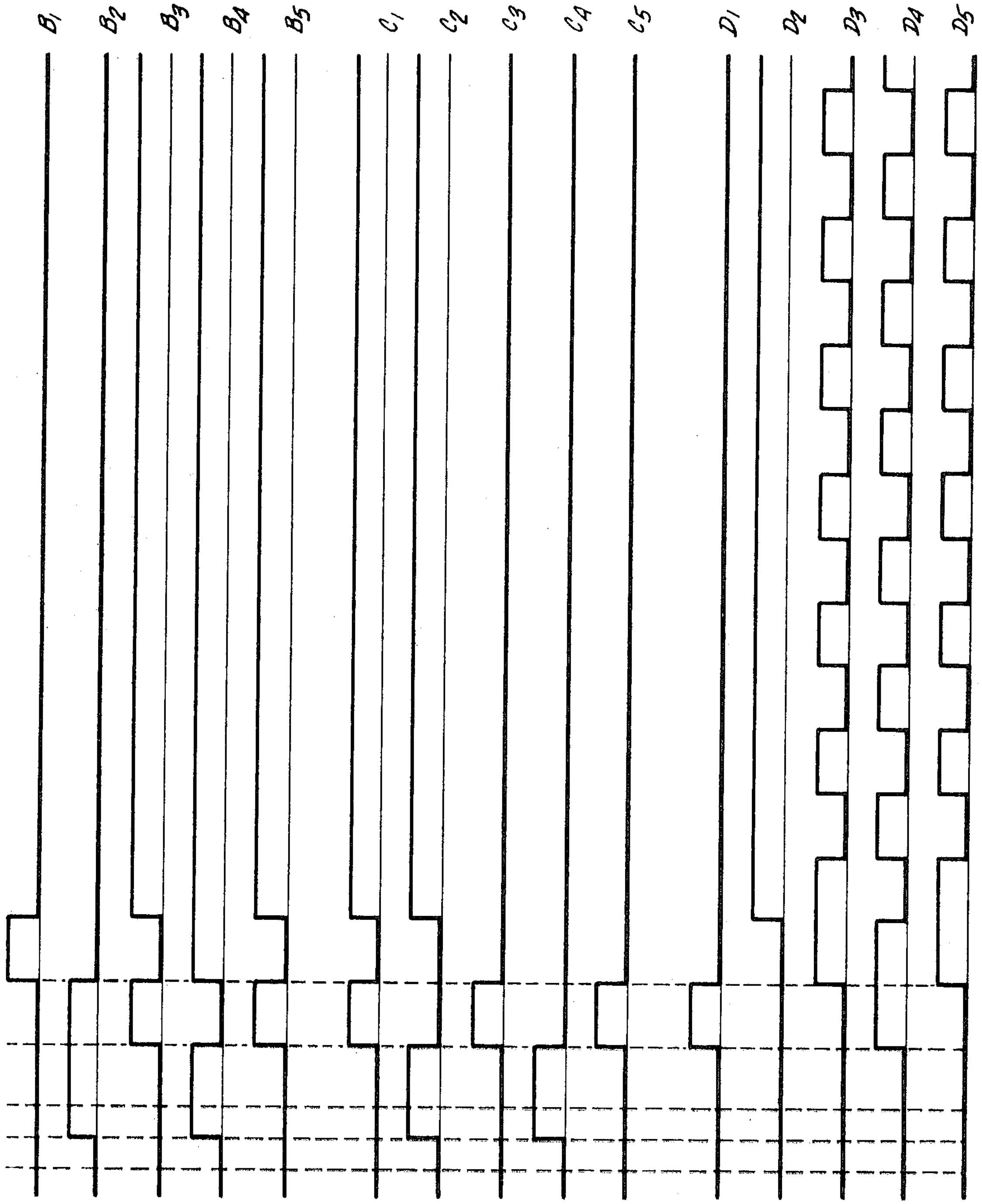

At the occurrence of the first clock pulse the outputs $A_5$, $B_5$, $C_5$ and $D_5$ of the four stages A, B, C, and D will be 0 1 1 0 respectively. Therefore, the binary word generated by the binary word generator 33 at the first clock time is 0 1 1 0. This word is applied to the subsystem 119 and the cycle will continue, as explained above, for 16 clock times, the binary word generated for each clock time being shown in FIG. 11. The signals at specific points in the binary word generator and at the binary circuit subsystem connection points for each clock time are illustrated in FIG. 9 A and B.

As can be seen from FIG. 11 the binary word generated during the sixteenth clock pulse is 0 1 0 0. Since the subsystem 119 of FIG. 8 has no faults, this word is the characteristic binary word for this particular binary circuit subsystem.

Figures 12, 14:
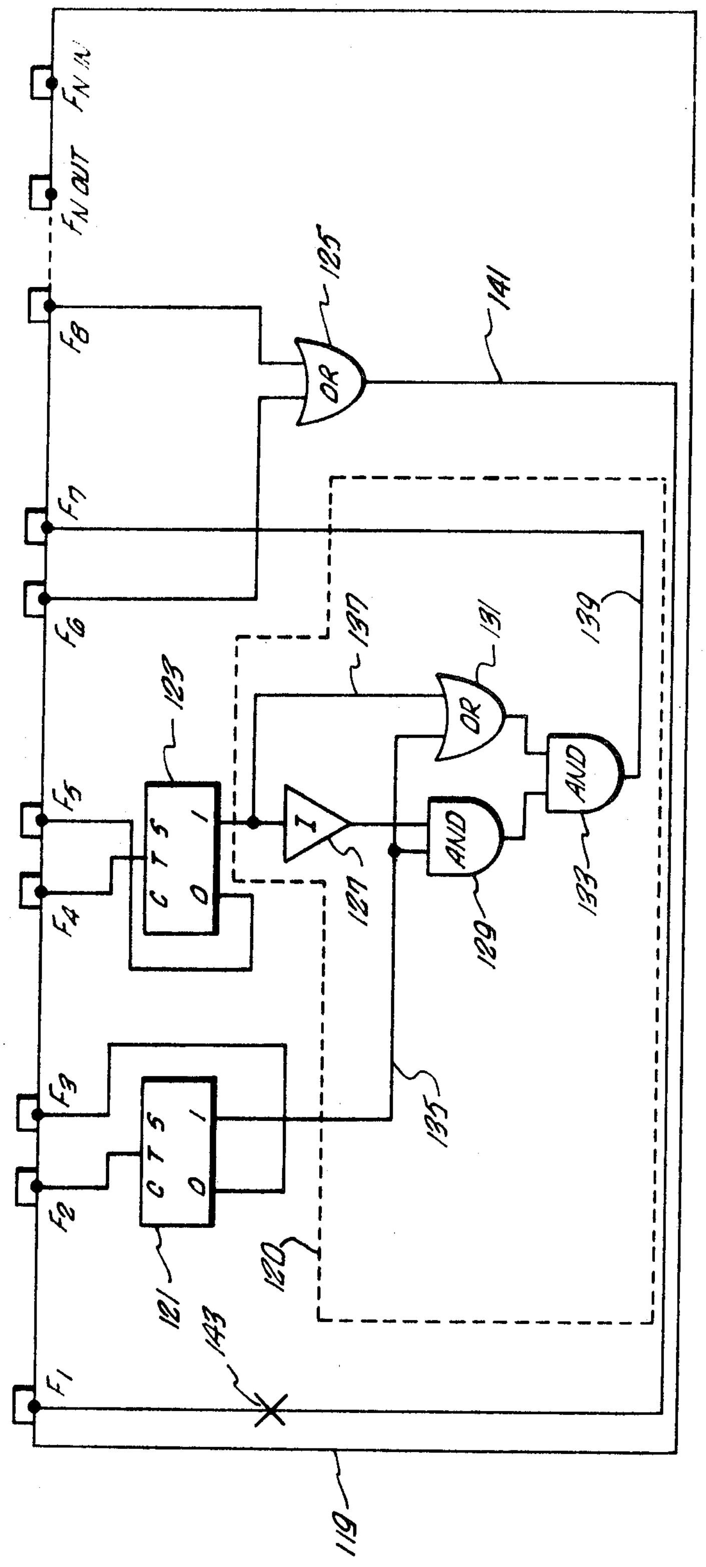
FIG. 12 diagramatically illustrates the subsystem of FIG. 8 with a fault therein.
FIG. 14 is a diagram showing the output signals, for 16 consecutive clock times, of the stages of the binary word generator of FIG. 2 when responding to the output signals of the faulty subsystem of FIG. 12.
Figure 13A:
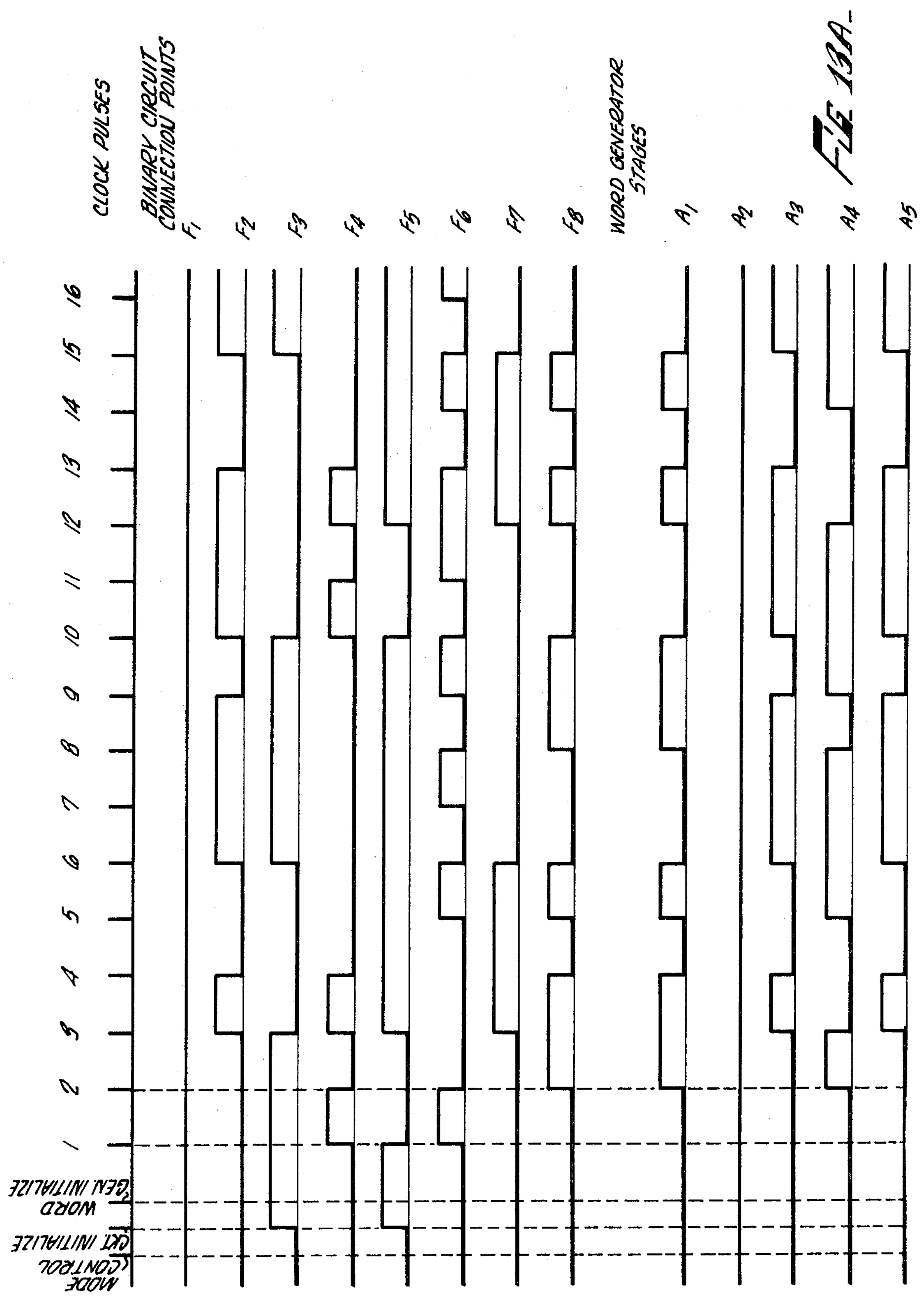
FIG. 13A, B is a pulse diagram illustrating the signals present in the binary word generator of FIG. 2 and at the connection points of the subsystem of FIG. 12 during the operation of the binary word generator for one test cycle in the go-no-go mode.
Figure 13B:
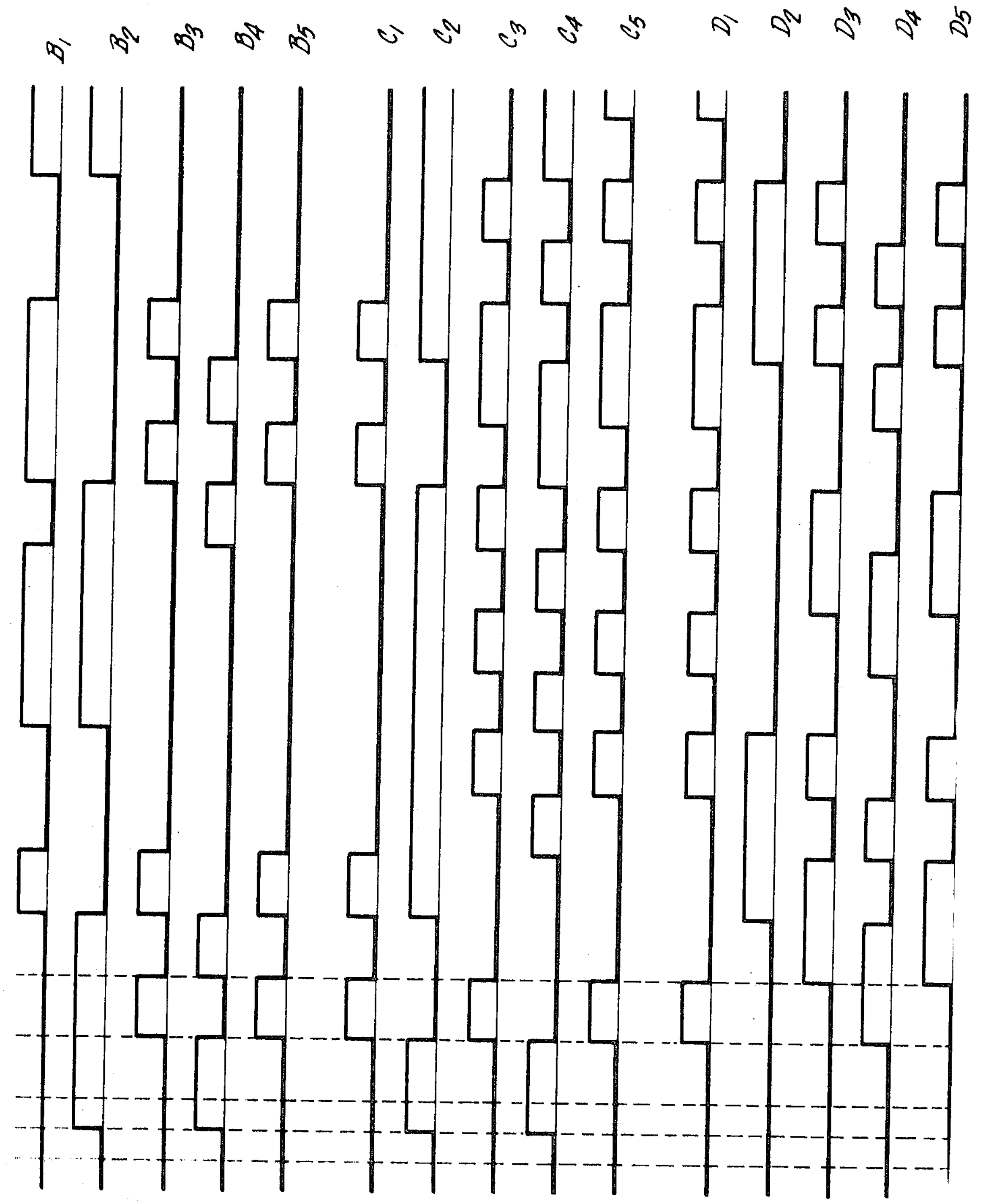

FIG. 12 illustrates the subsystem 119 with a fault 143 therein. Assuming that the binary circuit subsystem of FIG. 12 has been initialized to the same initial state as in the test for the subsystem 119 of FIG. 8 and that the binary word generator 31 has been initialized to the same initial state as in the test for the subsystem of FIG. 8, the words generated by the binary word generator 31 for sixteen clock times are shown in FIG. 14. The binary signals at various points in the binary word generator and at the connection points of the binary circuit subsystem 119 for each clock pulse are shown in FIG. 13 A and B.

As can be seen from FIG. 14, the binary word generated during the sixteenth clock pulse is 1 0 1 0. This binary word does not match the characteristic binary word generated when the subsystem 119 of FIG. 8, which has no faults, was tested, the characteristic word being 0 1 0 0. Therefore, a fault within the binary circuit subsystem 119 of FIG. 12 is indicated.

If more than one fault were present in the subsystem 119 of FIG. 12, the word generated might not be 1 0 1 0. But it would be a word that would not match the characteristic word 0 1 0 0.

Figures 15, 17, 19:
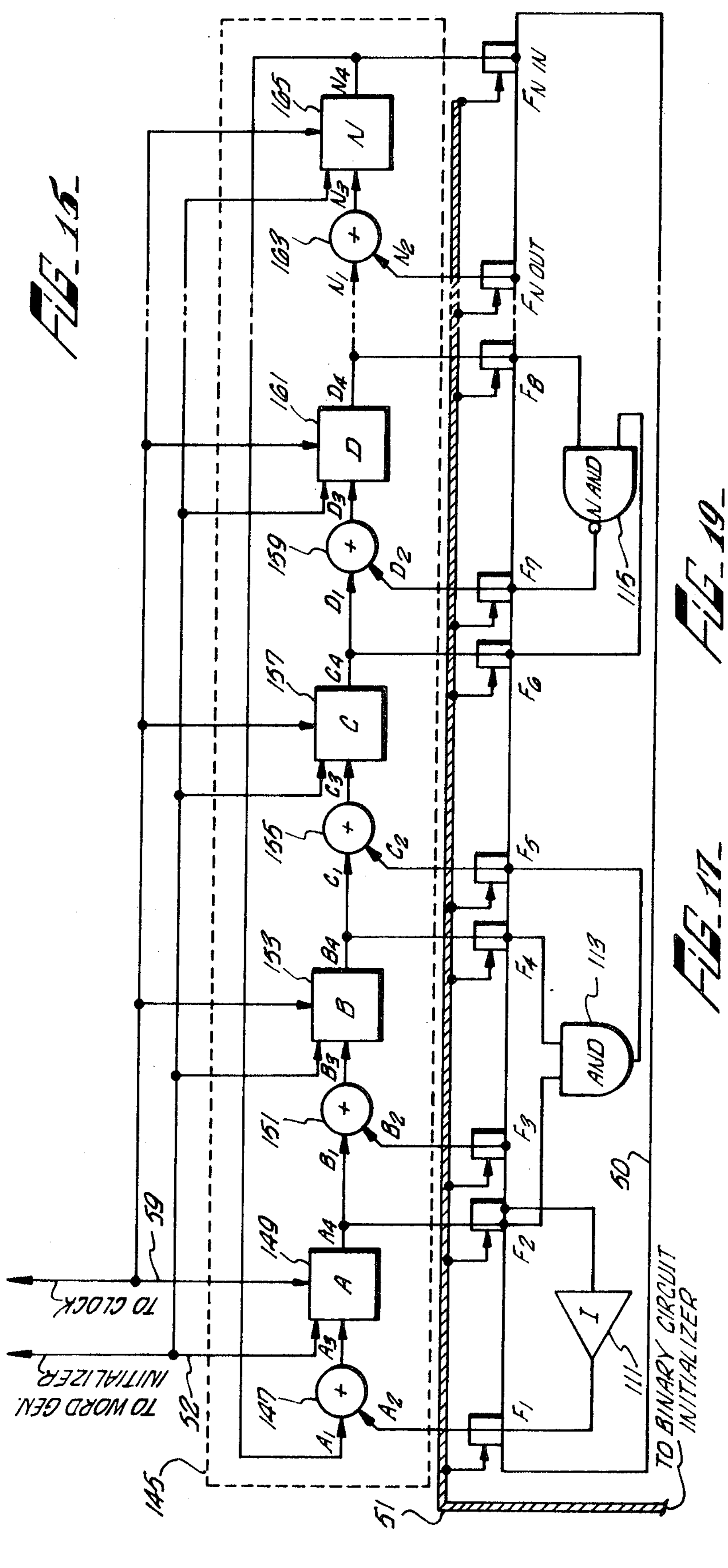
FIG. 15 is a block diagram of an alternate binary word generator, that may be used in the fault-testing apparatus of FIG. 1, connected to the binary circuit subsystem of FIG. 2.
FIG. 17 is a diagram illustrating the output signals, for 16 consecutive clock times, of the stages of the binary word generator of FIG. 15, generated in response to the output signals of the binary circuit subsystem of FIG. 15.
FIG. 19 is a diagram illustrating the output signals, for 16 consecutive clock times, of the stages of the binary word generator of FIG. 15 in response to the output signals of the binary circuit sybsystem of FIG. 5.
Figure 10A:
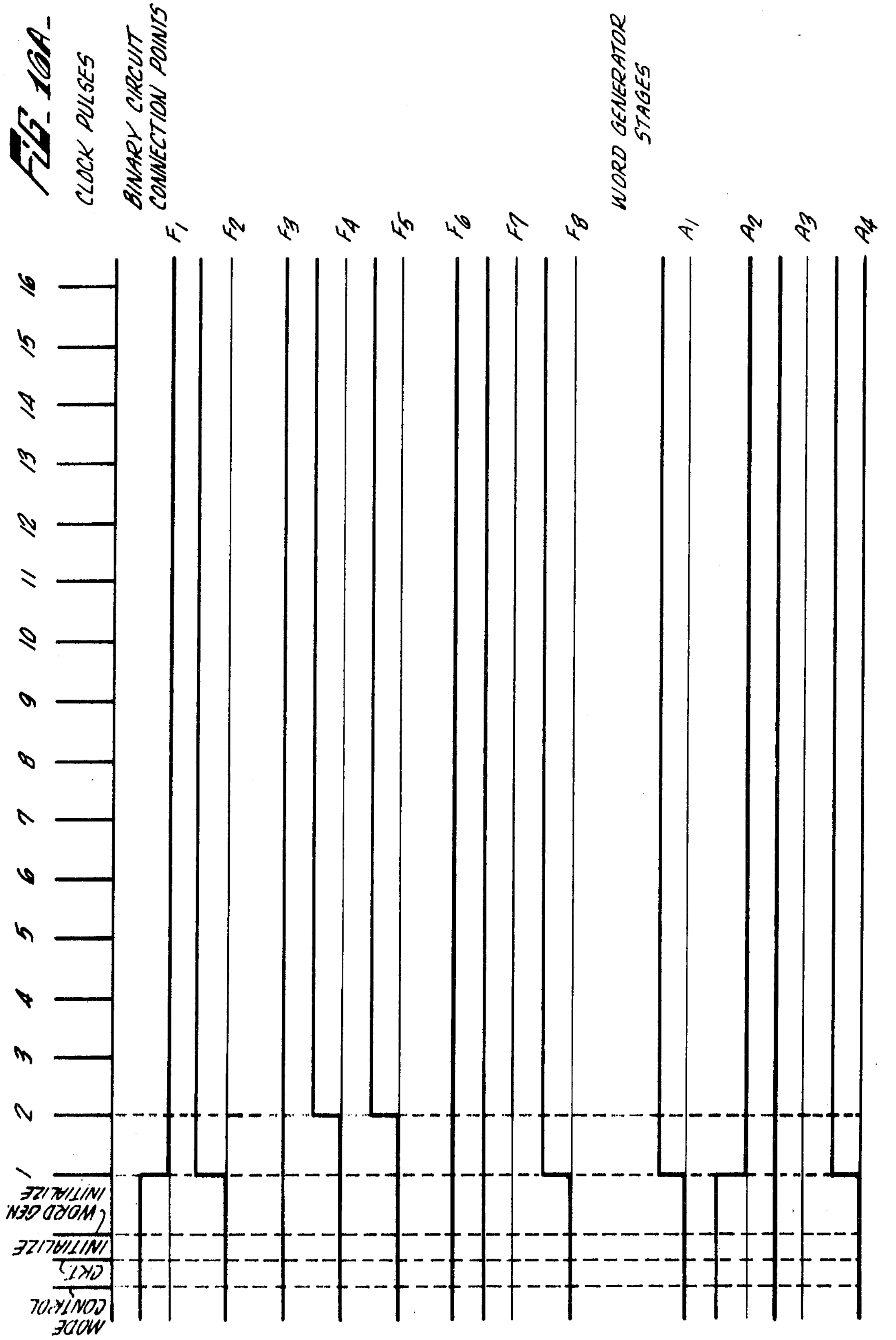

In an alternate embodiment of the fault-testing apparatus of this invention, a slightly simplified version of a binary word generator 145 may be used. This simplified version is shown in FIG. 15. The basic difference between this binary word generator 145 and the binary word generator 36 of FIG. 2, is the absence of a third input to the exclusive OR gate in each of the stages of the binary word generator. The feed-back from the outputs $A_4$, $B_4$, $C_4$ and $D_4$ of each of the flip-flops in the four stages of the binary word generator 145 to the exclusive OR gate of their respective stages has been eliminated.

Assuming again that a four stage A, B, C, D binary word generator is used, although, as many stages as desired may be used, the exclusive OR gate 147 in the first stage A will have two inputs $A_1$, and $A_2$ and one output $A_3$, output $A_3$ being connected to the input of the flip-flop 149 in stage A. The exclusive OR gate 151 in stage B has two inputs $B_1$ and $B_2$ and one output $B_3$ which is connected to the input of the flip-flop 153 of stage B. Exclusive OR gate 155 of stage C has two inputs $C_1$, $C_2$, and one output $C_3$ which is connected to the input of the flip-flop 157 of stage C. The exclusive OR gate 159 of stage D has two inputs $D_1$, $D_2$ and one output $D_3$ which is connected to the input of the flip-flop 161 of stage D.

The two inputs of each of the exclusive OR gates 147, 151, 155 and 159 in the four stages are respectively connected to the output connection points of the binary circuit subsystem to be tested and to the output of the flip-flop in the previous stage, the output of the last flip-flop 161 in the last stage D being connected to the input of the exclusive OR gate 147 in the first stage A.

Assuming subsystem 50 was to be tested by the binary word generator 145, input $A_2$ is connected to an output connection point $F_1$ on the binary circuit subsystem 50. $B_2$ is connected to connection point $F_3$ on the binary circuit subsystem. $C_2$ is connected to an output connection point $F_5$ on the binary circuit sybsystem. $D_2$ is connected to an output connection point $F_7$. The outputs $A_4$, $B_4$, $C_4$, $D_4$ of the four stages in the binary word generator are respectively connected to the input connection points $F_2$, $F_4$, $F_6$, $F_8$ on the binary circuit subsystem.

Connection point $F_3$ of the binary circuit subsystem 50 is not connected to any circuitry. Input termination $B_2$ of the exclusive OR gate 151 in stage B of the binary word generator 145 may be connected to it without adversely affecting the results of the test procedure. Input termination $B_2$ may also be left unconnected without adversely affecting the test procedure. A 1:1 relationship between the inputs and outputs on the binary word generator and the input and output connection points on the binary circuit subsystem is not required for a reliable test to be performed.

The binary circuit subsystem 50 to be tested by the binary word generator 145 of FIG. 15 is the same binary subsystem 50 that was tested by the binary word generator 36 of FIG. 2. Inverter 111 is connected to connection points $F_2$ and $F_1$. AND logic 113 has its inputs connected to connection points $F_2$ and $F_4$ and has its output connected to connection point $F_5$. NAD logic 115 has its inputs connected to connection points $F_6$ and $F_8$ and its output to point $F_7$.

The switch connector 33 of FIG. 2 has not been illustrated in FIG. 15. However, it should be obvious that it would connect the connection points of the binary circuit subsystem 50 to the terminations on the binary word generator 145 and would operate in the manner described above.

The initialization of the binary circuit subsystem 50 and the word generator 145 follows the same procedure as was outlined for the apparatus of FIG. 2. That is, the four stages A, B, C, D of the binary word generator 145 may be set to zero states so that their respective outputs $A_4$, $B_4$, $C_4$, $D_4$ are low.

Of course, as explained earlier this initial state need not be the only one used, the only requirements being that once initial states are chosen, the same initial states must be used for each type of subsystem. What initial states are used is generally a matter of choice, as long as the initial states used permit the binary word generator to start the test cycle. Generally, the initial state that will cause the generator to generate the greatest variety of words is most desireable.

The binary circuit subsystem 50, for example, may be initialized to 1 0 0 0 0 1 0 by simply placing lows at all the input terminations $F_2$, $F_4$, $F_6$ and $F_8$.

The binary word generator 145 and binary circuit subsystem 50 being thus initialized, the input signals to the respective OR gates of the four stages A, B, C, and D in the binary word generator 145 just prior to the occurrence of the first clock pulse are as follows. Inputs $A_1$ and $A_2$ to exclusive OR gate 147 in stage A will be low, high, input $A_2$ being high, thus causing output $A_3$ to be high. Inputs $B_1$ and $B_2$ of exclusive OR gate 151 will be low, low, thus causing input $B_3$ to be low. Input $C_1$ and $C_2$ of exclusive OR gate 155 in stage C will be low, low thus causing output $C_3$ to be low. Inputs $D_1$ and $D_2$ of exclusive OR gate 159 in stage D will be low, high, $D_2$ being high, thus causing output $D_3$ to be high.

At the occurrence of the first clock pulse, output $A_4$ of flip-flop 149 will go high because flip-flop 149 in stage A changed state, caused by a high being applied at input $A_3$ in coincidence with a clock pulse in line 59. Output $B_4$ of the flip-flop 153 in stage B stays low because input $B_3$ to flip-flop 153 was a low at the time a clock pulse was being applied to the flip-flop 153 over line 59. Output $C_4$ of the flip-flop 157 of stage C will remain low because flip-flop 157 did not change state since input $C_3$ was low when a clock pulse was applied to the flip-flop over line 59. Output $D_4$ of the flip-flop 161 in stage D is a high because flip-flop 161 changed state due to the input $D_3$ being high at the time a clock pulse was applied to the flip-flop 161 ove line 59. Therefore, the word generated by the binary word generator 145 at the first clock pulse is 1 0 0 1.

This results in a high being applied to connection point $F_2$, a low to connection point $F_4$, a low to connection point $F_6$ and a high to connection point $F_8$ on the binary circuit subsystem 50. The response of the subsystem to this input word is to place a low at output connection points $F_1$, $F_5$ and $F_7$. Therefore, the signal at connection point $F_1$ changes to a low, at connection point $F_5$ remains low and at connection point $F_7$ remains low.

Prior to the second clock pulse, the inputs $A_1$ and $A_2$ to exclusive OR gate 147 are high, low, causing input $A_3$ to be high. Inputs $B_1$ and $B_2$ of the exclusive OR gate 151 are low, high, $B_1$ being high, causing output $B_3$ to be high. Inputs $C_1$ and $C_2$ of the exclusive OR gate 155 are low, low causing output $C_3$ to be low. Inputs $D_1$, $D_2$ of exclusive OR gate 159 are low, high, $D_2$ being high, causing output $D_3$ to be high.

Figure 16B:
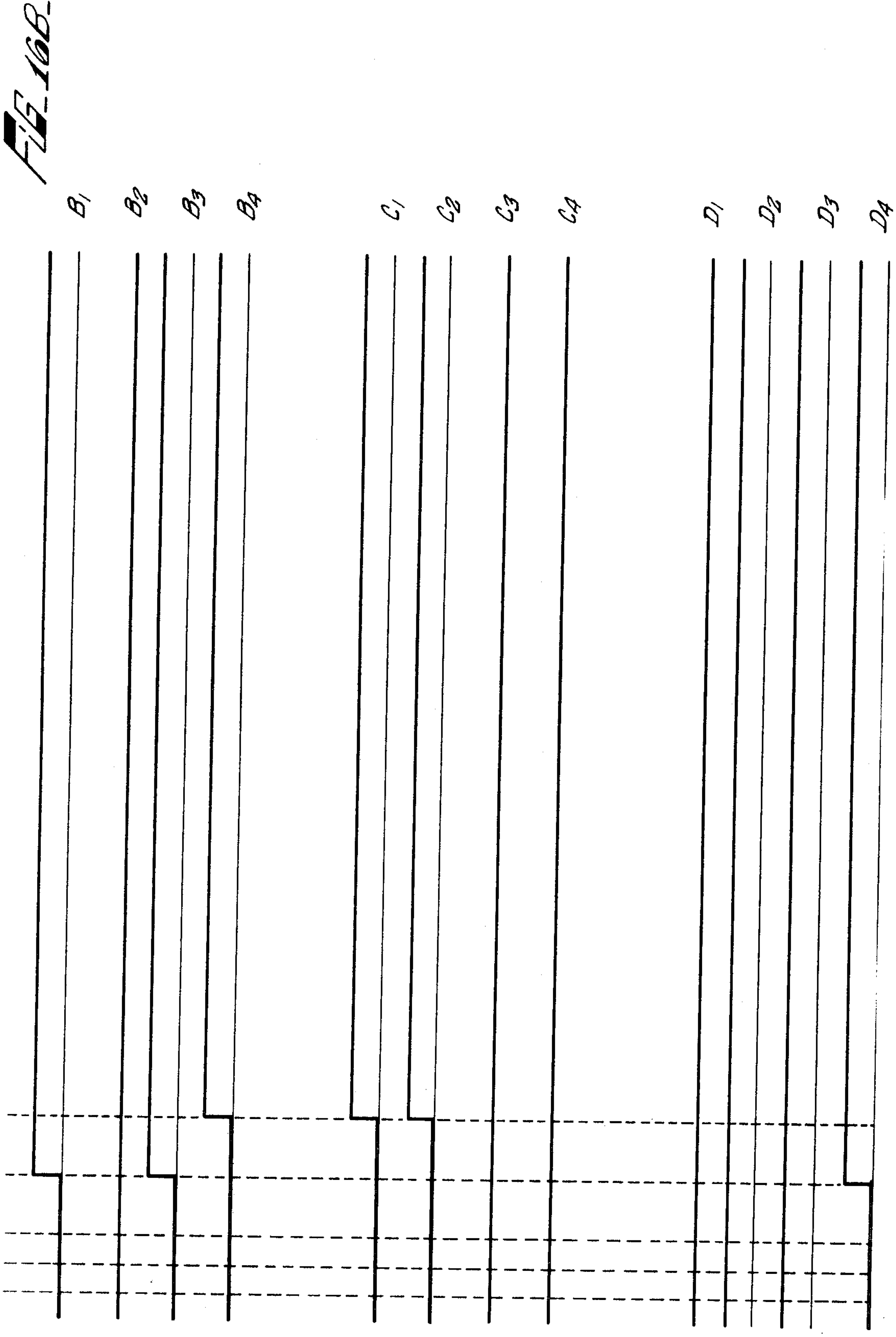
FIG. 16A, B is a pulse diagram illustrating the signals present in the binary word generator of FIG. 15 and at the connection points of the subsystem of FIG. 15 during the operation of the binary word generator for one test cycle in the go-no-go mode.

At the occurrence of the second clock pulse, output $A_4$ will remain high, output $B_4$ will go from a low to a high, output $C_4$ will remain low and output $D_4$ will remain high. The output $B_4$ changed because flip-flop 153 in stage B changed its state due to the changed signal on the input $B_3$ to the flip-flop 153. The binary word generated by the binary word generator 145 at the second clock pulse is 1 1 0 1. The response of the binary circuit subsystem 50 to the application of this binary word to its input connection points $F_2$, $F_4$, $F_5$ and $F_8$ as shown in FIG. 16 A, B is to not change the signals at its output connection points $F_1$, $F_7$, and to place a high at $F_5$.

Just prior to the occurrence of the third clock pulse then, inputs $A_1$ and $A_2$ of exclusive OR gate 147 are high, low causing output $A_3$ to be high. The inputs $B_1$, $B_2$ of exclusive OR gate 151 are high, low causing $B_3$ to be high. The inputs $C_1$, $C_2$ of exclusive OR gate 155 are high, high, causing output $C_3$ to be low. The inputs $D_1$, $D_2$ of exclusive OR gate 159 are low, high, $D_2$ being high, causing output $D_3$ to be high.

At the occurrence of the third clock pulse, output $A_4$ will remain high, $B_4$ will remain high, $C_4$ will remain low, and $D_4$ will remain high. The binary word generated at the occurrence of the third clock pulse is, therefore, 1 1 0 1. The application of this binary word to subsystem 50 causes the subsystem to make no changes in the signals at output connection points $F_1$, $F_5$ and $F_7$.

Just prior to the occurrence of the fourth clock pulse, the two inputs $A_1$, $A_2$ of exclusive OR gate 147 are high, low, causing outputs $B_1$, $B_2$ of exclusive OR gate 151 are high, low causing output $B_3$ to remain high. Inputs $C_1$ and $C_2$ of exclusive OR gate 155 are high, high, causing output $C_3$ to remain low. Inputs $D_1$, $D_2$ of exclusive OR gate 159 are high, low, $D_2$ being high, causing output $D_3$ to be high.

At the occurrence of the fourth clock pulse, output $A_4$ of stage A will remain high, output $B_4$ of stage B will remain high, output $C_4$ of stage C will remain low, and output $D_4$ of stage D will remain high. The binary word generated at the fourth clock pulse, therefore, is 1 1 0 1. The response of the binary circuit subsystem 50 to this binary word is to not change the signals at its output connection points $F_1$, $F_5$, and $F_7$. This same binary word 1 1 0 1 is generated continuously until the end of the test cycle at clock time sixteen.

This binary word 1 1 0 1 is the characteristic word for the binary circuit subsystem 50 of FIG. 2 when tested by fault testing apparatus using the binary word generator 145 of FIG. 15.

The signals at various points in the binary word generator 145 of FIG. 15 and the circuit connection points $F_1$ through $F_8$ for 16 cock pulses are illustrated in FIG. 16 A, B. The binary words generated for the 16 clock times are shown in FIG. 17.

Assuming now, that the binary circuit subsystem 50 (FIG. 5) has a fault 117 therein that is a break in the conductor between the output of NAND gate 115 and connection point $F_7$, determining whether a fault exists in the subsystem 50 requires that the binary word generator 145 be initialized to the same initial state used for obtaining the characteristic word, i.e., the four stages A, B, C and D, are generating lows, and the binary circuit subsystem 50 is initialized in the same was as for deriving the characteristic word, by applying lows to input connection points $F_2$, $F_4$, $F_6$ and $F_8$. If this is done, the binary word generated by the word generator 145 after the sixteenth clock pulse in the test cycle is 0 1 0 1.

Figure 18A:
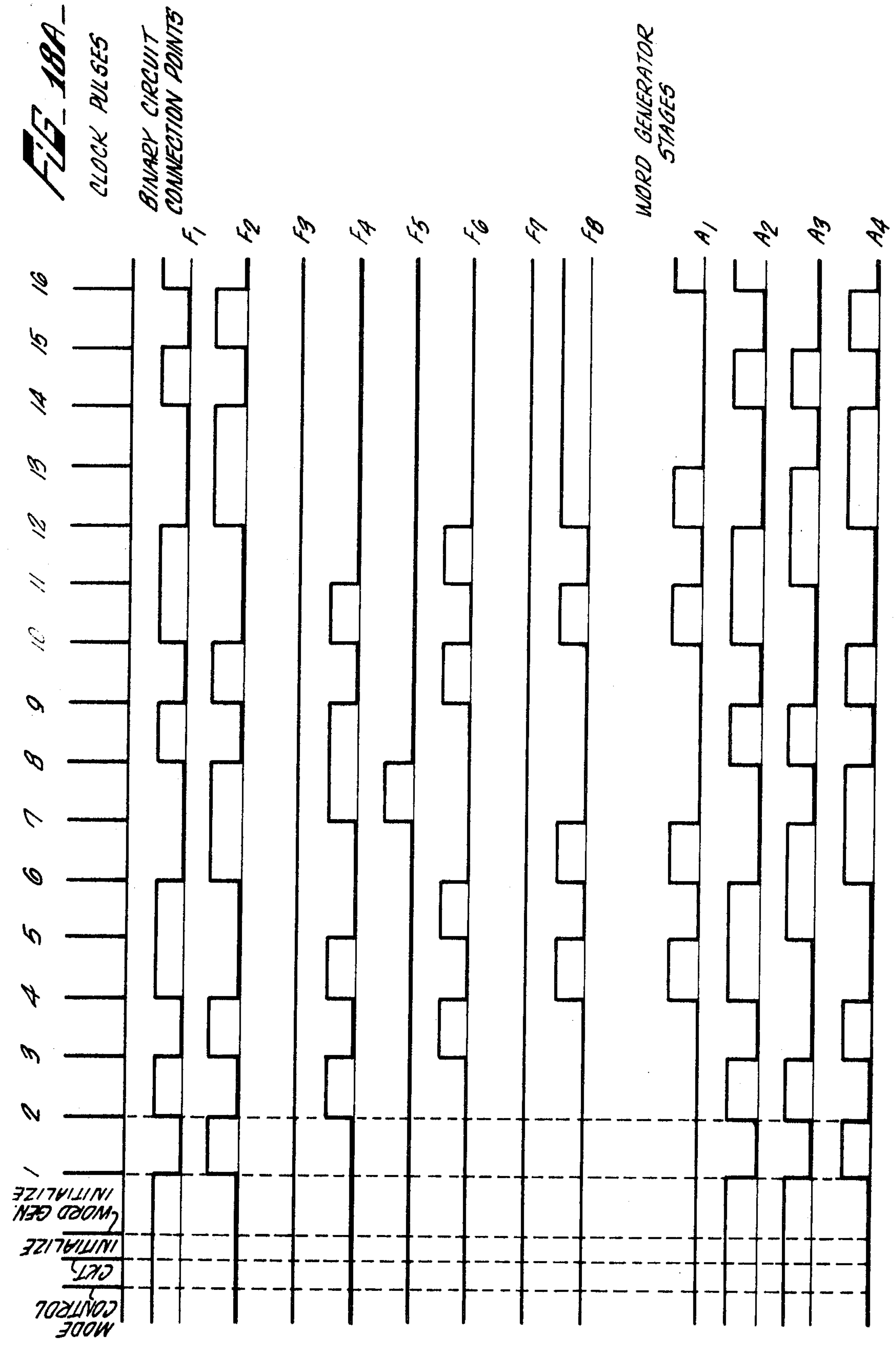
FIG. 18A, B is a pulse diagram illustrating the signals present in the binary word generator of FIG. 15 and at the connection points of the subsystem of FIG. 5 during the operation of the binary word generator for one test cycle in the go-no-go mode.
Figure 18B:
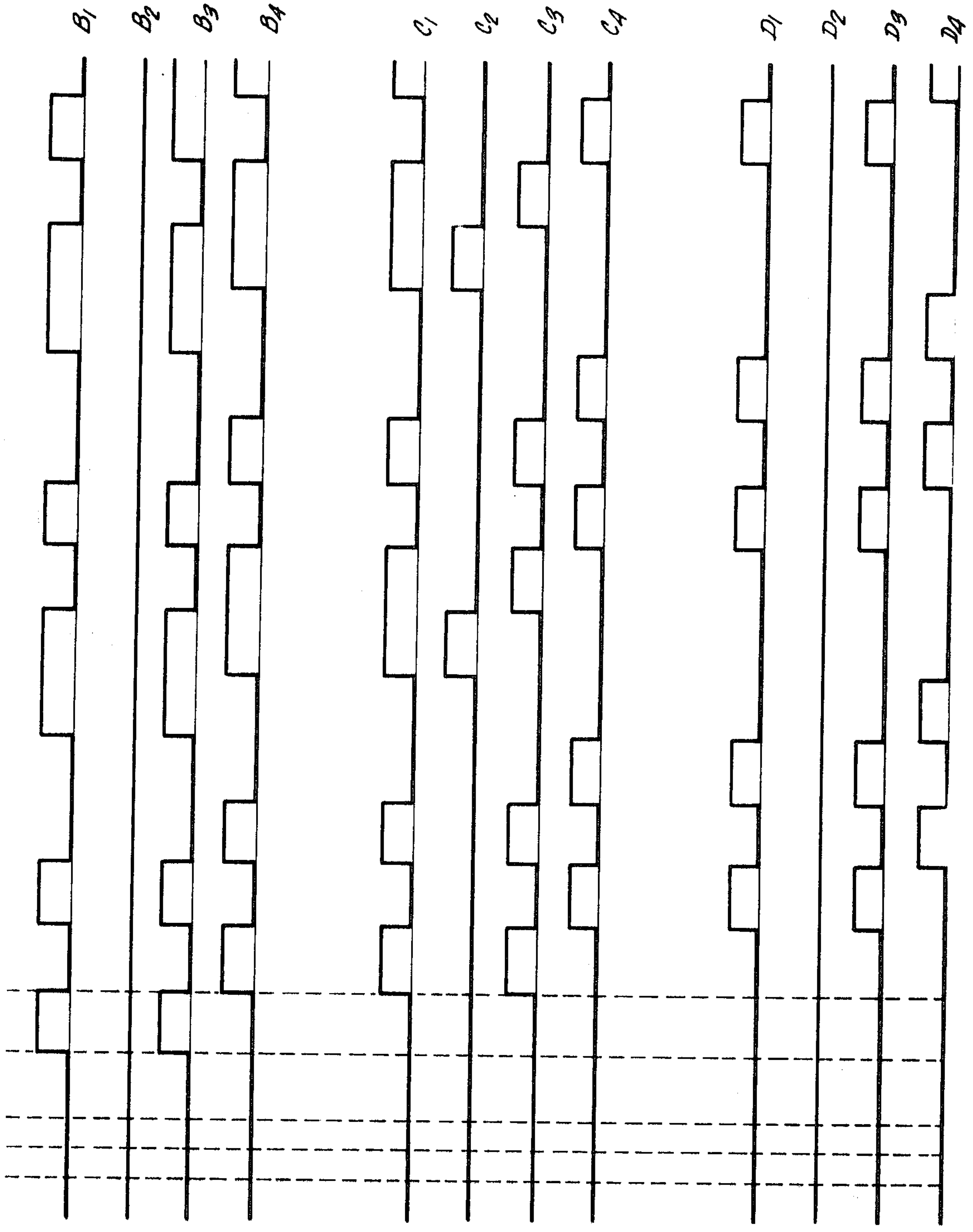

The signals at the various points in the binary word generator 145 and the connection points $F_1$ through $F_8$ of the binary circuit subsystem for each of the 1 through 16 clock pulses are shown in FIG. 18 A, B. The binary words generated by the binary word generator 145 for each clock pulse in the test cycle are shown in FIG. 19.

Since the binary word 0 1 0 1 generated during the sixteenth clock pulse for subsystem 50 with a fault therein does not match the binary word 1 1 0 1 generated during the sixteenth clock pulse when the binary circuit subsystem 50 without a fault was tested, a fault is indicated.

If more than one fault had been present, a different mismatch would have occurred.

Figure 20:
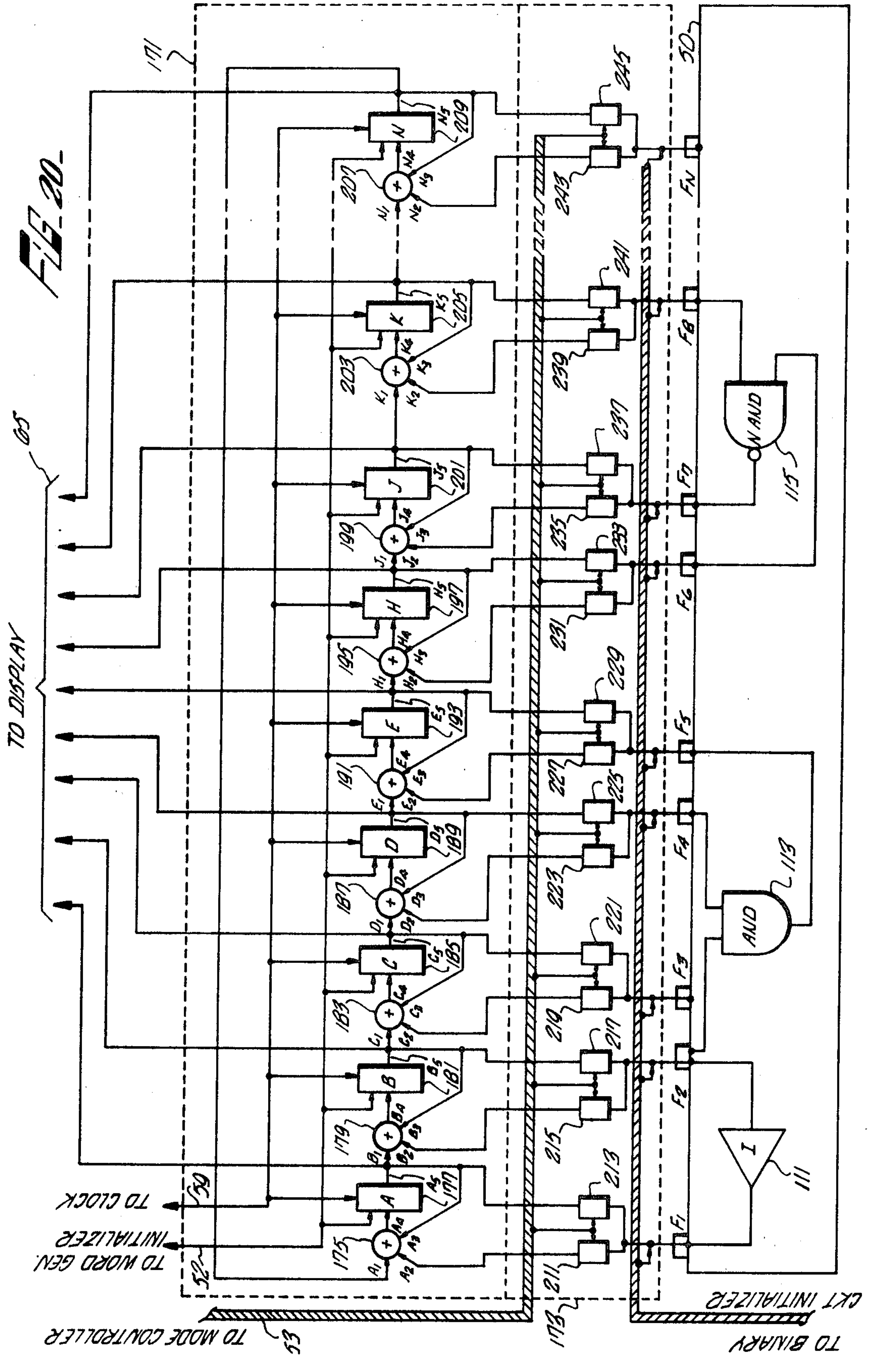
FIG. 20 is a block diagram illustrating the elements of an alternate binary word generator and an alternate switch connector, which may be used in the fault-testing apparatus of FIG. 1, connected to the binary circuit subsystem of FIG. 2.

A binary word generator 31 for use in the fault-testing apparatus of FIG. 1, while still embodying the concepts of the binary word generator 36 of FIG. 2 and the binary word generator 145 of FIG. 15, may be structured slightly differently to provide a more versatile fault-testing apparatus. The binary word generator 171 of FIG. 20 is an example. The binary word generator 171 of FIG. 20 requires the use of a switch connector 173 that is also structured slightly differently.

The binary word generator 171 of FIG. 20 utilizes one stage consisting of an OR gate and a flip-flop for each connection point on the binary circuit subsystem 50 to be tested. For purposes of illustrations the binary word generator 171 has eight stages A, B, C, D, E, H, J, and K, but may be expanded or contracted to any number, N, of stages, in the manner explained above in connection with the binary word generators 36 and 145.

A binary circuit subsystem 50 (FIG. 2) is connected to the binary word generator 171 by the switch connector 173. Binary circuit subsystem 50 is a subsystem that has seven functioning connection points, although eight are shown. It should be clear that, although the stages of the binary word generator 171 are greater in number than the functioning connection points on the binary circuit subsystem 50, the binary word generator can perform an effective fault determining test on the subsystem 50.

The binary word generator 171 of FIG. 20 has initializing lines 52 and clock lines 59 running to each of stages in the generator. The stages of the generator 171 are initialized and clocked in the manner described for binary word generator 36 of FIG. 2 and the binary word generator 145 of FIG. 15.

The first stage A of the binary word generator 171 has an exclusive OR gate 175 which has three inputs $A_1$, $A_2$, and $A_3$ and an output $A_4$ going to an input of the flip-flop 177 in that stage. The output $A_5$ of the flip-flop 177 is fed to a display over line 65 and to an input $B_1$ on an exclusive OR gate 179 in the immediately suceeding stage. The exclusive OR gate 179 has inputs $B_1$, $B_2$ and $B_3$ and an output $B_4$ leading to an input of flip-flop 181. Flip-flop 181 has an output $B_5$ that is supplied to a display over line 65 and to an input $C_1$ on exclusive OR gate 183 in the immediately suceeding stage. Exclusive OR gate 183 has three inputs $C_1$, $C_2$ and $C_3$ and an output $C_4$ which is fed to an input of flip-flop 185. Flip-flop 185 has an output $C_5$ that is supplied to a display apparatus over line 65 and to an input $D_1$ of the exclusive OR gate 187 in the immediately suceeding stage. Exclusive OR gate 187 has three inputs $D_1$, $D_2$, and $D_3$ and an output $D_4$ that is fed to an input of flip-flop 189. Flip-flop 189 has an output $D_5$ that is supplied to a display over line 65 and an input $E_1$ of the exclusive OR gate 191 in the immediately suceeding stage. Exclusive OR gate 191 has three inputs $E_1$, $E_2$, and $E_3$ and an output $E_4$ which is supplied to an input of flip-flop 193. Flip-flop 193 has an output $E_5$ that is supplied to a display over line 65 and to an input $H_1$ of the exclusive OR gate 195 in the immediately suceeding stage. Exclusive OR gate 195 has three inputs $H_1$, $H_2$ and $H_3$ and an output $H_4$ connected to an input of the flip-flop 197. Flip-flop 197 has an output $H_5$ that is supplied to the display 65 and to an input $J_1$ of the exclusive OR gate 199 in the next suceeding stage. Exclusive OR gate 199 has three inputs $J_1$, $J_2$ and $J_3$ and an output $J_4$ that is fed to an input of the flip-flop 201. Flip-flop 201 has an output $J_5$ that is supplied to a display over line 65 and to an input $K_1$ of the exclusive OR gate 203 in the next suceeding stage. Exclusive OR gate 203 has three inputs $K_1$, $K_2$ and $K_3$ and an output $K_4$ that is supplied to an input of the flip-flop 205. Flip-flop 205 has an output $K_5$ that is supplied to the display 65 and to an input $N_1$ of the exclusive OR gate 207 in the next suceeding stage, and so on. Since the binary word generator 171 of FIG. 20 was chosen to have eight stages, the output $K_5$ of flip-flop 205 in the eighth or K stage will be supplied to the input $A_1$ of the exclusive OR gate 175 in the first or A stage of the binary word generator.

The third input $A_3$, $B_3$, $C_3$, $D_3$, $E_3$, $H_3$, $J_3$ and $K_3$ of each exclusive OR gate 175, 179, 183, 187, 191, 195, 199 and 203 in the eight stages A, B, C, D, E, H, J and K of the binary word generator 171 are respectively supplied with the signals from the outputs $A_5$, $B_5$, $C_5$, $D_5$, $E_5$, $H_5$, $J_5$ and $K_5$ of the flip-flop 177, 181, 189, 193, 197, 201 and 205 in their respective stages. The second inputs $A_2$, $B_2$, $C_2$, $D_2$, $E_2$, $H_2$, $J_2$ and $K_2$ of the exclusive OR gates in the binary word generator 171 are made available for connection to the connection points $F_1$ through $F_8$ on a binary circuit subsystem 50. The outputs $A_5$, $B_5$, $C_5$, $D_5$, $E_5$, $H_5$, $J_5$ and $K_5$ of the flip-flops in each of the stages of the binary word generator are also made available for connection to the connection points on the binary circuit subsystem 50.

The switch connector 173 of FIG. 20 has a pair of switches for each stage in the binary word generator 171. The first stage A is connected to connection point $F_1$ on the subsystem 50 by switches 211 and 213. The input $A_2$ of the exclusive OR gate 175 in stage A is connected to switch 211 and the output $A_5$ of the flip-flop 177 in stage A is connected to switch 213. The second stage B of the binary word generator 117 has switches 215 to which the input $B_2$ of the exclusive OR gate 179 is connected, and 217 to which the output $B_5$ of the flip-flop 181 is connected. The third stage C has switches 219 to which the input $C_2$ of the exclusive OR gate 183 is connected and 221 to which the output $C_5$ of the flip-flop 185 is connected. The fourth stage D has switches 223 to which the input $D_2$ of the exclusive OR gate 187 is connected and 225 to which the output $D_5$ of the flip-flop 189 is connected. The fifth stage E has switches 227 to which the input $E_2$ of the exclusive OR gate 191 is connected and 229 to which the output $E_5$ of the flip-flop 193 is connected. The sixth stage H has switches 231 to which the input $H_2$ of the exclusive OR gate 195 is connected and 233 to which the output $H_5$ of the flip-flop 197 is connected. The seventh stage J has switch 235 to which the input $J_2$ of exclusive OR gate 199 is connected and 237 to which the output $J_5$ of the flip-flop 201 is connected. The eighth stage K has a switch 239 to which the input $K_2$ of the exclusive OR gate 203 is connected and 241 to which the output $K_5$ of the flip-flop 205 is connected.

Each switch pair in the switch connector 173 is connected to one connection point on the binary circuit subsystem 50.

This type of switch onnector arrangement facilitates the supplying of binary signals to those connection points $F_2$, $F_4$, $F_6$ and $F_8$ on the binary circuit subsystem 50 that are input connection points and receiving signals from those connection points $F_1$, $F_5$, and $F_7$ on the binary circuit subsystem 50 that are output connection points. When there are connection points $F_3$ on a subsystem 50 that are simply terminations or blanks, leaving more stages in the binary word generator 171 than there are connection points on the subsystem 50, one of the stages, the third stage C in this example, need not be connected to the subsystem at all.

It should be remembered that the order in which the stages of the binary word generator 171 are connected to the connection points $F_1$ through $F_8$ on the binary circuit subsystem is not important. The first stage A, for example, instead of being connected to connection point $F_1$ may be connected to connection point $F_8$, the other stages being connected in like random manner.

In the particular example of FIG. 20 binary word generator 171 has been shown as having exclusive OR gates in each of its stages with three inputs and one output. It should be remembered, however, that exclusive OR gates having only two inputs and one output may be used just as well by simply not supplying the output signal on the flip-flop in each of the stages to the exclusive OR gate in its respective stage. When using exclusive OR gates with only two inputs in the binary word generator, all the switches 211, 215, 219, 223, 227, 231, 235 and 239 in the switch connector 173 are enabled except for those switches 213, 229 and 237 that are connected to an output connection point on the subsystem 50 to be tested. This closure pattern in the switch connector 173 is for the go-no-go test mode.

If exclusive OR gates with three inputs and one output are used, as shown in FIG. 20, and the go-no-go test mode is chosen, switch 211 will be closed and 213 will be open, since the first stage A is connected to an output connection point $F_1$ on the subsystem 50. The second stage B, however, is connected to an input connection point $F_2$, therefore, switch 215 will be open and switch 217 will be closed. Since stage C the third stage was chosen not to be connected to anything, both switches 219 and 221 will be open. This same scheme applied down the row. Therefore, switch 223 will be open, 225 will be closed, switch 227 will be closed, 229 will be open, switch 231 will be open, switch 233 will be closed, switch 235 will be closed, switch 237 will be open and switch 239 will be open, while switch 241 will be closed.

FIG. 21 A, B, C, D illustrates the binary signals present at the connection points $F_1$, $F_2$, $F_8$ and at various points in the binary word generator 171 during a 16 clock time cycle when the binary word generator is operating in the go-no-go mode while connected to the binary circuit subsystem 50. FIG. 22 illustrates the binary signal (binary word) output of each stage A, B, C, D, E, H, J and K in the binary word generator 171 for each clock time in the cycle.

For purposes of illustration, assume the subsystem 50 is initialized over binary circuit initializer cable 51, in the manner explained above, so that the signals at the $F_1$, through $F_8$ connection points are 1 0 0 0 0 0 1 0 respectively. Also assume that the binary word generator 171 is initialized, over lines 52 and 59, in the manner explained above, so that the outputs of the flip-flops in each of the stages of the word generator are zero. With these pre-test cycle conditions established, the word output of the binary word generator 171 during the sixteenth clock pulse is 0 1 0 1 0 1 0 0. This output is supplied to a display device 41 (FIG. 1).

Since the subsystem 50 of FIG. 20 had no faults therein, this word output can be taken as the characteristic word for that subsystem.

Assuming now that the subsystem 50 has a fault 117 therein between the output of NAND gate 115 and connection point $F_7$ (FIG. 5) and that the same pre-test cycle conditions exist, in other words, the binary word generator and the subsystem are initialized to the same initial conditions, the signals appearing at the connection points $F_1$ through $F_8$ and at various points in the binary word generator for a 16 clock time test cycle are shown in FIG. 23, A, B, C, D. FIG. 24 illustrates the binary word output of the word generator 171 for each of 16 clock times. As can be seen in FIG. 24 the binary word output of the binary word generator 171 during the sixteenth clock pulse is 0 1 0 1 0 0 0 0. This binary word output is supplied to the display device 41 (FIG. 1).

The binary word output of the binary word generator 171 during the last clock pulse when connected to a known-to-be-good binary subsystem 50 is 0 1 0 1 0 1 0 0. Whereas, the binary word output of the word generator 117 when initialized to the same pre-test conditions and connected to a subsystem 50, initialized by the same pre-test procedure, with a fault therein, is 0 1 0 1 0 0 0 0. Comparing these two word outputs during the sixteenth clock time we see that they do not match. Therefore, a fault is indicated.

BINARY WORD GENERATOR OPERATING IN FAULT-ISOLATION MODE

When a subsystem has been found to contain a fault or faults therein, the fault-testing apparatus of this invention may be used in the fault-isolation mode to determine in what section or sections of the binary circuit subsystem the fault or faults are located. The invention is set-up for his mode of operation by disconnecting all the output connection points of the binary circuit subsystem to be tested from the binary word generator, while leaving all the output terminations of the binary word generator connected to the input connection points of the binary circuit subsystem. This is accomplished in the manner described above. With all the output connection points of the binary circuit subsystem disconnected from the binary word generator, the binary word generator will no longer be responsive to the circuitry in the subsystem.

In order to determine which circuits in the subsystem are defective, the pulses appearing at each output connection point, $F_1$, $F_5$ and $F_7$ in the case of binary subsystem 50, must be counted for a complete test cycle, 16 clock times, by a sensor such as probe 47. By knowing the number of pulses that should appear for a good circuit, at an output connection point, on the particular subsystem being tested, it can be determined whether there is a fault in the circuit attached to the output connection point being monitored.

Figure 25A:
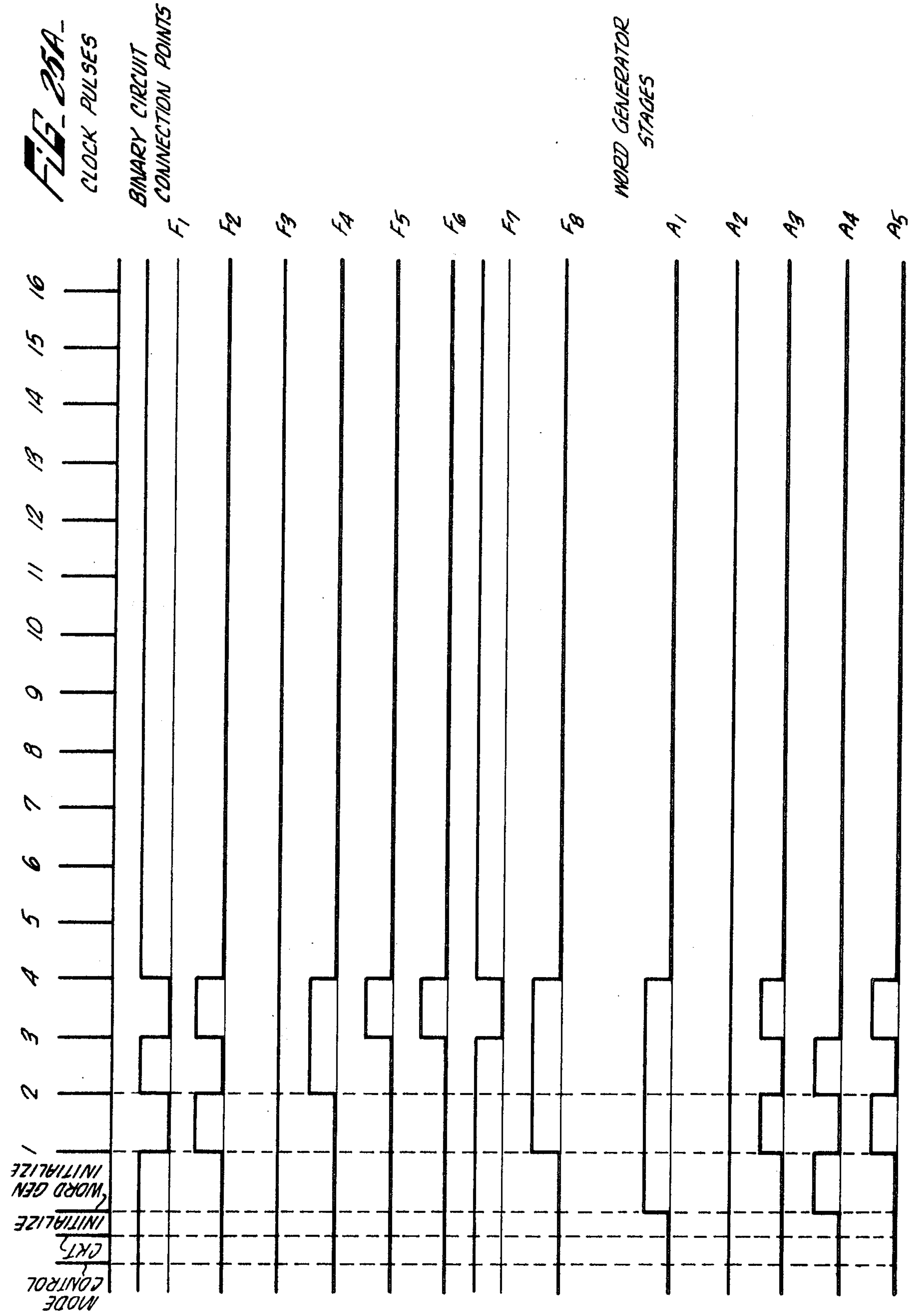
FIG. 25 A, B is a pulse diagram showing the binary signals present in the binary word generator and at the connection points of the subsystem of FIG. 2 when the binary word generator is operating in the fault-isolation mode.
Figure 25B:
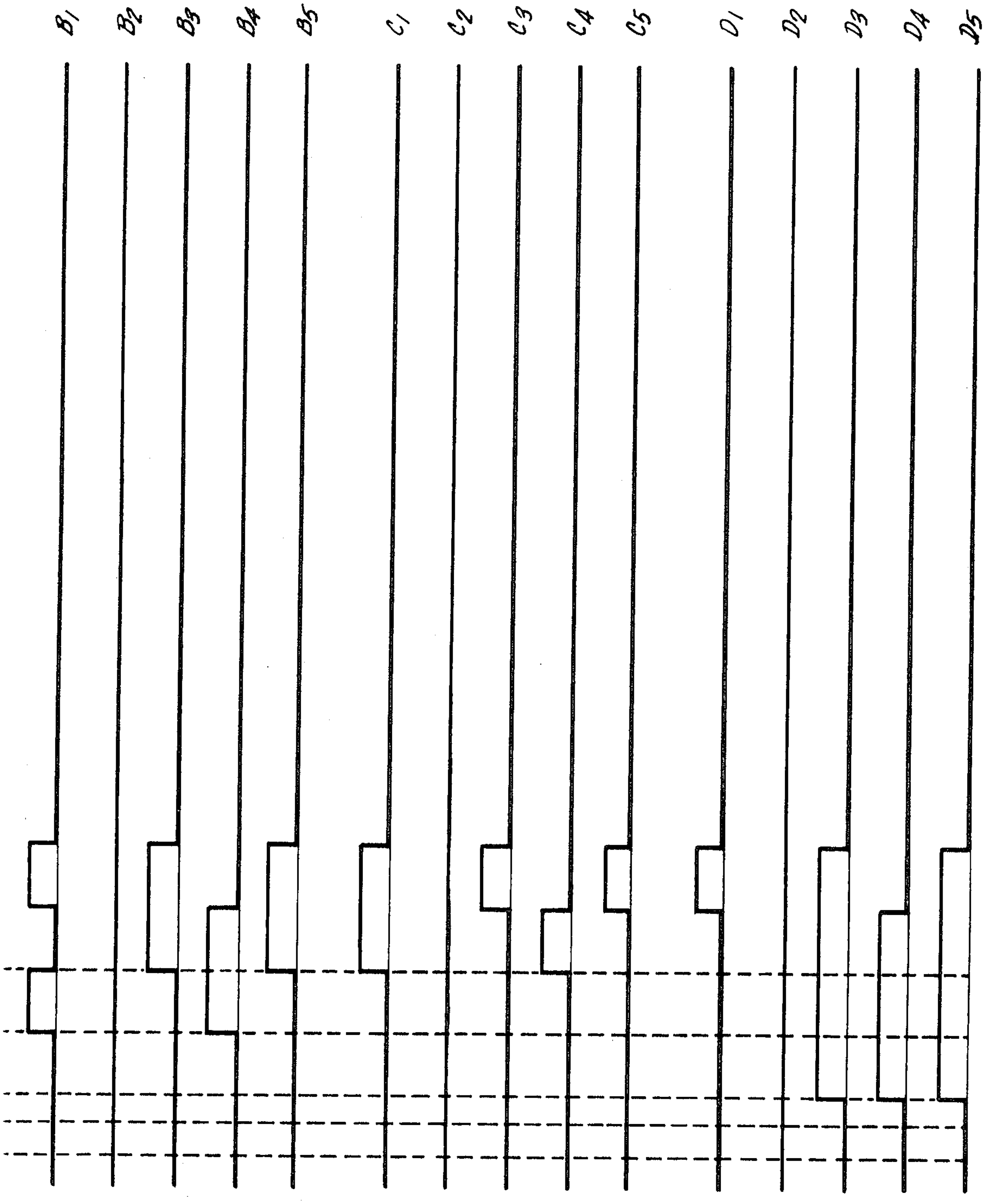

To obtain the reference number of pulse counts for a good binary circuit subsystem, a known good binary circuit subsystem must be run through a fault-isolation cycle, the pulses appearing at each of the output connection points on the subsystem being counted. These pulse counts are the reference or characteristic number of pulse counts for that particular subsystem. FIG. 25 A, B illustrates the binary signals appearing at the binary circuit subsystem connection points $F_1$ through $F_8$ and the signals appearing at various locations in the binary word generator 31 for 16 clock times when it is run in the fault-isolation mode. The binary words being generated by the binary word generator 31 of FIG. 2 for 16 clock times, while in the fault isolation mode, are shown in FIG. 21. The signal diagrams of FIG. 25 and the binary words of FIG. 26 are generated only if the binary word generator 36 is initialized to 0 0 0 1 in the manner above described and the binary circuit subsystem 50 is initialized to the state 1 0 0 0 0 0 1 0 in the manner above described, prior to starting the fault-isolation test cycle.

If a pulse count monitoring device that counted the number of times a certain signal level was reached were used to monitor the output connection points $F_1$, $F_5$, and $F_7$ of the binary circuit subsystem 50 shown in FIG. 2, a one count would be generated by connection point $F_1$, a one count would be generated by connection point $F_5$ and a two count would be generated by connection point $F_7$. Thus, a good binary circuit subsystem 50 being tested by a binary word generator 31 which has been initialized to a 0 0 0 1 state while the subsystem 50 has been initialized to a 1 0 0 0 0 0 1 0 state, would have reference pulse counts of 1, 1, and 2 for the output connection points $F_1$, $F_5$ and $F_7$ respectively.

Figure 21A:
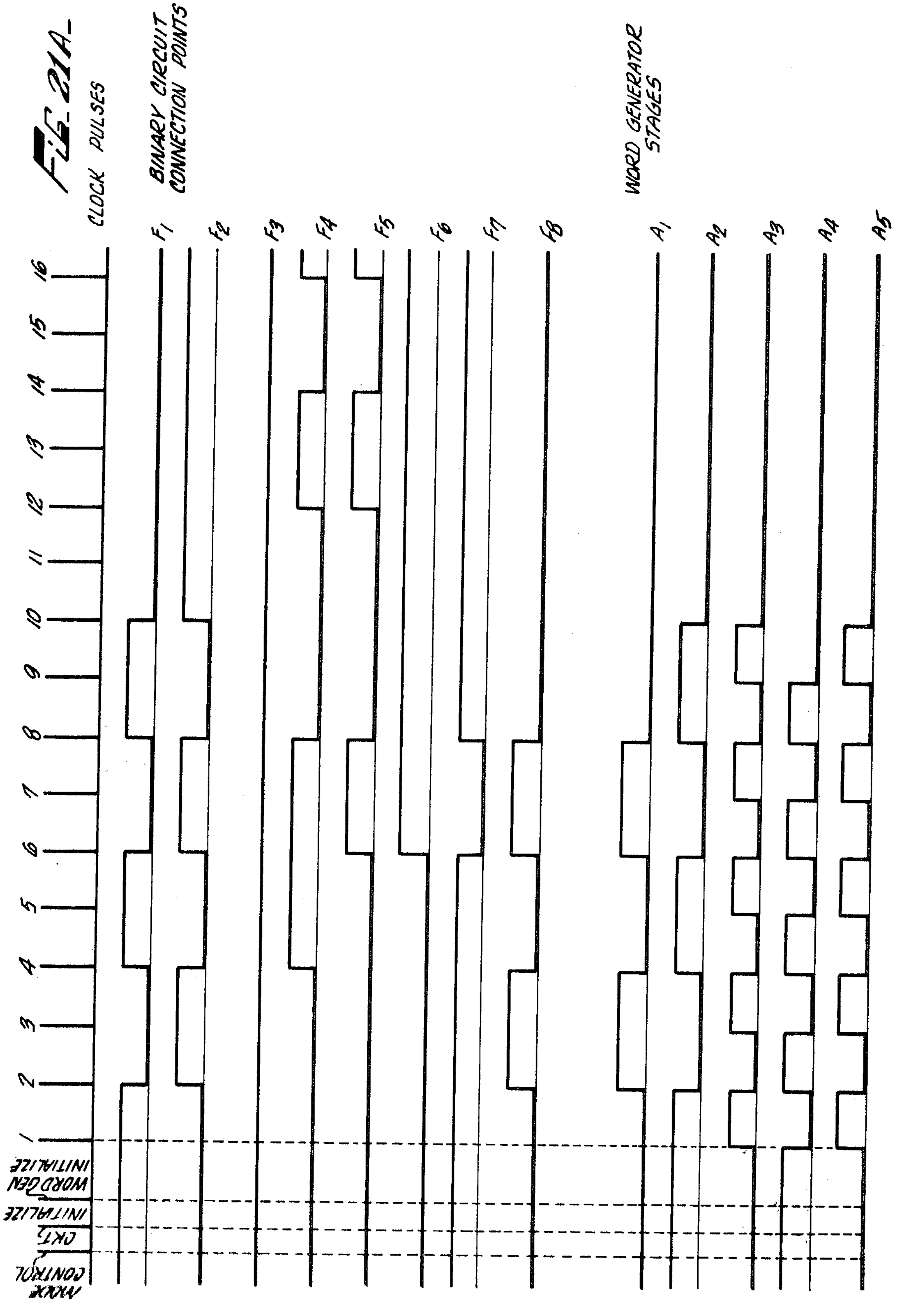
FIG. 21 A, B, C, D is a pulse diagram showing the binary signals present in the binary word generator and at the connection points of the subsystem of FIG. 20 when the binary word generator is operating in the go-no-go mode.
Figure 21B:
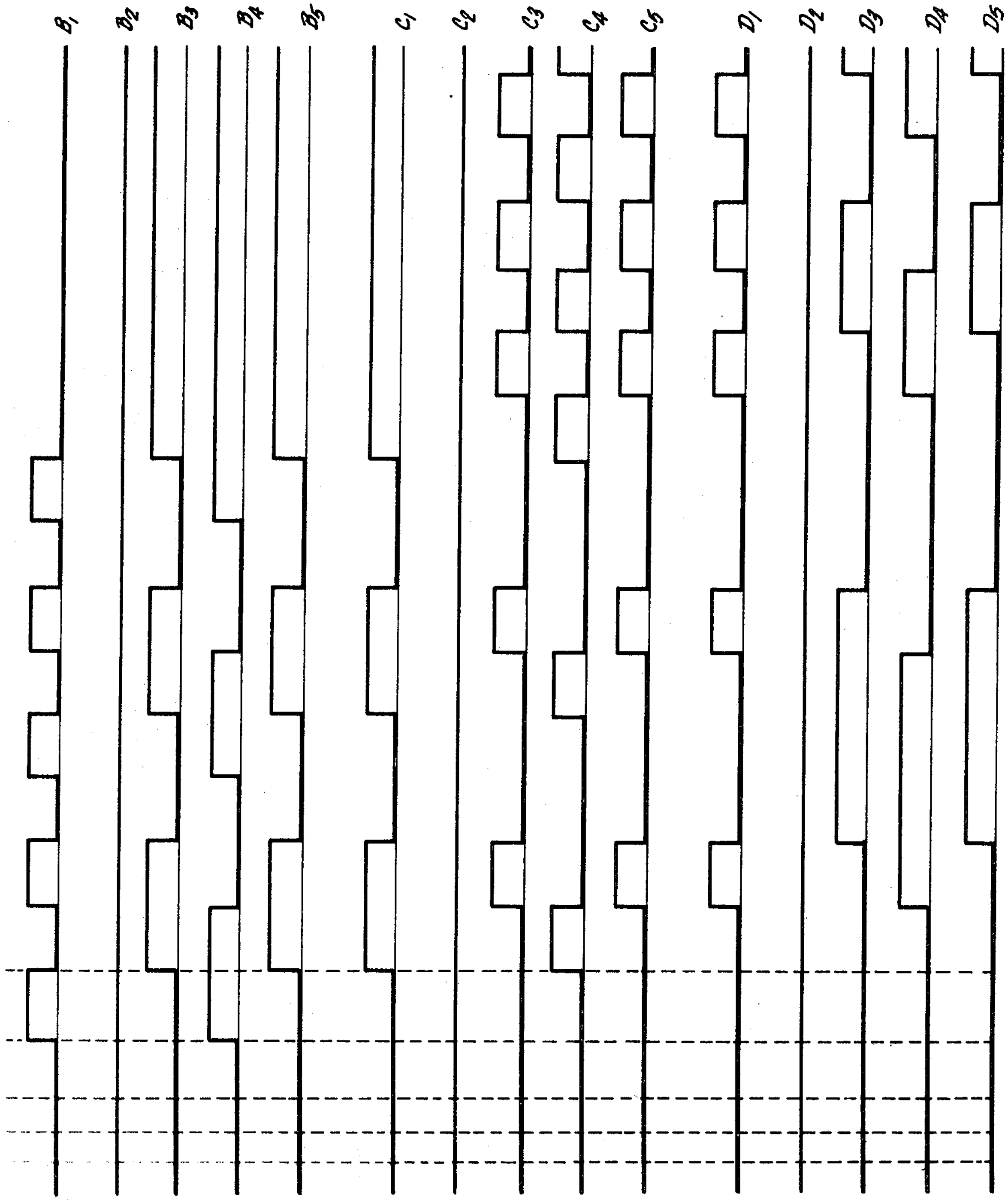
Figure 21C:
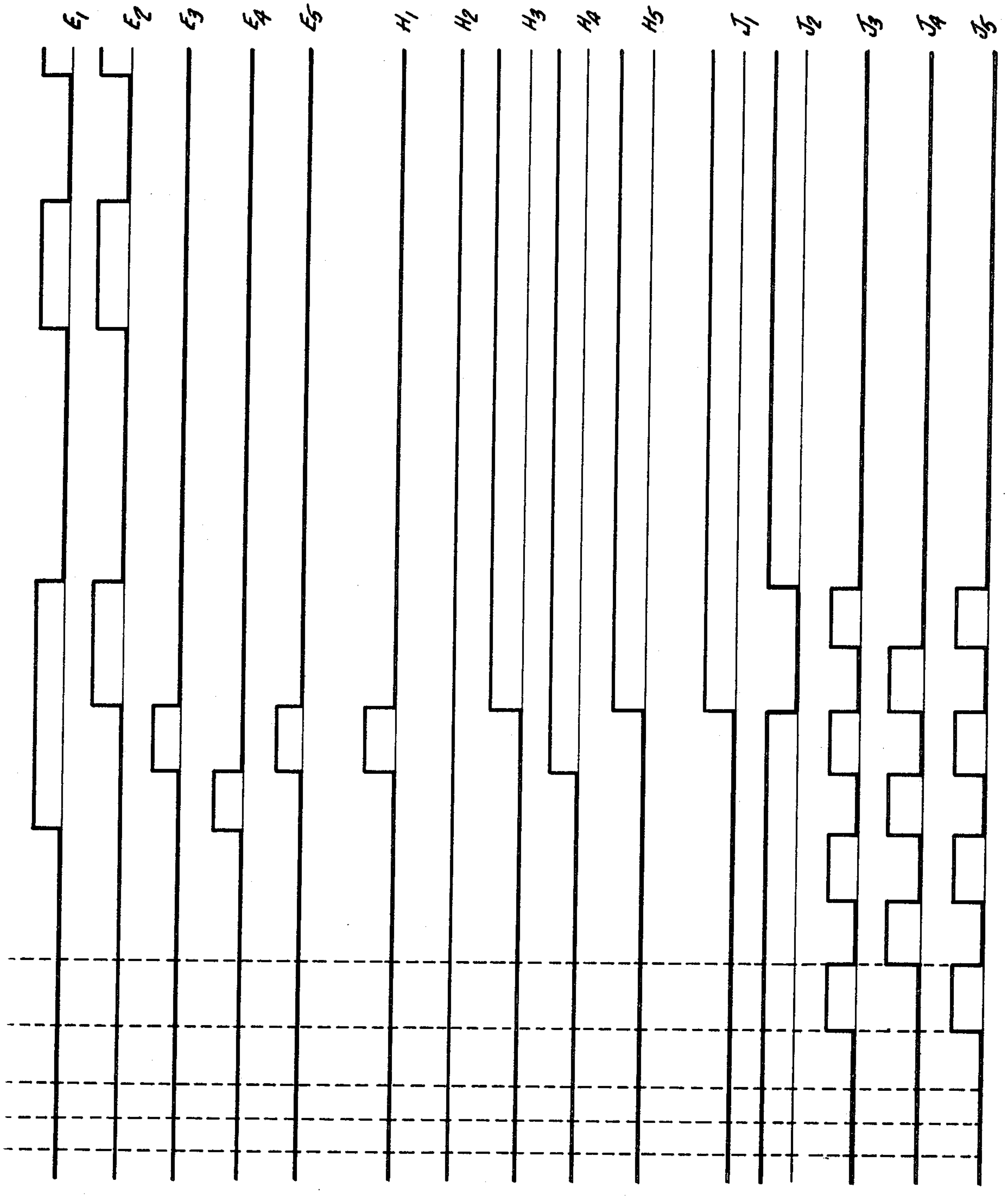
Figures 21D, 22:
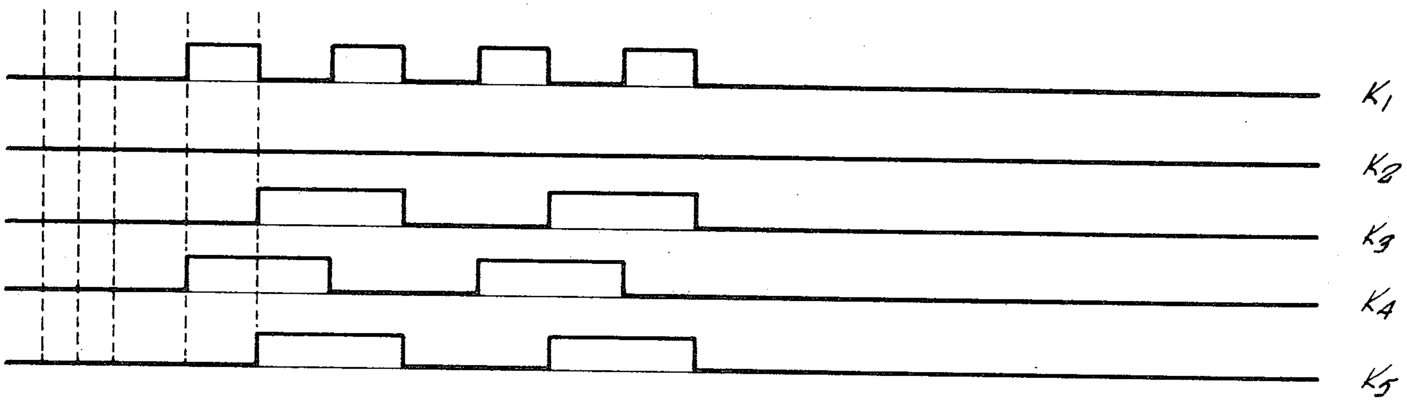
FIG. 22 is a diagram of the output signals of the stages in the binary word generator of FIG. 20, for 16 consecutive clock times, generated in response to the output signals of the binary circuit subsystem of FIG. 15.
Figure 23A:
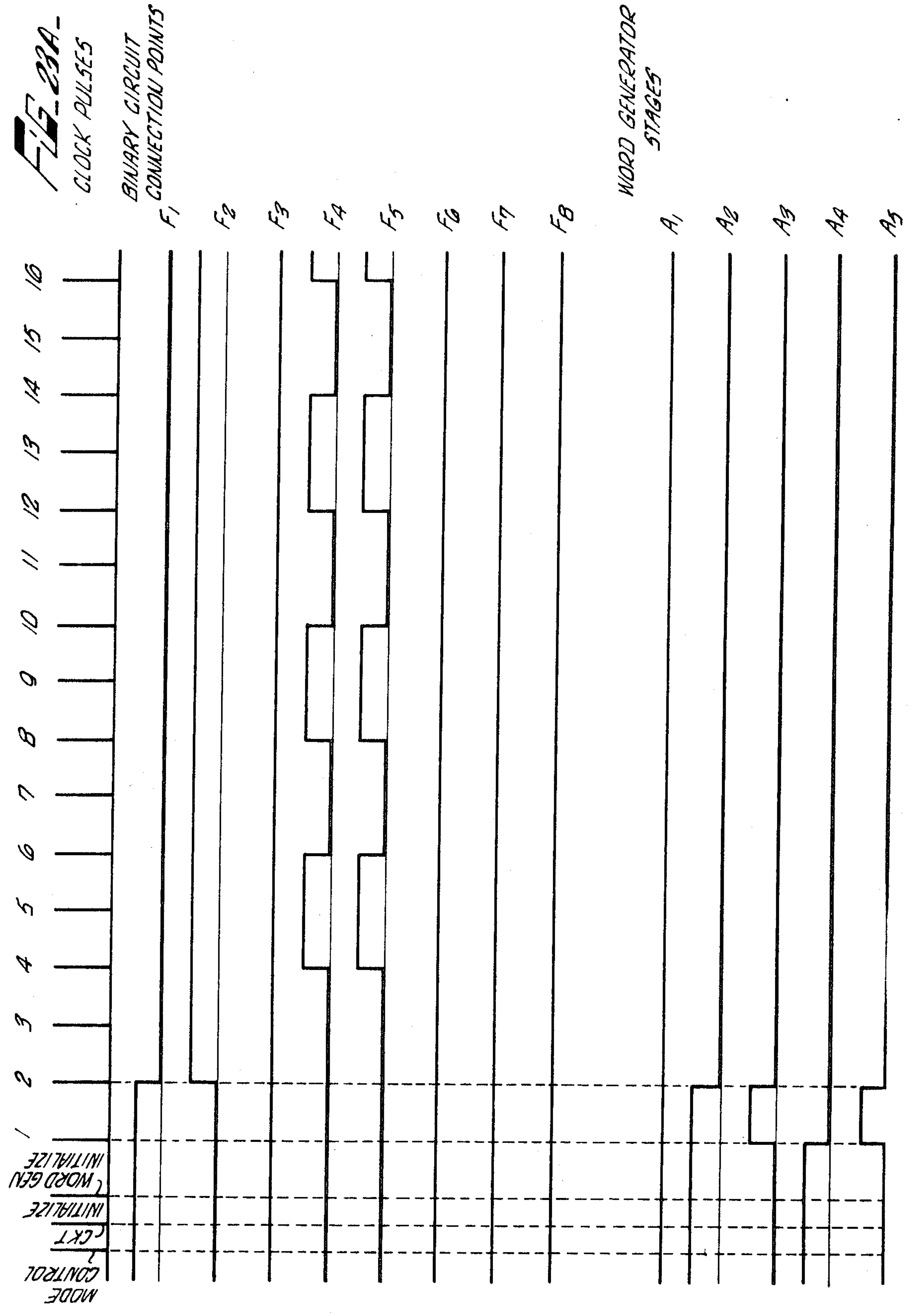
FIG. 23 A, B, C, D is a pulse diagram showing the binary signals present in the binary word generator of FIG. 20 and at the connection points of the subsystem of FIG. 5 during the operation of the binary word generator for one test cycle in the go-no-go mode.
Figure 23B:
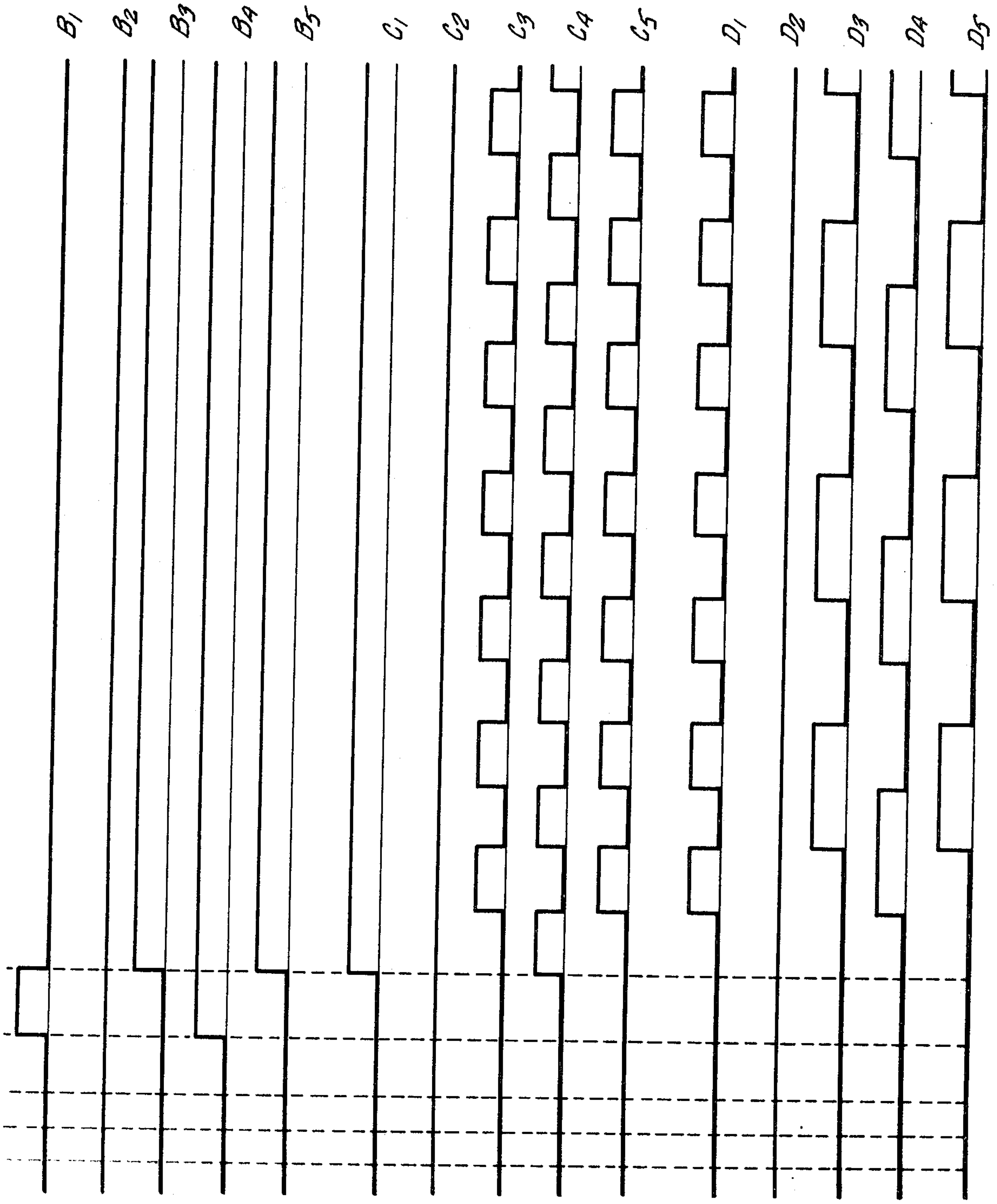
Figure 23C:
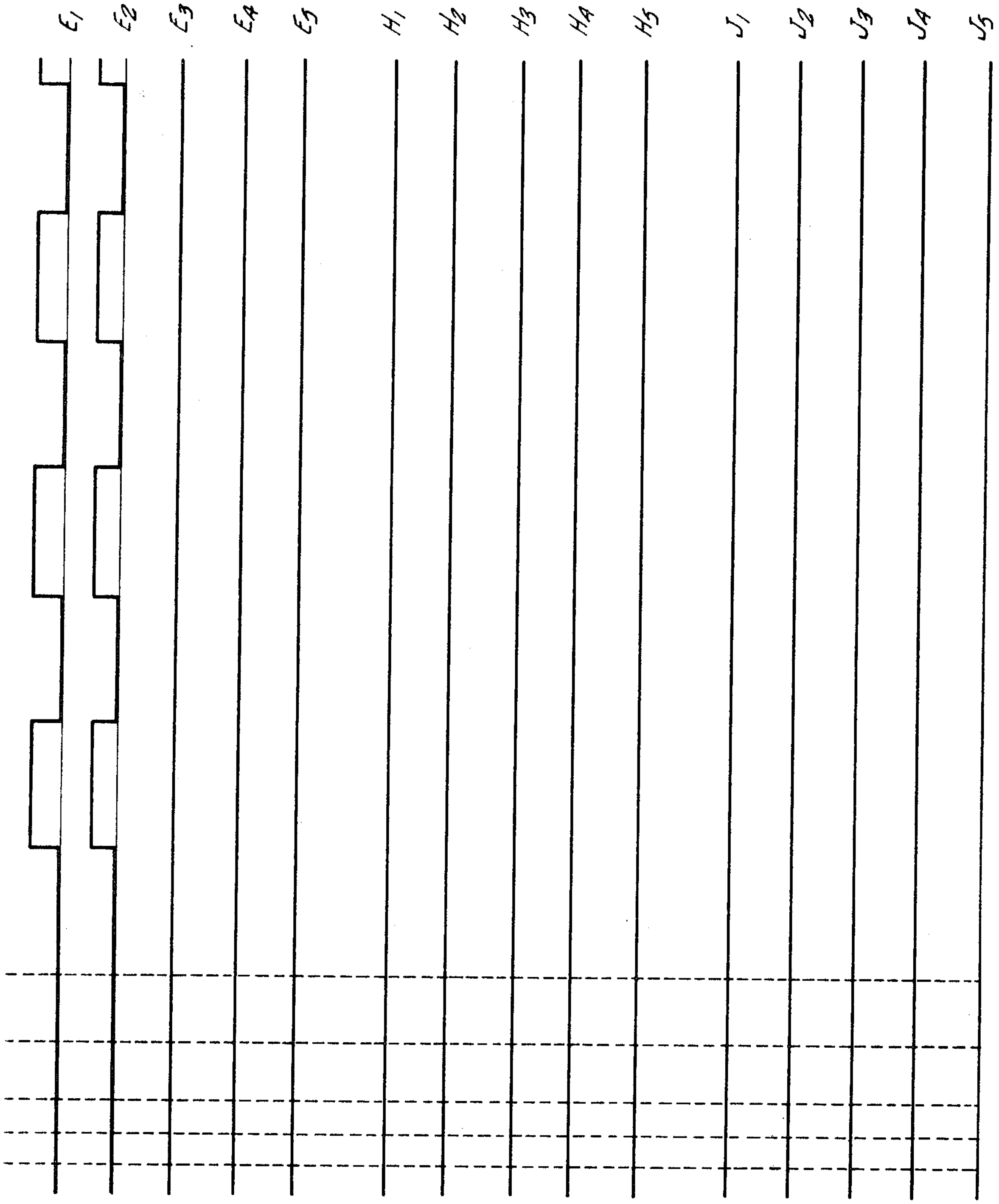
Figures 23D, 24:
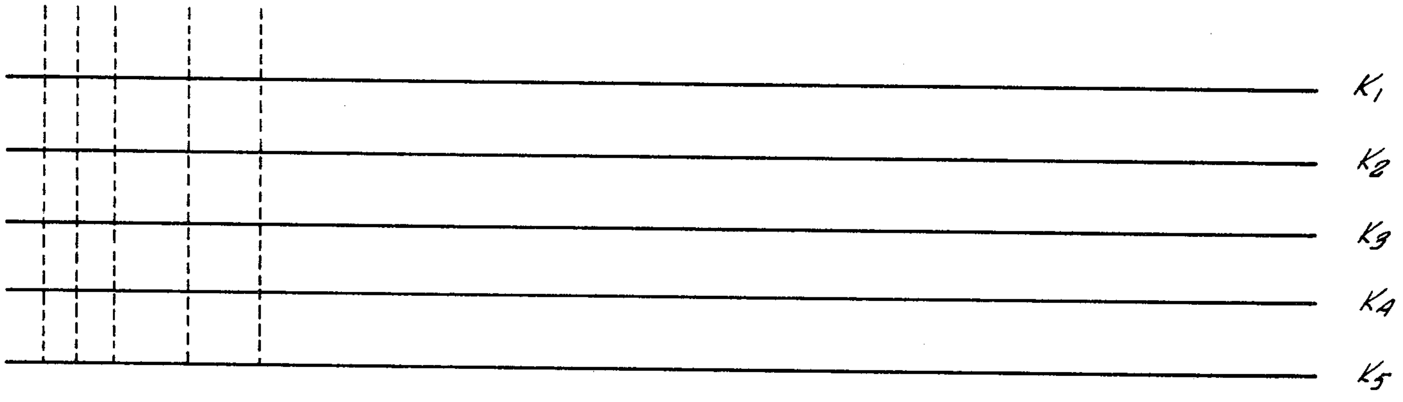
FIG. 24 is a diagram illustrating the output signals, for 16 consecutive clock times, of the stages of the binary word generator of FIG. 20 in response to the output signals of the binary circuit subsystem of FIG. 5.
Figure 27A:
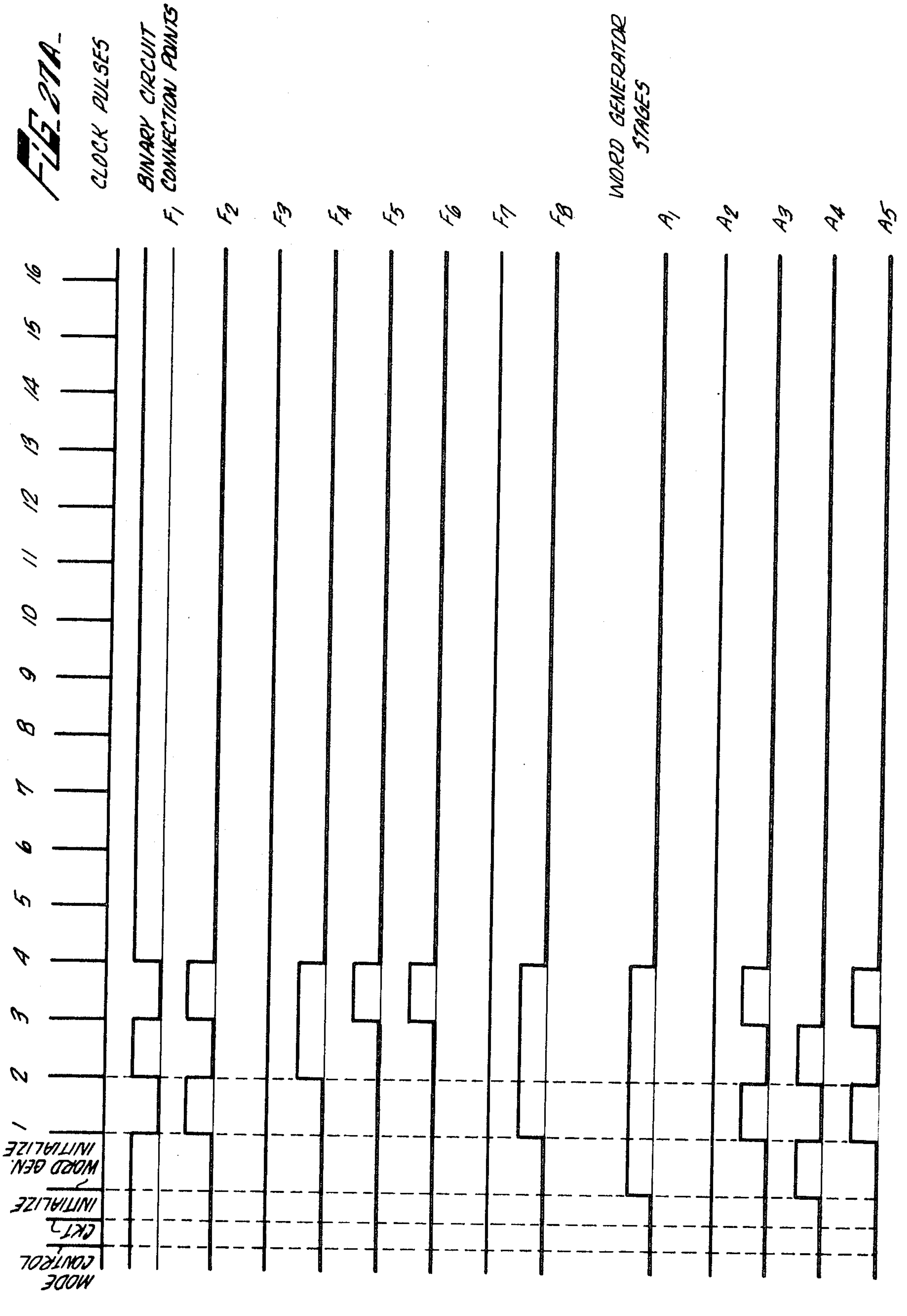
FIG. 27 A, B is a pulse diagram showing the binary signals present in the binary word generator of FIG. 2 and at the connection points of the subsystem of FIG. 5 when the word generator is operating in the fault-isolation mode.
Figure 27B:
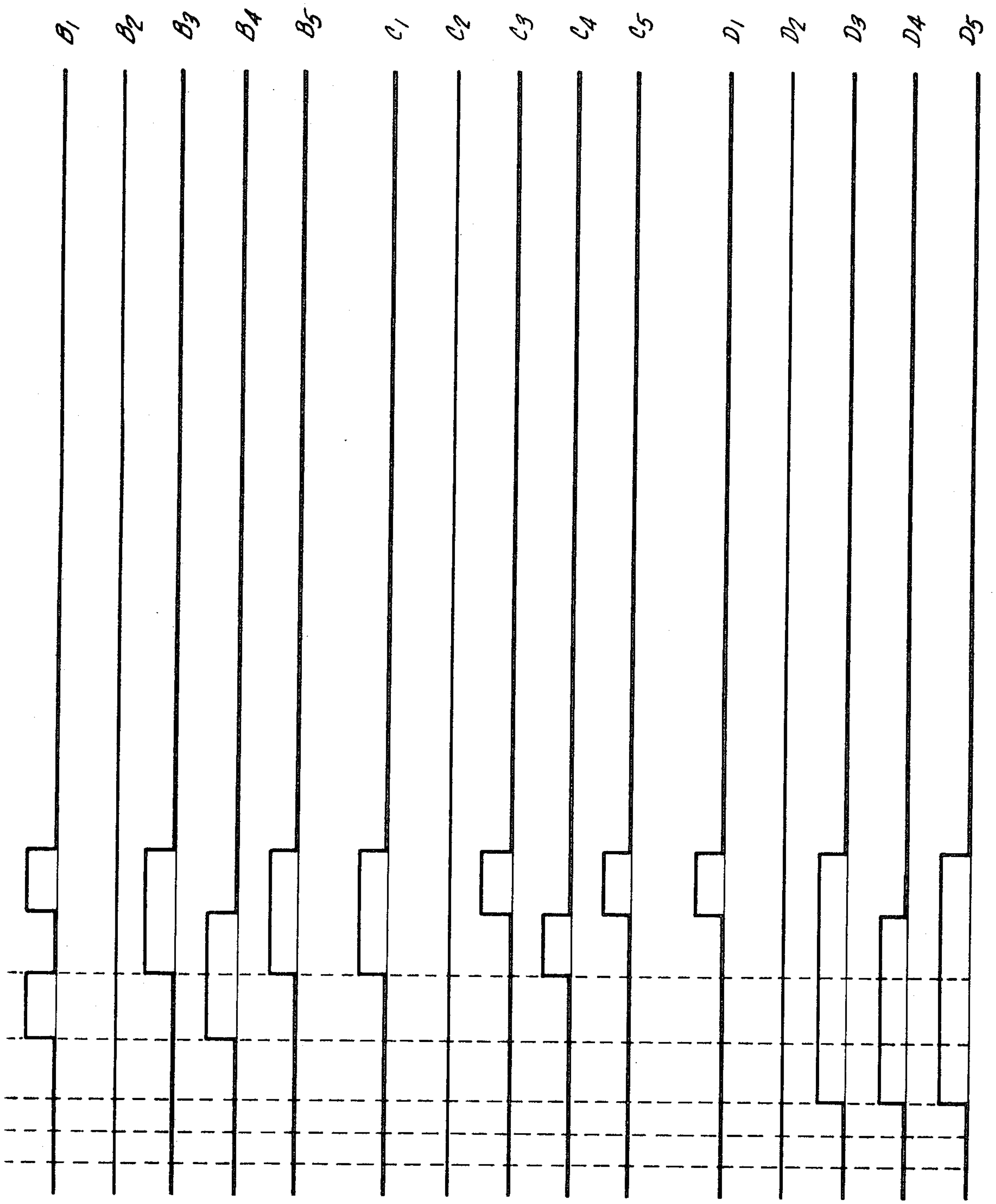

Assuming now that binary circuit subsystem 50 has a fault 117 therein which is a break in the conductor between connection point $F_7$ and the output of NAND circuitry 115, as shown in FIG. 5, and that the binary word generator 36 of FIG. 2 has been initialized to the state 0 0 0 1 and the subsystem 50 has been initialized by applying lows to the input connection points $F_2$, $F_3$, $F_4$, $F_6$ and $F_8$, monitoring the output connection points $F_1$, $F_5$, and $F_7$ for 16 clock times reveals that output connection point $F_7$ is generating a pulse count that is different from the pulse count expected for a good circuit at that connection point of the subsystem. The signals appearing at various stages in the binary word generator 36 while in the fault-isolation mode along with the signals appearing at the connection points $F_1$ through $F_8$ of the subsystem 50 of FIG. 5 is shown in FIG. 27 A, B. FIG. 28 illustrates the binary words that are generated by the word generator 36 for each of the 16 clock times when it is operating in the fault-isolation test mode. A comparison of the signals appearing at output connection points $F_1$, $F_5$, and $F_6$ for a good subsystem 50 and when there is a fault therein, indicates that only the signal count connection point $F_7$ in FIG. 22 is different. If a fault had also existed in the circuitry connected to connection point $F_1$, for example, there would be a mismatch in the signal counts at this connection point as well.

Therefore, by scanning the pulse counts of the output connection points $F_1$, $F_5$, and $F_6$, what electrically independent logic circuitry contains a fault can quickly be determined. In this particular example, connection point $F_7$ has a two count if the circuit connected to that connection point is functioning properly, but with the fault of FIG. 5 therein, the connection point $F_7$ has a zero count, as illustrated in FIG. 27 A.

Figure 29A:
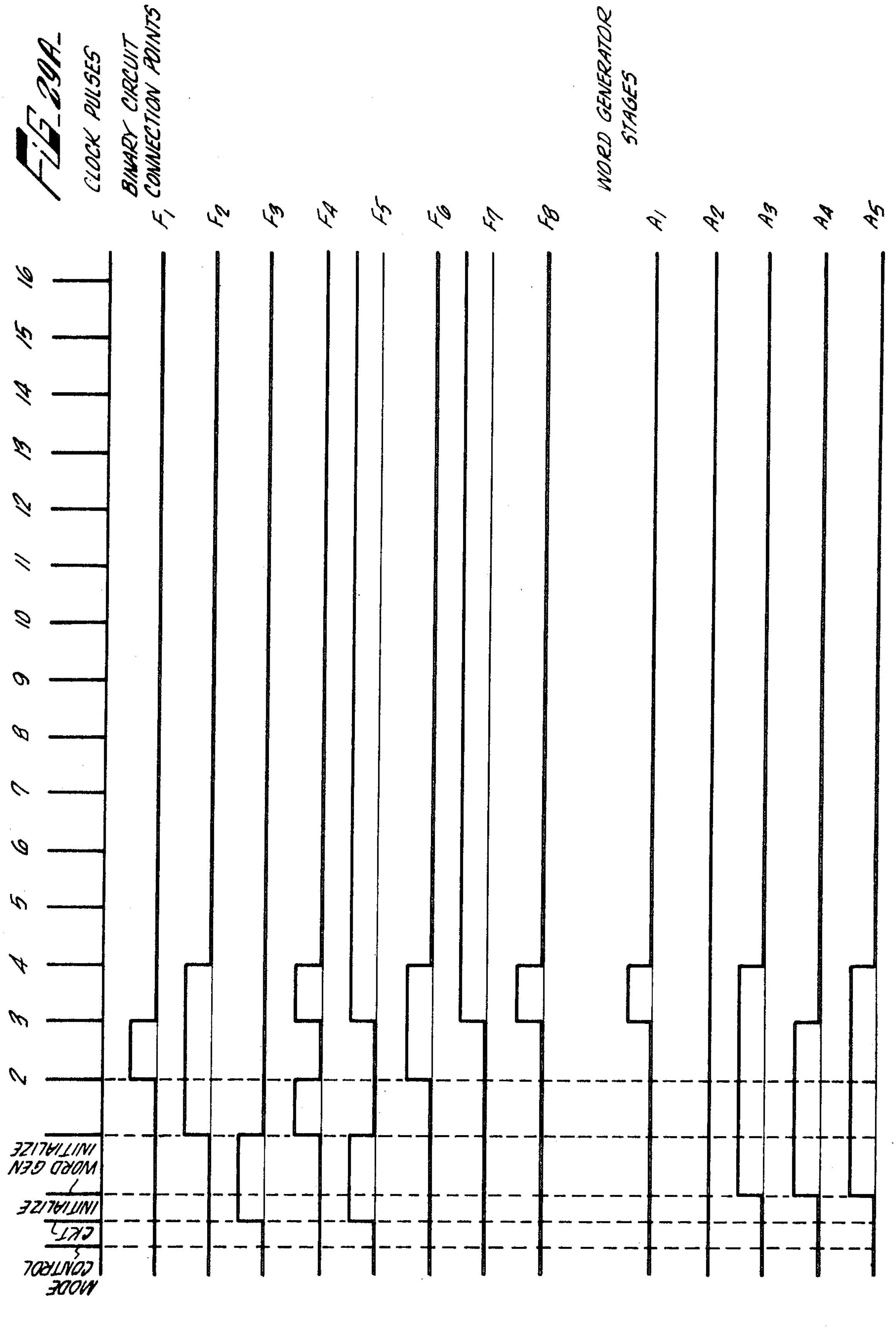
FIG. 29 A, B is a pulse diagram illustrating the binary signals present in the binary word generator of FIG. 2 and at the connection points of the subsystem of FIG. 8 when the word generator is operating in the fault-isolation mode.
Figure 29B:
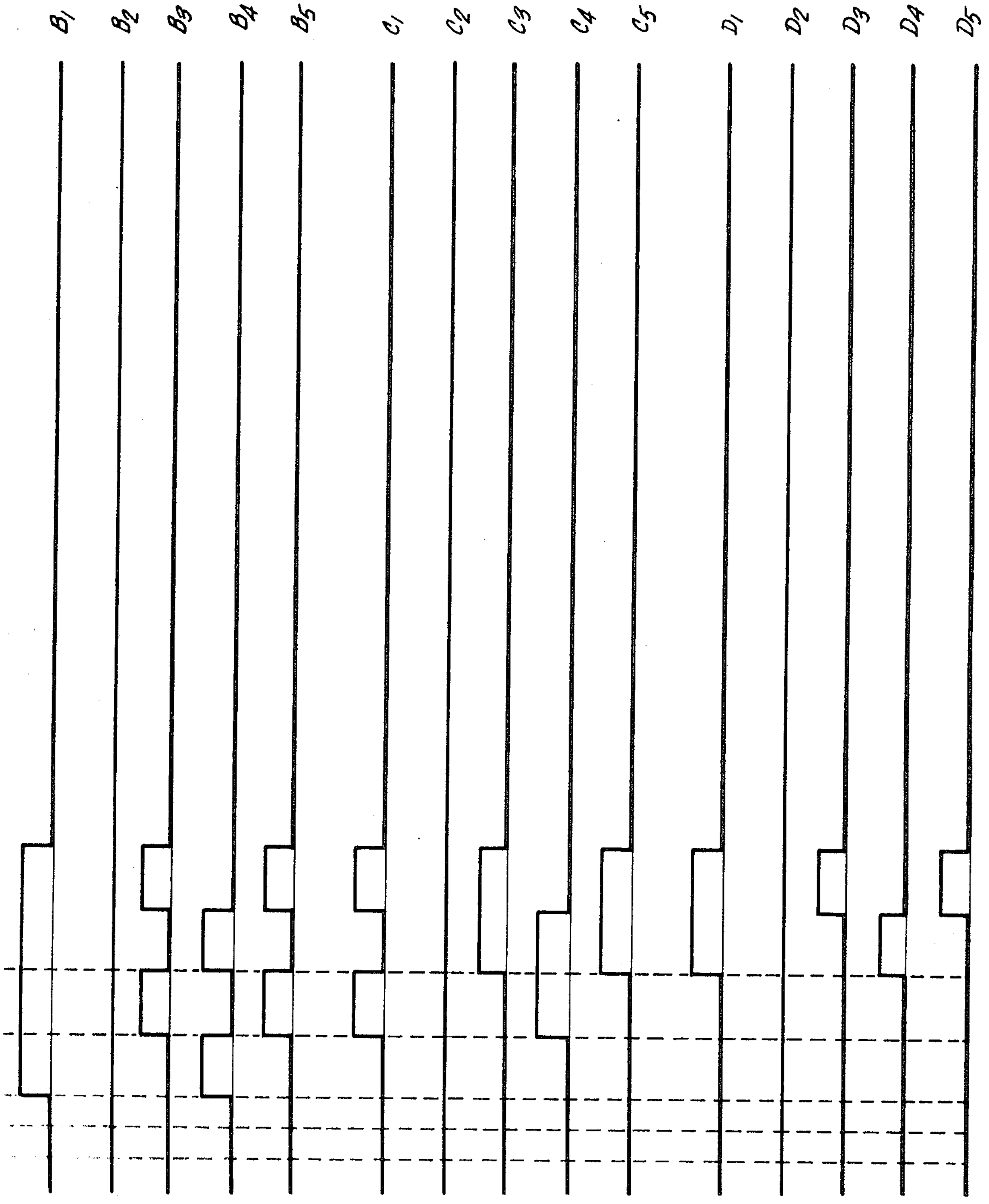

FIG. 29 A, B is a pulse diagram illustrating the signals that would appear at terminations $F_1$ through $F_8$ on the binary circuit subsystem 119 shown in FIG. 8 when it is run through a fault-isolation test cycle while connected to the binary word generator 36 of FIG. 2 and the binary word generator is initialized to 1 0 0 0 and the subsystem is initialized to 0 0 1 0 1 0 0 0 in the manner previously explained. FIG. 30 illustrates the binary words generated by the binary word generator 36 during the 16 clock times of a cycle when in the fault-isolation mode.

The output termination points $F_1$, $F_3$, $F_5$ and $F_7$ of subsystem 119 when that subsystem has no faults therein and the above initial conditions exist have signals thereon as shown in FIG. 29 A, $F_1$ having a count of one, $F_3$ a count of zero, $F_5$ a count of one, and $F_7$ a count of one.

Figure 31A:
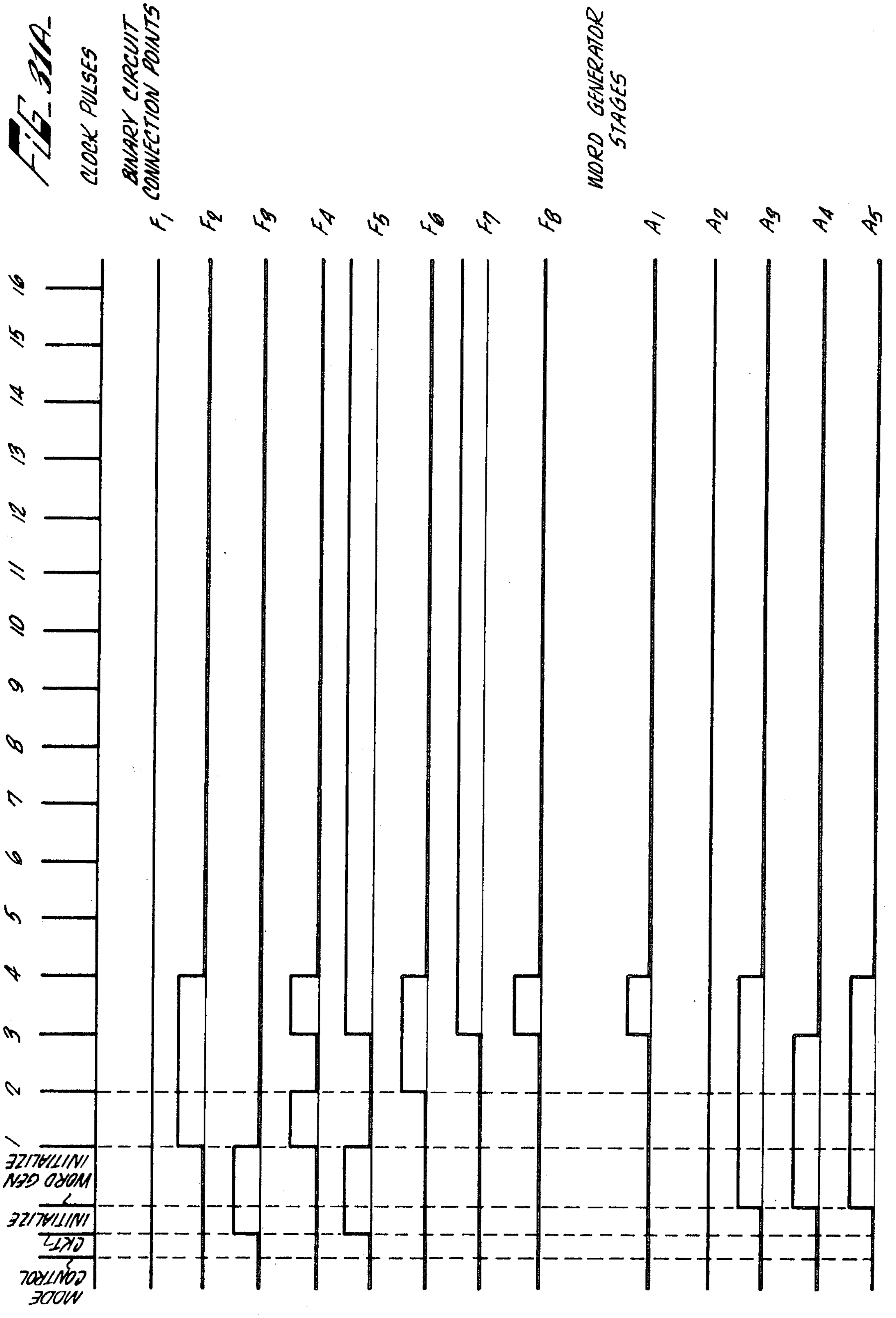
FIG. 31 A, B is a pulse diagram illustrating the binary signals present in the binary word generator of FIG. 2 and at the connection points of the subsystem of FIG. 12 when the binary word generator is operating in the fault-isolation mode.
Figure 31B:
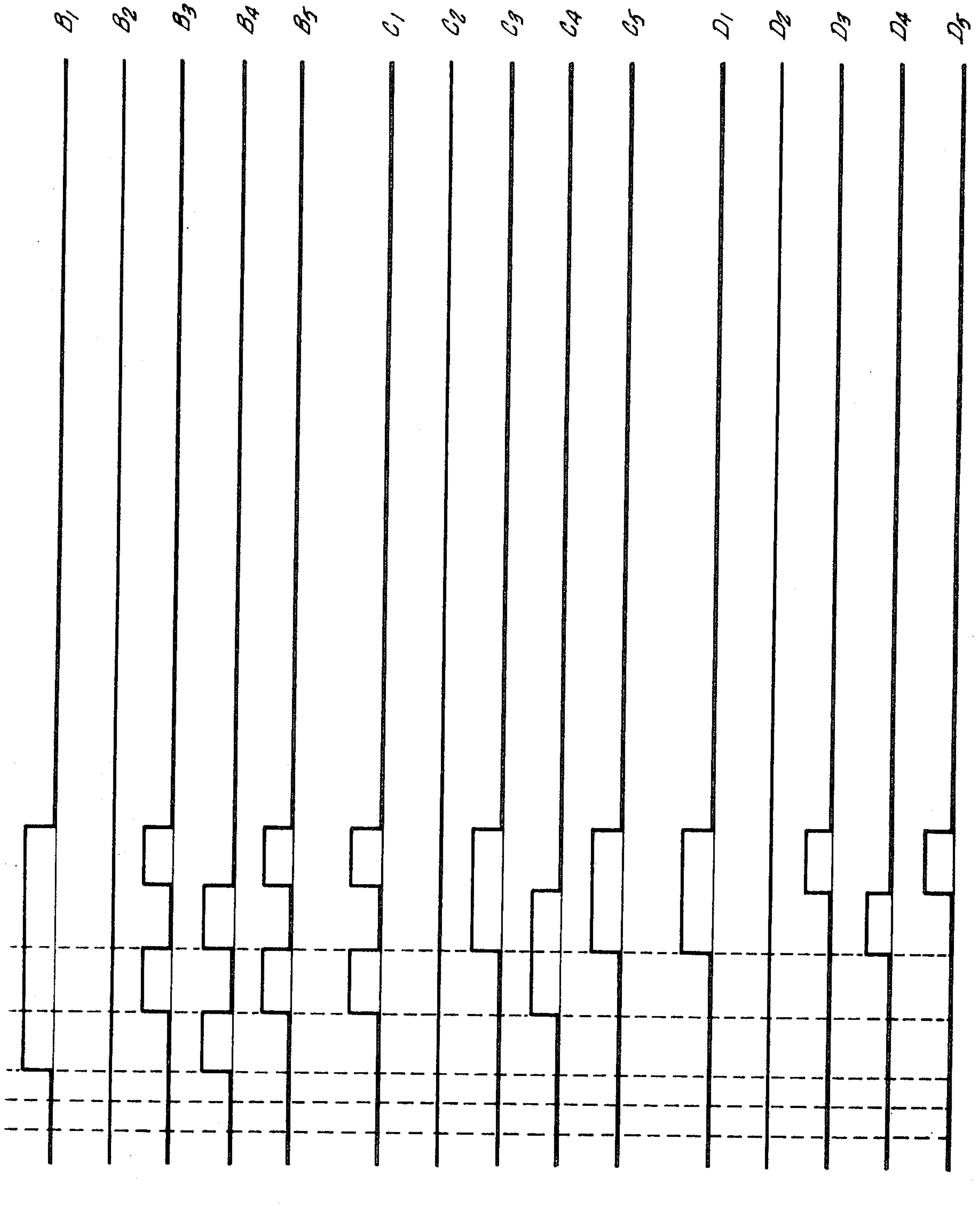
Figure 32B:
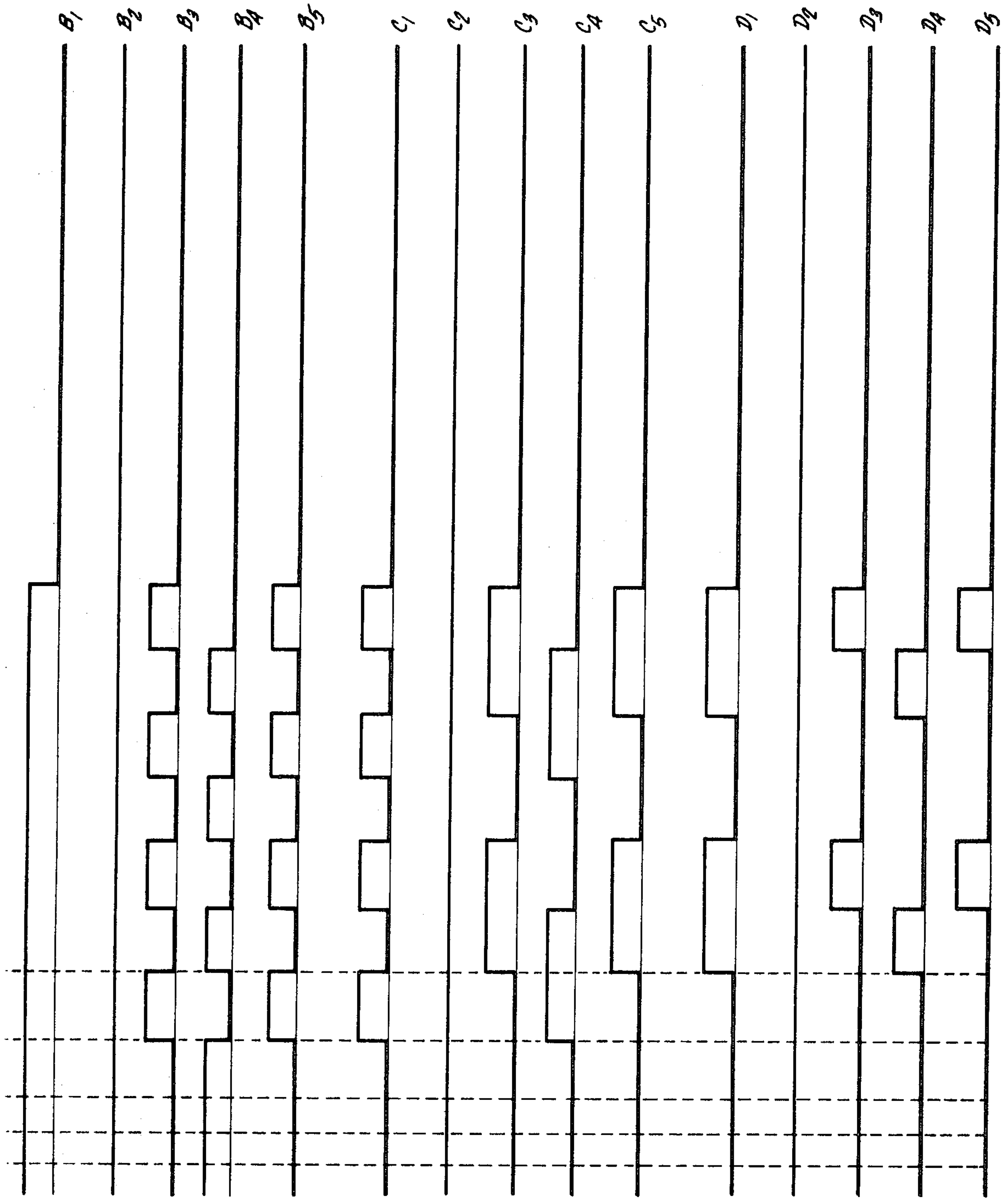
FIG. 32 is a diagram showing the output signals, for 16 consecutive clock times, of the stages in the binary word generator of FIG. 2 when operating in the fault-isolation mode and connected to the subsystem of FIG. 12.

However, if the same circuit subsystem 119 had a fault 143 therein (FIG. 12) and the same test was performed using the same initialization states for the binary word generator and circuit subsystem, the counts on the output connection points $F_1$, $F_3$, $F_5$ and $F_7$ would be as shown in FIG. 31 A. FIG. 31 A, B illustrate the signals appearing at various points in the binary word generator 36 for one test cycle of 16 clock times. FIG. 32 illustrates the binary words generated by the binary word generator 36 for 16 clock times of a fault-isolation test cycle. The pulse counts for the subsystem 119 having a fault 143, therein are: $F_1$, a count of zero, $F_3$, a count of zero, $F_5$ a count of one, and $F_7$ a count of one.

The pulse count appearing at connection point $F_1$ for the subsystem 119 of FIG. 8 does not match the pulse count appearing at connection point $F_1$ for the subsystem 119 of FIG. 12. Therefore, the circuitry connected to the connection point $F_1$, is indicated as containing a fault therein. Indeed, fault 143 (FIG. 12) is in the circuitry connected to connection point $F_1$. This is the only fault indicated since the pulse counts at all the other output connection points $F_3$, $F_5$, and $F_7$ match. If a fault had existed in one of the other electrically independent circuits, it would have surfaced in the same manner.

The embodiment of the fault-testing apparatus of this invention which utilizes the binary word generator 145 shown in FIG. 15 operates much the same way as the embodiment utilizing the binary word generator 36 of FIG. 2, when in the fault-isolation mode.

Figure 33A:
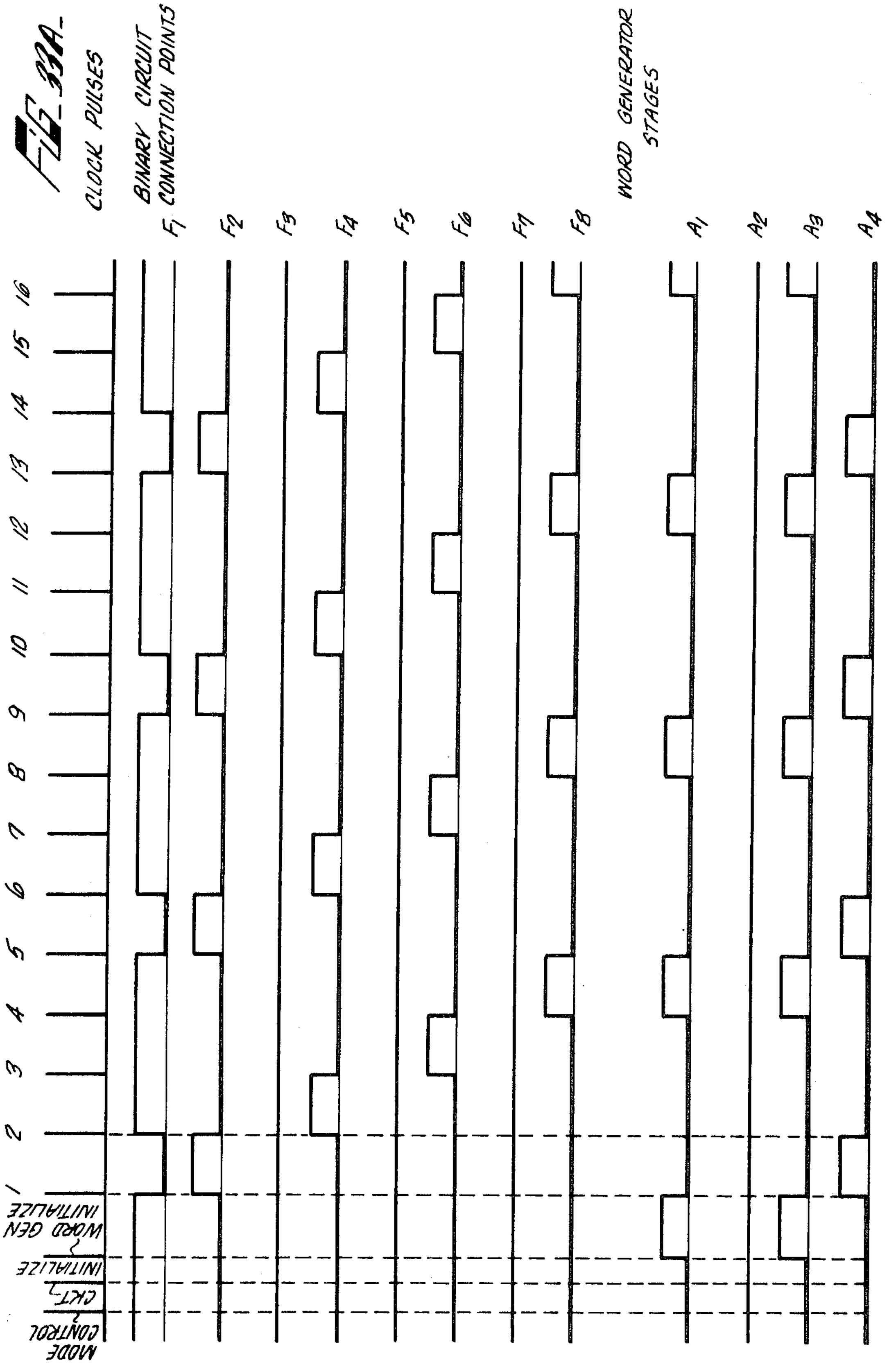
FIG. 33 A, B is a pulse diagram illustrating the binary signals present in the binary word generator and at the connection points of the subsystem of FIG. 15, when the binary word generator is operating in the fault-isolation mode.
Figure 33B:
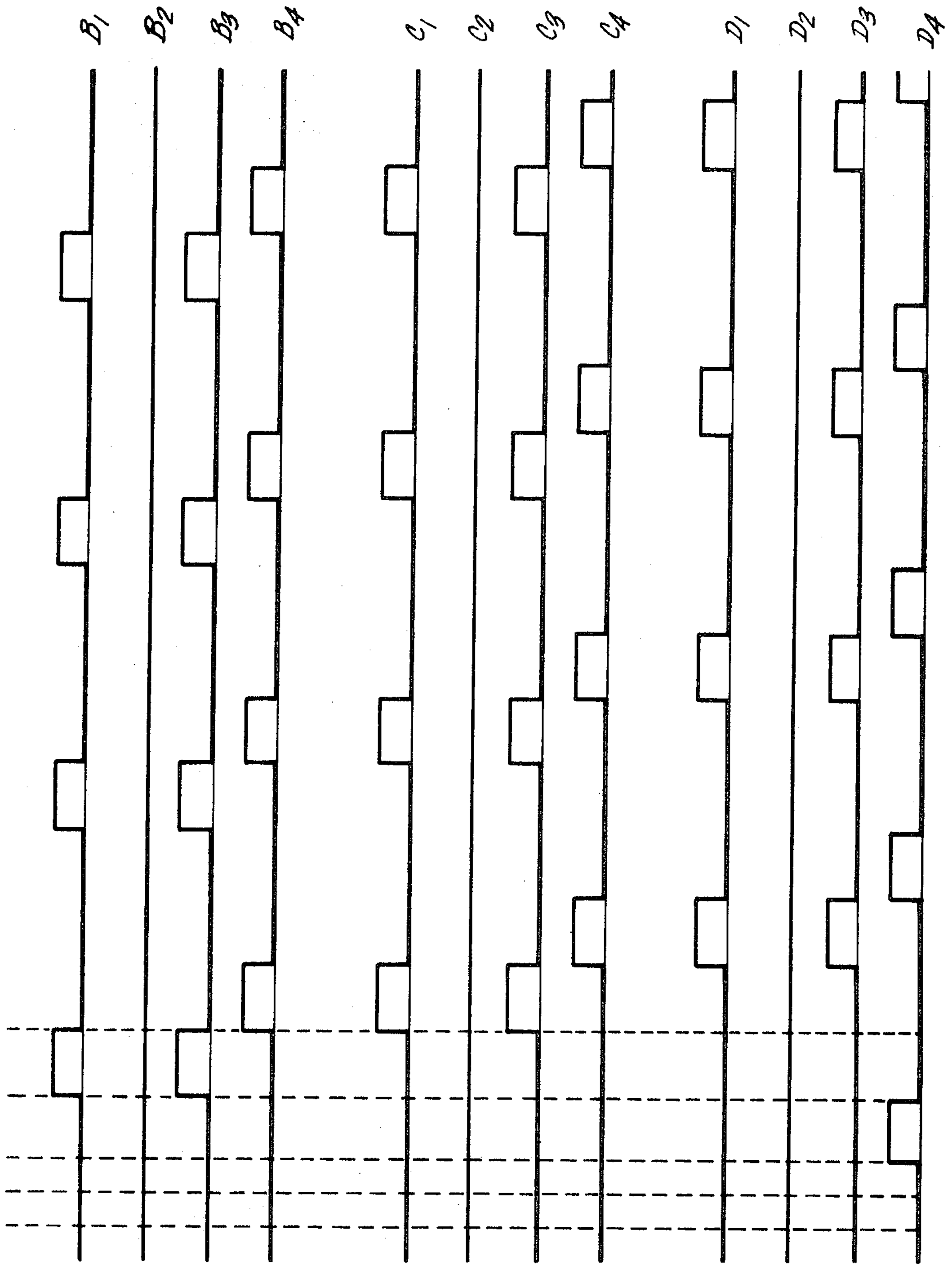
Figure 35A:
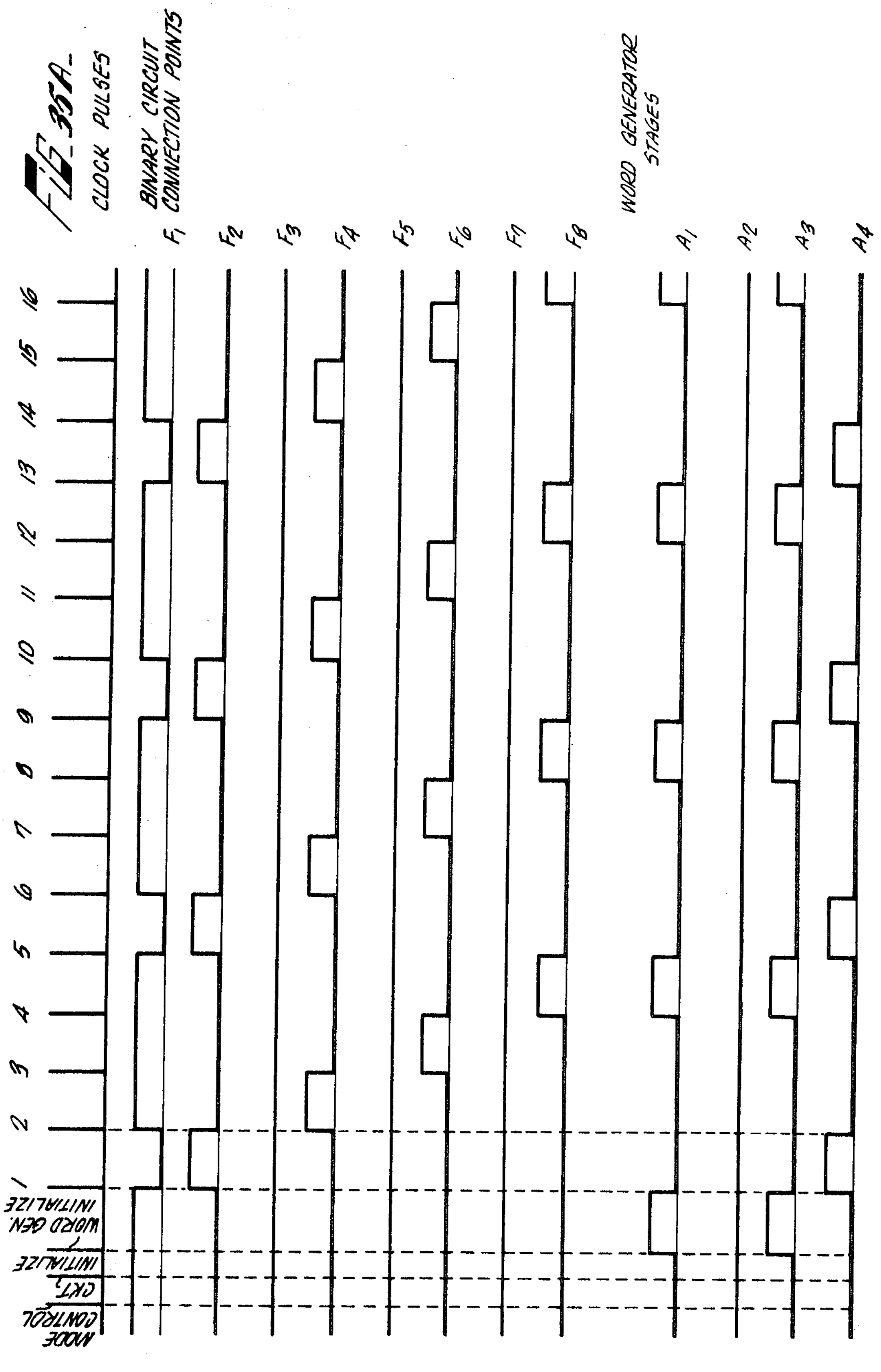
FIG. 35 A, B is a pulse diagram illustrating the binary signals present in the binary word generator of FIG. 15 and at the connection points of the subsystem of FIG. 5, when the binary word generator of FIG. 15 is operating in the fault-isolation mode.
Figure 35B:
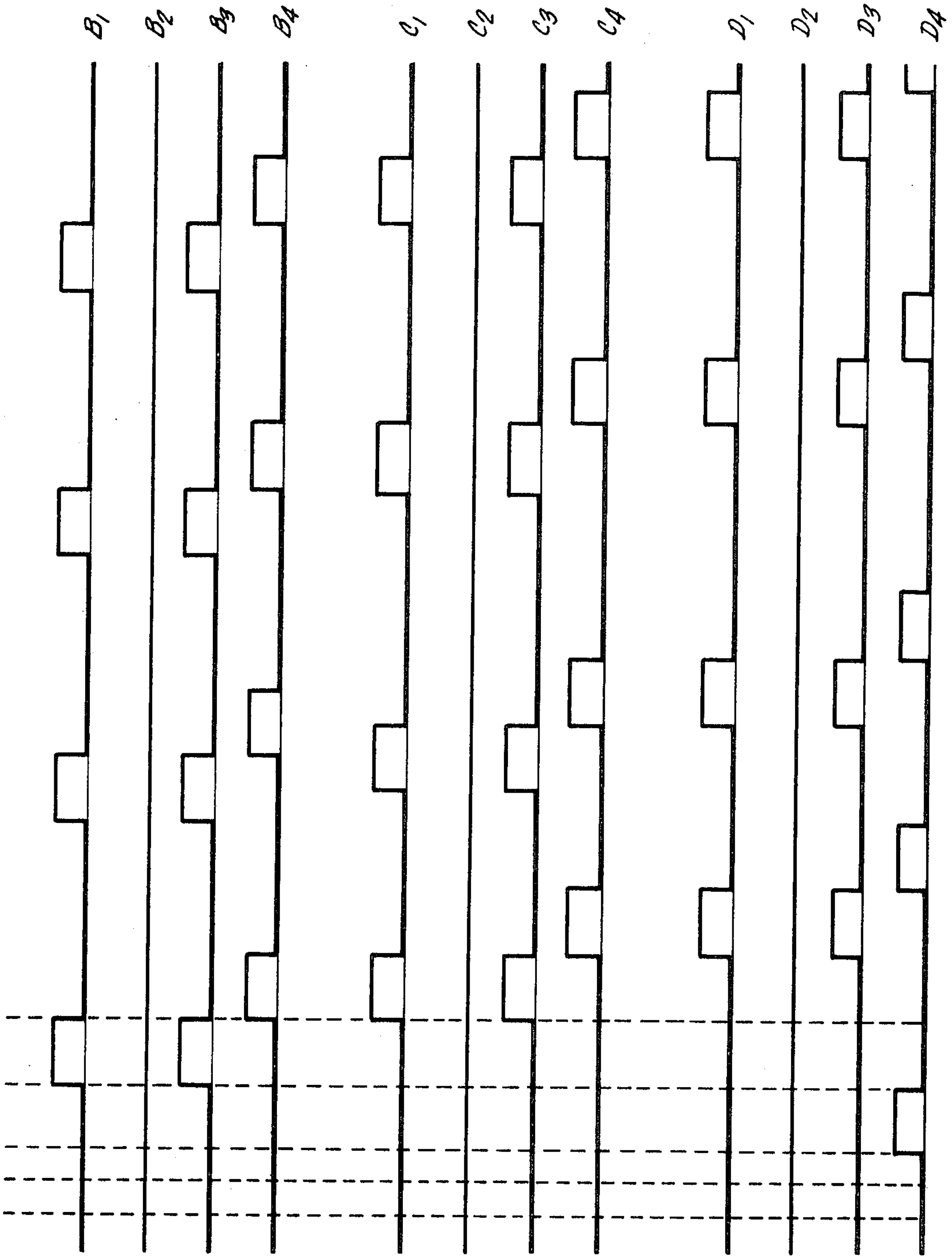

Assuming that the binary circuit subsystem 50 of FIG. 2 having output connection points $F_1$, $F_5$ and $F_7$ thereon is being tested by apparatus utilizing the binary word generator 145 in the fault-isolation mode and the same initial conditions are present as were present when the binary word generator 145 of FIG. 15 was used in the go-no-go mode, the signals appearings, at these output connection points for one test cycle of 16 clock times are shown in FIG. 33 A, the count on $F_1$ being one, the count on $F_5$ being zero, the count on $F_7$ being one. These counts are the reference or characteristic counts for the binary circuit subsystem 50 since these counts were obtained when a known good subsystem was tested. If the subsystem 50 having a fault 117 therein (FIG. 5) is connected to the binary word generator 145 of FIG. 15, the pulse counts appearing at the output connection points $F_1$, $F_5$ and $F_7$ for one test cycle of the subsystem are shown in FIG. 35 A, the pulse count at $F_1$ being one, the pulse count at $F_5$ being zero and the pulse count at $F_7$ being zero. Comparing these pulse counts with the characteristic pulse counts reveals that the pulse counts at connection point $F_1$ do not match. Therefore, a fault in the circuit connected to output connection point $F_1$ is indicated. If there were more than one fault in the subsystem, in two isolated circuits, the pulse counts at more than one connection point would not match.

FIG. 35 A, B illustrates the signals appearing at various points in the binary word generator 145 and at the input terminations $F_2$, $F_4$, $F_6$, $F_8$ and $F_3$ of the binary circuit subsystem 50 during a fault-isolation test cycle. FIG. 36 shows the binary word generated by the binary word generator 145 for each one of 16 clock times while operating in the fault-isolation mode.

Figure 37A:
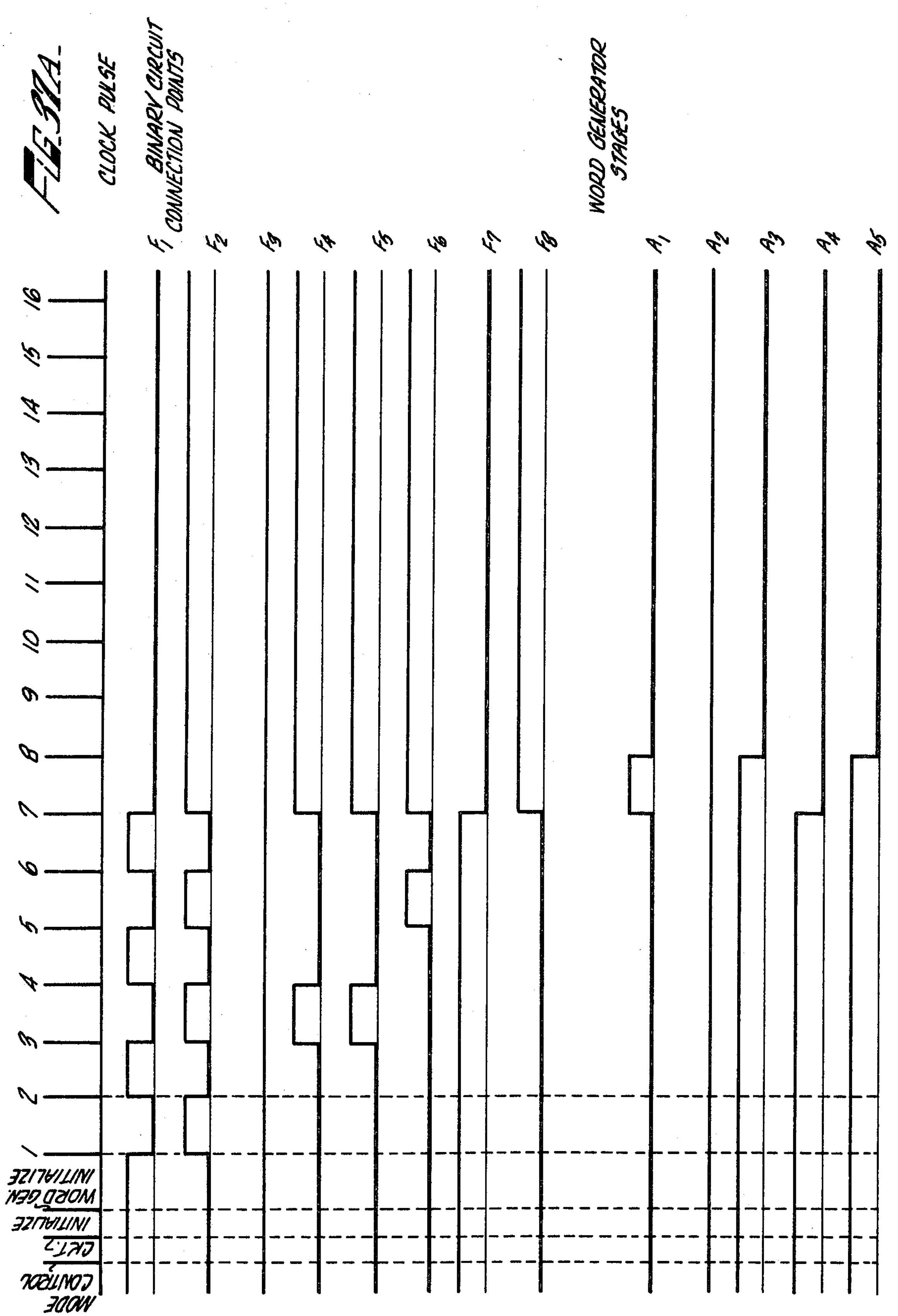
FIG. 37 A, B, C, D is a pulse diagram illustrating the binary signals present in the binary word generator and at the connection points of the subsystem of FIG. 20, when the binary word generator is operating in the fault-isolation mode.
Figure 37C:
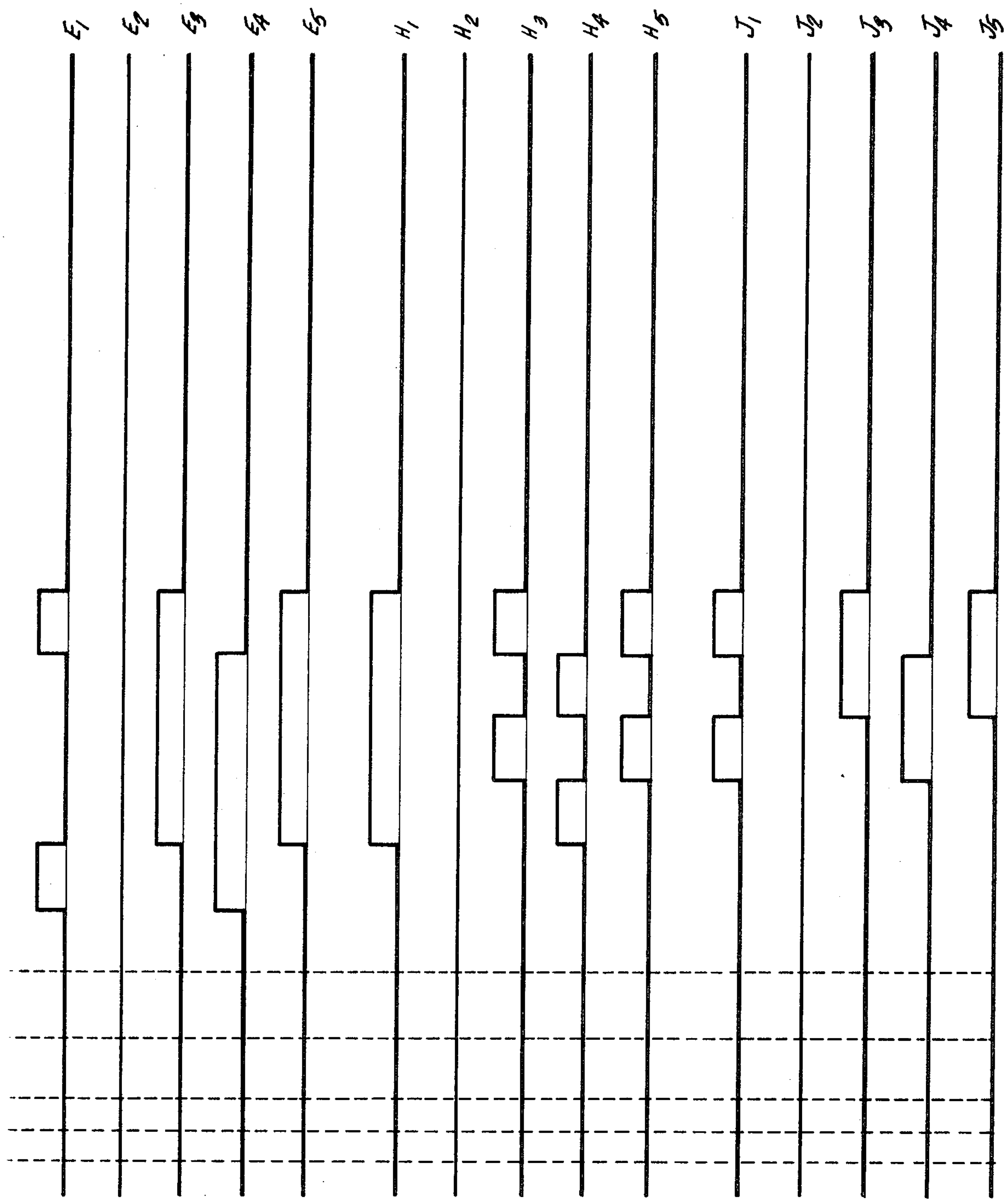
Figures 37D, 38:
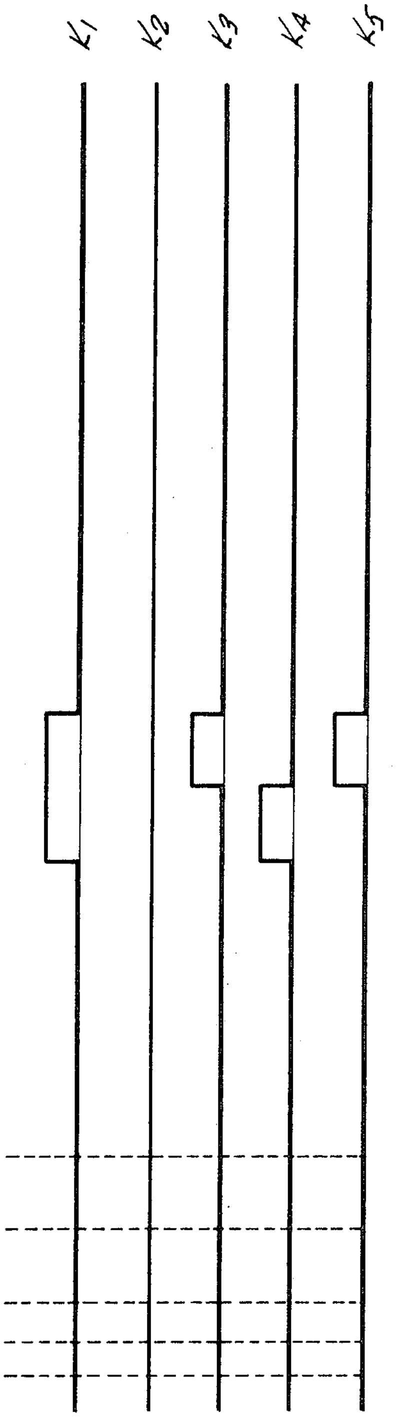
FIG. 38 is a diagram illustrating the output signals, for 16 consecutive clock times, of the stages in the binary word generator of FIG. 20 when operating in the fault-isolation mode and connected to the subsystem of FIG. 20.
Figure 39A:
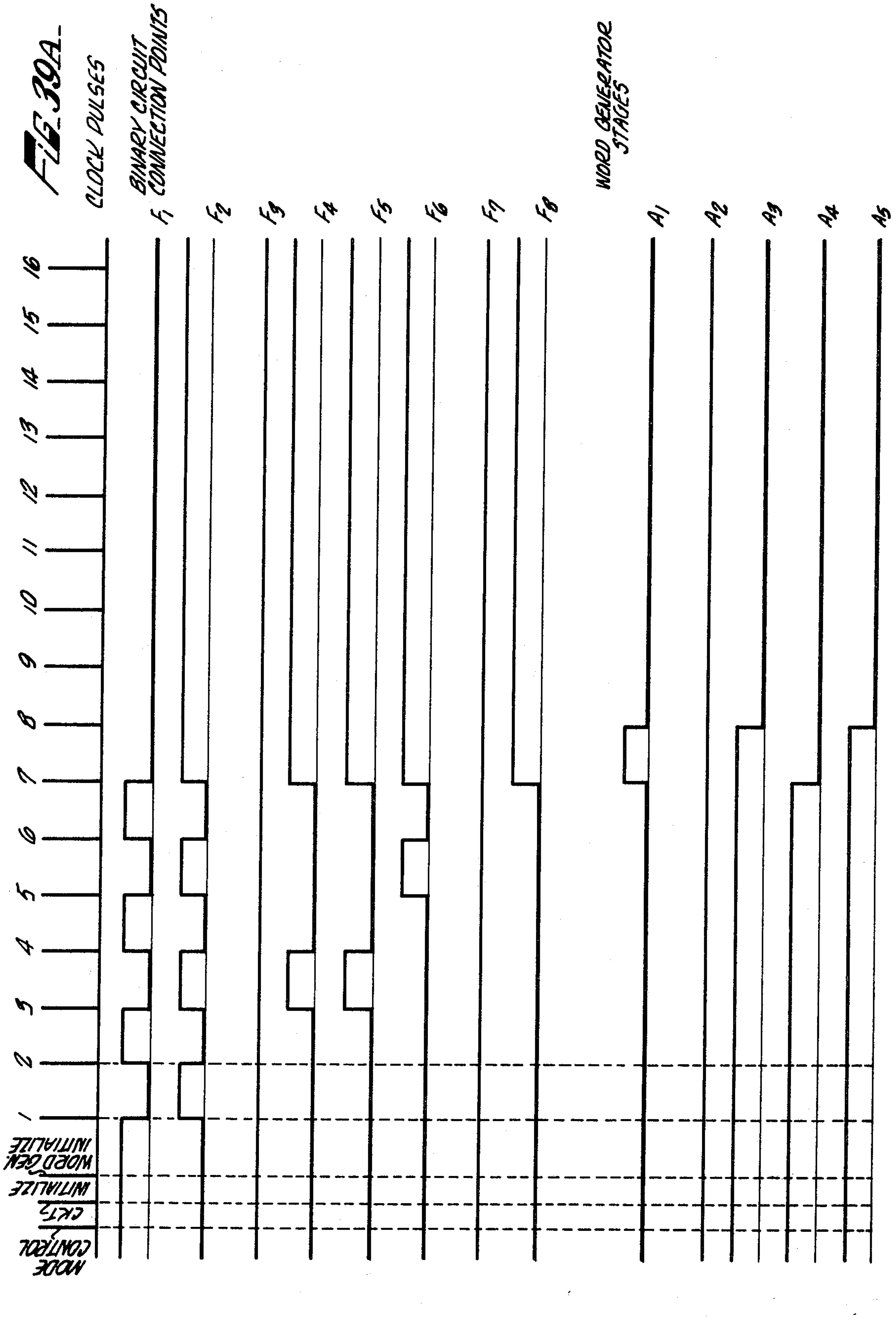
FIG. 39 A, B, C, D is a pulse diagram illustrating the binary signals present in the binary word generator of FIG. 20 and at the connection points of the subsystem of FIG. 5, when the binary word generator is operating in the fault-isolation mode.
Figure 39B:
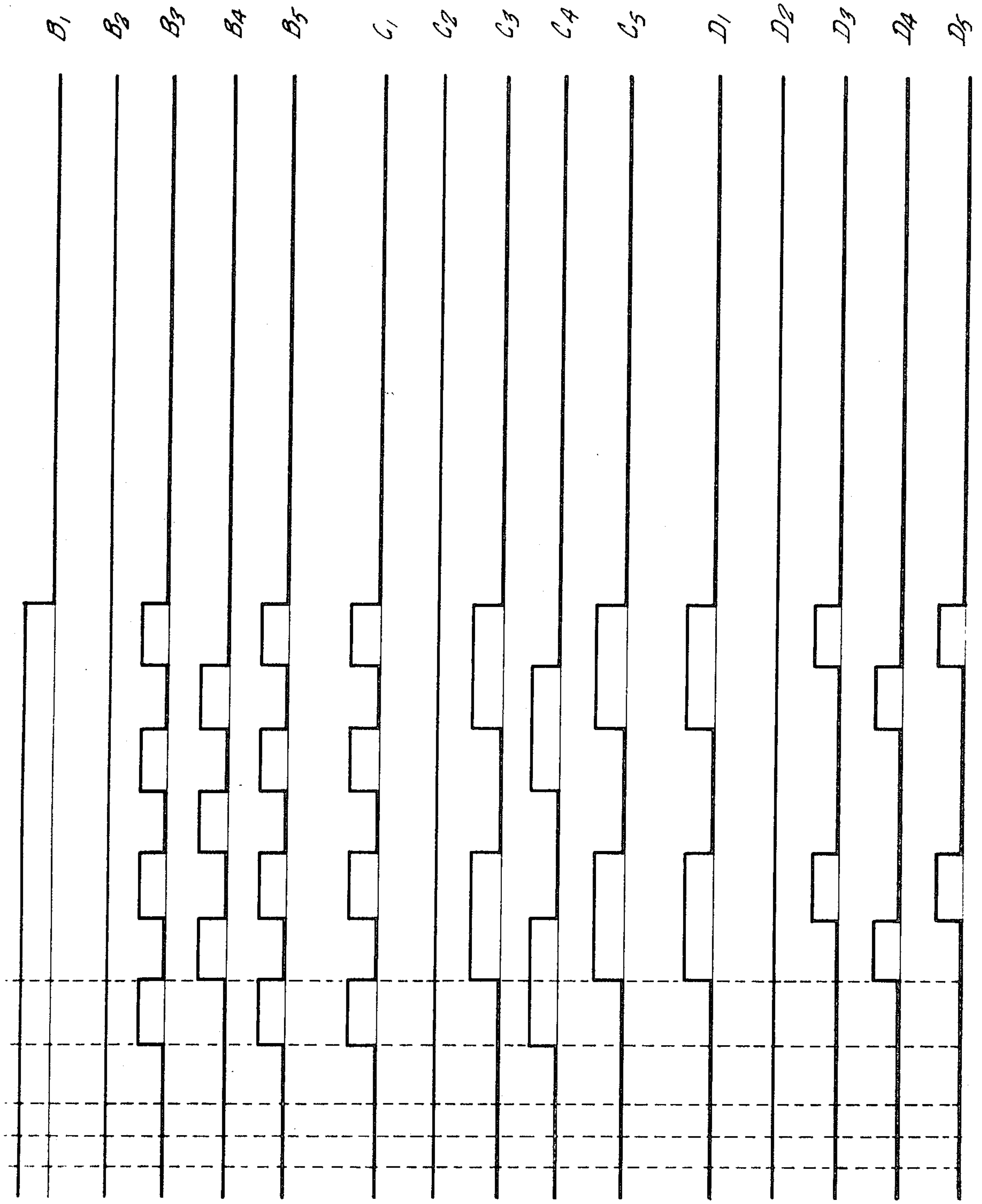
Figure 39C:
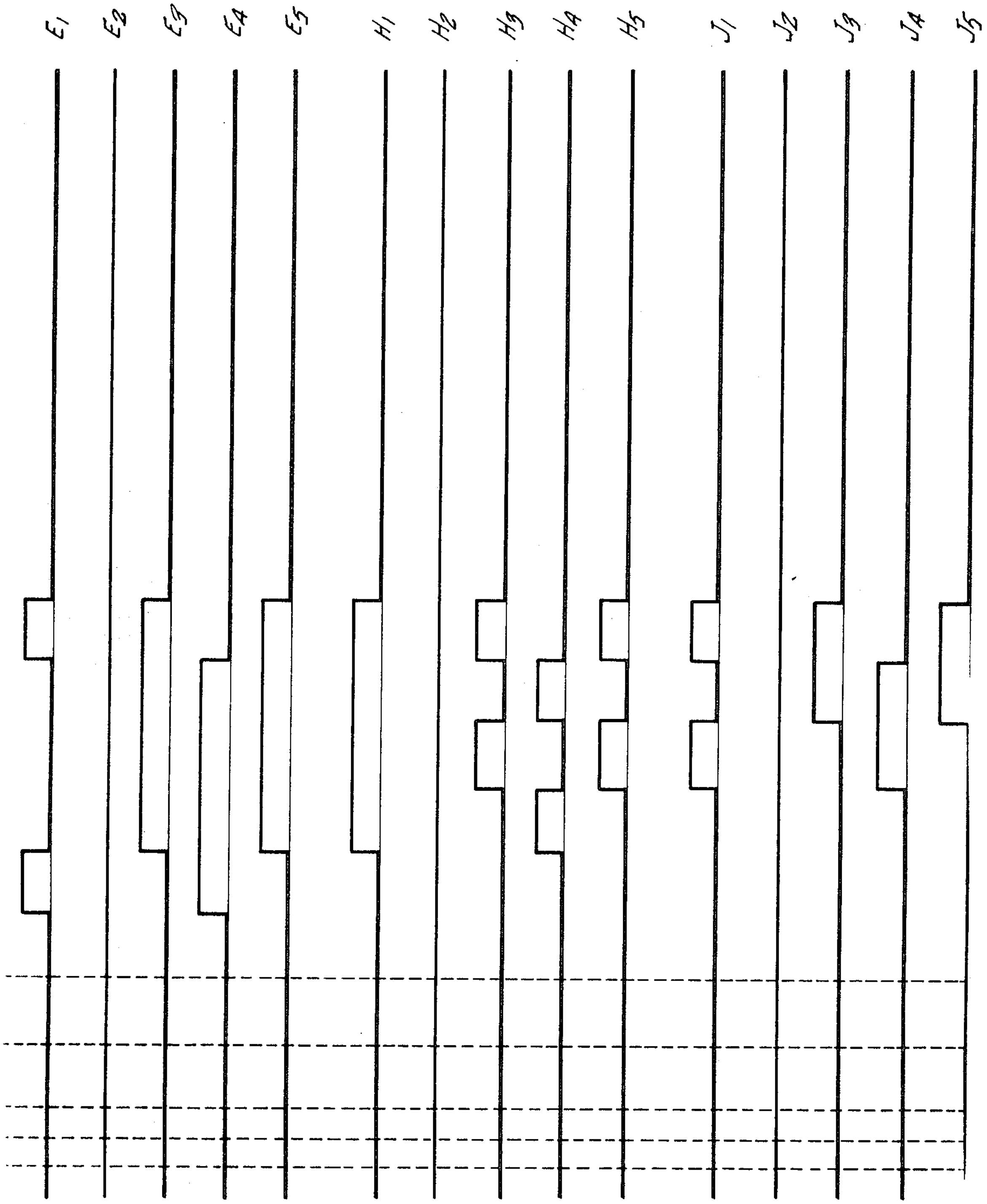
Figures 39D, 40:
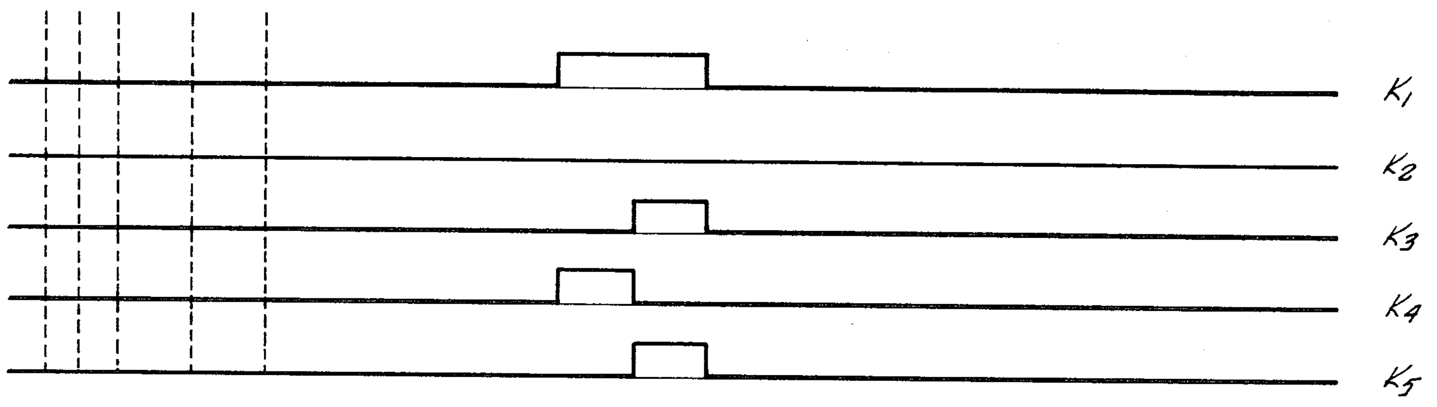
FIG. 40 is a diagram illustrating the output signals, for 16 consecutive clock times, of the stages in the binary word generator of FIG. 20 when operating in the fault-isolation mode and connected to the subsystem of FIG. 5.

The binary word generator 171 of FIG. 20 functions similarly to the binary word generator 36 and 145 when in the fault-isolation mode. Assuming that the subsystem 50 of FIG. 2 is to be tested, the switches in the switch connector 173 must be set in the following manner to disconnect the output connection points $F_1$, $F_5$ and $F_7$ on the subsystem 50 from the binary word generator 171. Switches 211, 213, 227, 229, 235 and 237 are opened while leaving the other switches in the switch connector 173 in the closure pattern recited for the go-no-go mode. The binary word generator must be initialized so that the outputs signals on its respective stages A through K are 1 0 0 0 0 0 0 0. The binary subsystem 50 must be initialized by applying lows, over binary circuit initializer cable 51, to the input connection points $F_2$, $F_4$, $F_6$, and $F_8$ on the subsystem. The binary signals appearing at the connection points $F_1$ through $F_8$ and at various points in the binary word generator 171 for a test cycle of 16 clock times when the above pre-test conditions are met are shown in FIG. 37 A, B, C, D. FIG. 38 shows the binary word generated for each clock time of the 16 clock times in the test cycle.

From FIG. 37 A it is evident that output connection point $F_1$ exhibited a pulse count of 3, output connection point $F_5$ exhibited a pulse count of 2, and output connection point $F_7$ exhibited a pulse count of 1, for a complete test cycle. Since these pulse counts were obtained when a subsystem 50 that had no faults therein was tested, these pulse counts can be taken as being characteristic pulse counts indicative of a good subsystem of this type.

Assuming now that the subsystem 50 which has a fault 117 therein, between the output NAND gate 115 and connection point $F_7$ (FIG. 5) and that the subsystem 50 and the binary word generator 171 are initialized to their respective standard pre-test states for the fault-isolation mode, FIG. 39 A, B, C, D illustrates the binary word signals present at the connection points F1 through $F_8$ and at various points in the binary word generator 117 for one test cycle of 16 clock times. FIG. 40 illustrates the binary words generated by the binary word generator 117 for each of the 16 clock times in the test cycle. It is evident from FIG. 39 A that the pulse count appearing at output connection point $F_1$ for one complete 16 clock time test cycle is 3, the A pulse count appearing at output connection point $F_5$ is 2, and the pulse count appearing at output connection point $F_7$, is 0.

Comparing the pulse counts obtained when a good subsystem 50 was tested and a suspect subsystem 50 was tested, it is evident that the pulse counts at output connection point $F_7$ do not match. This indicates that a fault is present in the binary circuit that is connected to output connection point $F_7$. Indeed, this is the case.

If there had been more than one fault in the subsystem 50 of FIG. 5, each fault in a seperate electrically isolated circuit in the subsystem, the pulse counts of more than one connection point on the subsystem would not have matched.

SUMMARY

The invention disclosed herein provides a method and an apparatus that quickly, simply, and reliably helps determine if there is a fault in a complex binary circuit subsystem, and, upon finding a fault therein can ascertain what section or sections of the circuitry within the binary circuit subsystem contains the fault or faults.

It should be understood, of course, that the foregoing disclosure relates to only preferred embodiments of the invention and that numerous modifications or alterations may be made therein without departing from the spirit and scope of the invention as set forth in the appended claims. For example, the method of this invention may be practiced by a general purpose computer programmed to simulate the functions of the binary word generator 31, or, the binary word generator 145, or the binary word generator 171 in conjunction with the functions of the word generator and binary circuit initializer 35, word counter 39, mode controller 43, pulse counter 45, and switch connector 33.

What is claimed is:

1. In an apparatus for fault-testing a binary circuit subsystem having a plurality of input and output connection points, a binary signal generator for periodically applying a pattern of binary signals to said subsystem comprising:

means for generating binary signals in a pattern caused by binary signals received from the output connection points of said subsystem; and means for supplying said generated binary signal pattern to the input connection points of said subsystem.

2. The binary signal generator of claim 1 wherein said binary signal generating means comprises:

a plurality of logic elements receiving binary input signals from the output connection points of said subsystem and generating binary output signals in response to the received signals; and a plurality of bistable elements responsive to the binary signals generated by said logic elements for generating binary output signals to be applied to the input connection points of said subsystem.

3. The binary signal generator of claim 2 wherein said plurality of bistable elements are connected serially in a closed loop with said plurality of logic elements, one of said plurality of logic elements being connected between a pair of bistable elements.

4. The signal generator of claim 3 wherein each one of said plurality of logic elements has three input terminals and one output terminal, the first input terminal receiving binary signals from an immediately preceding bistable element, the second input terminal receiving binary signals from the subsystem under test, the third input terminal receiving binary signals from the immediately subsequent bistable element, and the output terminal supplying binary signals to said immediately subsequent bistable element.

5. The signal generator of claim 3 wherein each one of said plurality of logic elements has two input terminals and one output terminal, the first input terminal receiving binary signals from an immediately preceding bistable element, the second input terminal receiving binary signals from the subsystem under test, and the output terminal supplying binary signals to the immediately subsequent bistable element.

6. The binary signal generator of claim 2 wherein said plurality of logic elements equal in number said plurality of bistable elements and said plurality of logic or bistable elements are less in number than the plurality of input and output connection points on said subsystem.

7. The binary signal generator of claim 6 wherein said plurality of bistable elements are connected serially in a closed loop with said plurality of logic elements, one of said plurality of logic elements being connected between a pair of bistable elements.

8. The signal generator of claim 7 wherein each one of said plurality of logic elements has three input terminals and one output terminal, the first input terminal receiving binary signals from an immediately preceding bistable element, the second input terminal receiving binary signals from the subsystem under test when paired with a subsystem output connection point, the third input terminal receiving binary signals from the immediately subsequent bistable element, and the output terminal supplying binary signals to said immediately subsequent bistable element.

9. The signal generator of claim 7 wherein each one of said plurality of logic elements has two input terminals and one output terminal, the first input terminal receiving binary signals from an immediately preceding bistable element, the second input terminal receiving binary signals from the subsystem under test when paired with a subsystem output connection point, and the output terminal supplying binary signals to the immediately subsequent bistable element.

10. In an apparatus for fault-testing a binary circuit subsystem having a plurality of input and output connection points, a binary signal generator for periodically applying a plurality of binary signals to said subsystem, comprising:

- a plurality of logic elements responsive to binary signals at the output connection points of said subsystem, each of said logic elements receiving more than one binary input signal and generating a binary output signal only when a certain combination of input signals is received; and
- a plurality of bistable elements, responsive to the binary signals generated by said logic elements, each of said bistable elements changing state in response to binary input signals for generating binary signals to be applied to the input connection points of said subsystem.

11. The signal generator of claim 10 wherein said plurality of bistable elements are connected serially in a closed loop with said plurality of logic elements, one of said plurality of logic elemenets being connected between a pair of said bistable elements.

12. The signal generator of claim 10 wherein each one of said plurality of logic elements has three input terminals and one output terminal, the first input terminal receiving binary signals from an immediately preceding bistable element, the second input terminal receiving binary signals from the subsystem under test, the third input terminal receiving binary signals from the immediately subsequent bistable element, and the output terminal supplying binary signals to said immediately subsequent bistable element.

13. The signal generator of claim 11 wherein each one of said plurality of logic elements has two input terminals and one output terminal, the first input terminal receiving binary signals from an immediately preceding bistable element, the second input terminal receiving binary signals from the subsystem under test, and the output terminal supplying binary signals to the immediately subsequent bistable element.

14. An apparatus for fault-testing a binary circuit subsystem having a plurality of input and output connection points, comprising:

- means for generating binary signals to be applied to said subsystem in patterns caused by binary signals received from the output connection points of said subsystem; and
- means for initializing said binary circuit subsystem and said binary signal generating means, whereby the binary signals generated and applied to said subsystem thereafter, for N periods, are a characteristic combination of binary signals for each value of N when there are no faults in said binary circuit.

15. The apparatus of claim 14 further comprising: means for displaying the binary signals generated during the Nth period, thereby permitting an observation to be made as to whether a characteristic combination or a non-characteristic combination of binary signals has been generated.

16. The apparatus of claim 14 further comprising: switching means, for connecting and disconnecting signal paths between said binary subsystem and said binary signal generating means.

17. The apparatus of claim 16 further comprising:

- means for selectively deactivating said switching means;
- means for sensing the number of binary signals present in the signal paths having deactivated switching means; and
- means for displaying the number of binary signals sensed by said sensing means.

18. The apparatus of claim 14 wherein said means for periodically generating a plurality of binary signals comprises:

- first means responsive to binary signals at the output connection points of said subsystem, for generating binary signals; and
- second means responsive to the binary signals generated by said first means for generating binary signals to be applied to the input connection points of said subsystem.

19. The apparatus of claim 18 wherein said second means is a plurality of bistable elements, each of said bistable elements changing state in response to binary input signals; and wherein said first means is a plurality of logic elements, each of said logic elements receiving more than one binary input signal and generating a binary output signal only when a certain combination of input signals is received.

20. The apparatus of claim 19 wherein said plurality of bistable elements are connected serially in a closed loop with said plurality of logic elements, one of said plurality of logic elements being connected between a pair of said bistable elements.

21. The apparatus of claim 20 wherein each one of said plurality of logic elements has three input terminals and one output terminal, the first input terminal receiving digital signals from an immediately preceding bistable element, the second input terminal receiving signals from said subsystem under test, the third input terminal receiving signals from an immediately subsequent bistable element, and the output terminal supplying signals to said immediately subsequent bistable element.

22. The apparatus of claim 21 further comprising: means for supplying the binary signals from said bistable elements to said binary circuit subsystem.

23. Tje apparatus of claim 22 further comprising: switching means for connecting and disconnecting signal paths between said binary subsystem and said binary signal generating means.

24. The apparatus of claim 23 further comprising:

- means for selectively deactivating said switching means;

means for sensing the number of binary signals present in the signal paths having deactivated switching means; and means for displaying the number of binary signals sensed by said sensing means.

25. The apparatus of claim 20 wherein each one of said plurality of logic elements has two input terminals and one output terminal, the first input terminal receiving digital signals from an immediately preceding bistable element, the second input terminal receiving digital signals from said subsystem under test, and the output terminal supplying signals to an immediately subsequent bistable element.

26. The apparatus of claim 25 further comprising: means for supplying the binary signals from said bistable elements to said binary circuit subsystem.

27. The apparatus of claim 26 further comprising: switching means, for connecting and disconnecting signal paths between said binary subsystem and said binary signal generating means.

28. The apparatus of claim 27 further comprising:

means for selectively deactivating said switching means;

means for sensing the number of binary signals present in the signals paths having deactivated switching means; and means for displaying the number of binary signals sensed by said sensing means.

29. The apparatus of claim 20 wherein said plurality of bistable elements equal in number said plurality of logic elements and are greater in number than the plurality of connection points on said subsystem under test.

30. The apparatus of claim 29 further comprising: a plurality of switching means, one switching means for each one of said plurality of bistable or logic elements for connecting said binary circuit subsystem and said binary word generator together.

31. The apparatus of claim 30 wherein each one of said plurality of logic elements has three input terminals and one output terminal, the first input terminal connected to an output of an immediately preceding bistable element, the second input terminal connected to one of said plurality of switching means, the third input terminal connected to an output of an immediately subsequent bistable element, and the output terminal conected to an input of said subsequuent bistable element.

32. The apparatus of claim 31 wherein each one of the outputs of said bistable elements is also connected to one of said plurality of switching means.

33. The apparatus of claim 32 further comprising:

means for selectively deactivating said switching means;

means for sensing the number of binary signals generated at the signal paths having deactivated switching means; and means for displaying the number of binary signals sensed by said sensing means.

34. The apparatus of claim 30 wherein each one of said plurality of logic elements has two input terminals and one output terminal, the first input terminal connected to an output of an immediately preceding bistable element, the second input terminal connected to one of said plurality of switching means, and the output terminal connected to an input of an immediately subsequent bistable element.

35. The apparatus of claim 34 wherein each one of the outputs of said bistable elements is also connected to one of said plurality of switching means.

36. The apparatus of claim 35 further comprising:

means for selectively deactivating said switching means;

means for sensing the number of binary signals generated at the connection points having deactivated switching means; and means for displaying the number of binary signals sensed by said sensing means.

37. A method of fault-testing a binary circuit subsystem having a plurality of input and output connection points comprising:

setting said subsystem to a reference state; and starting from a reference state, generating and applying binary signals to said subsystem in patterns caused by binary signals received from the output connection points of said subsystem.

38. A method of fault-testing a binary circuit subsystem having a plurality of input and output connection points comprising:

setting said subsystem to a reference state;

sensing signals appearing at the output connection points of said subsystem;

starting from a reference state, generating and applying to the input connection points of said subsystem patterns of binary signals for N periods, the binary signals generated for each value of N forming a characteristic pattern caused by the signals sensed at the output connection points of the subsystem, when there are no faults in the subsystem; and determining if a characteristic or a non-characteristic binary signal pattern was generated during the Nth period.

39. The method of claim 38 further comprising, after said determining step:

repeating said setting step;

periodically generating and applying to said input connection points on said subsystem a plurality of binary signals for N periods;

sensing the number of binary signals appearing at each of said output connection points for N periods, each output connection point exhibiting a characteristic number of binary signals for each value of N, when if there are no faults in the binary circuit connected to the output connection point being monitored; and for each connection point, determining if a characteristic or non-characteristic number of binary signals was sensed after N periods.

40. A method of fault-testing a binary circuit subsystem having a plurality of input and output connection points comprising:

setting said subsystem to a reference state;

periodically generating and applying to said input connection points on said subsystem a plurality of binary signals for N periods;

sensing the number of binary signals appearing at each of said output connection points for N periods, each output connection point exhibiting a characteristic number of binary signals for each value of N, when if there are not faults in the binary circuit connected to the output connection point being monitored; and for each connection point, determining if a characteristic or non-characteristic number of binary signals was sensed after N periods.

* * * * *

IN THE UNITED STATES PATENT OFFICE

CERTIFICATE OF CORRECTION

Patent No. 3,739,160 Dated: June 12, 1973

Hasan Afif El-Hasan et al

It is certified that error appears in the above-identified patent and that said Letter Patent is hereby corrected as shown below:

Column 6, line 4, "pluraltiy" should read --plurality--. Column 8, line 9, "complte" should read --complete--. Column 8, line 19, "binar" should read --binary--. Column 9, line 38, "41 cable 65" should read --41 by cable 65--. Column 10, line 63, "ane" should read --and--. Column 10, line 64, "NAND circuitry" should read --NAND gate circuitry--. Column 12, line 56, "th" should read --the--. Column 15, line 49, "pulse" should read --pulses--. Column 16, line 8 "ahown" should read --shown--. Column 18, line 38 "NAD" should read --NAND--. Column 19, line 24 "ove" should read --over--. Column 19, line 53, "$F_5$" should read --$F_6$--. Column 20, line 29 "cock" should read --clock--. Column 20, line 40 "was" should read --way--. line 26 "his" should read --this--.

Column 29, line 41, "10" should read --11--. Column 30, line 62 "Tje" should read --The--. Column 31, line 47 "conected" should read --connected--.

Signed and sealed this 25th day of December 1973.

(SEAL)
Attest:

EDWARD M. FLETCHER, JR.
Attesting Officer

RENE D. TEGTMEYER
Acting Commissioner of Patents